US011948089B2

(12) United States Patent
Berkovich et al.

(10) Patent No.: US 11,948,089 B2
(45) Date of Patent: Apr. 2, 2024

(54) SPARSE IMAGE SENSING AND PROCESSING

(71) Applicant: META PLATFORMS TECHNOLOGIES, LLC, Menlo Park, CA (US)

(72) Inventors: Andrew Samuel Berkovich, Bellevue, WA (US); Reid Pinkham, Redmond, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 17/091,331

(22) Filed: Nov. 6, 2020

(65) Prior Publication Data

US 2021/0142086 A1    May 13, 2021

Related U.S. Application Data

(60) Provisional application No. 62/932,067, filed on Nov. 7, 2019.

(51) Int. Cl.
*H04N 5/232* (2006.01)
*G06N 3/04* (2023.01)
(Continued)

(52) U.S. Cl.
CPC .............. *G06N 3/084* (2013.01); *G06N 3/04* (2013.01); *G06N 3/08* (2013.01); *G06V 10/141* (2022.01);
(Continued)

(58) Field of Classification Search
CPC ...... G06V 10/22; G06V 10/95; G06V 10/955; G06N 3/04; G06N 3/08; H04N 5/232; H04N 5/23218
(Continued)

(56) References Cited

U.S. PATENT DOCUMENTS 4,121,896 A    10/1978  Shepherd
6,384,905 B1   5/2002   Barrows
(Continued)

FOREIGN PATENT DOCUMENTS

CN    103207716 A    7/2013
CN    103907133 A    7/2014
(Continued)

OTHER PUBLICATIONS

U.S. Appl. No. 16/715,792, "Non-Final Office Action", dated Jan. 1, 2021, 15 pages.
(Continued)

*Primary Examiner* — Trang U Tran
(74) *Attorney, Agent, or Firm* — Kilpatrick Townsend & Stockton LLP

(57) ABSTRACT

In one example, an apparatus comprises: an image sensor comprising a plurality of pixel cells; a frame buffer; and a sensor compute circuit configured to: receive, from the frame buffer, a first image frame comprising first active pixels and first inactive pixels, the first active pixels being generated by a first subset of the pixel cells selected based on first programming data; perform an image-processing operation on a first subset of pixels of the first image frame, whereby a second subset of pixels of the first image frame are excluded from the image-processing operation, to generate a processing output; based on the processing output, generate second programming data; and transmit the second programming data to the image sensor to select a second subset of the pixel cells to generate second active pixels for a second image frame.

20 Claims, 32 Drawing Sheets

(51) Int. Cl.

| | |
|---|---|
| *G06N 3/08* | (2023.01) |
| *G06N 3/084* | (2023.01) |
| *G06V 10/141* | (2022.01) |
| *G06V 10/147* | (2022.01) |
| *G06V 10/94* | (2022.01) |
| *G06V 20/20* | (2022.01) |
| *H04N 23/61* | (2023.01) |

(52) U.S. Cl.
CPC ............ *G06V 10/147* (2022.01); *G06V 10/95* (2022.01); *G06V 10/955* (2022.01); *G06V 20/20* (2022.01); *H04N 23/61* (2023.01)

(58) Field of Classification Search
USPC ........................................................ 348/169
See application file for complete search history.

(56) References Cited

U.S. PATENT DOCUMENTS

| | | |
|---|---|---|
| 6,853,579 B1 | 2/2005 | Chou |
| 7,359,275 B1 | 4/2008 | Wu |
| 7,362,355 B1 | 4/2008 | Yang et al. |
| 7,659,925 B2 | 2/2010 | Krymski |
| 7,920,409 B1 | 4/2011 | Clark et al. |
| 7,956,914 B2 | 6/2011 | Xu |
| 7,969,759 B1 | 6/2011 | Thummalapally et al. |
| 8,134,623 B2 | 3/2012 | Purcell et al. |
| 8,441,535 B2 | 5/2013 | Morin |
| 8,675,110 B2 | 3/2014 | Hirai et al. |
| 8,779,346 B2 | 7/2014 | Fowler et al. |
| 9,094,629 B2 | 7/2015 | Ishibashi |
| 9,210,330 B2 | 12/2015 | Seo |
| 9,282,264 B2 | 3/2016 | Park et al. |
| 9,363,454 B2 | 6/2016 | Ito et al. |
| 9,560,296 B2 * | 1/2017 | Hseih ................. H04N 5/37457 |
| 9,646,681 B1 | 5/2017 | Jung et al. |
| 9,723,233 B2 | 8/2017 | Grauer et al. |
| 9,743,024 B2 | 8/2017 | Tyrrell et al. |
| 9,826,175 B2 * | 11/2017 | Isobe ................... H04N 5/3532 |
| 9,832,370 B2 | 11/2017 | Cho et al. |
| 9,912,885 B2 | 3/2018 | Isobe |
| 9,955,091 B1 | 4/2018 | Dai et al. |
| 10,007,350 B1 | 6/2018 | Holz et al. |
| 10,090,342 B1 | 10/2018 | Gambino et al. |
| 10,096,631 B2 | 10/2018 | Ishizu |
| 10,154,221 B2 | 12/2018 | Ogino et al. |
| 10,157,951 B2 | 12/2018 | Kim et al. |
| 10,274,730 B2 | 4/2019 | Jepsen et al. |
| 10,321,081 B2 | 6/2019 | Watanabe et al. |
| 10,345,447 B1 | 7/2019 | Hicks |
| 10,484,628 B2 | 11/2019 | Zhang et al. |
| 10,515,284 B2 | 12/2019 | Gousev et al. |
| 10,594,974 B2 | 3/2020 | Ivarsson et al. |
| 10,607,413 B1 | 3/2020 | Marcolina et al. |
| 10,715,824 B2 * | 7/2020 | Tall ....................... H04N 19/426 |
| 10,726,627 B2 * | 7/2020 | Liu ........................ G06K 9/627 |
| 10,867,655 B1 | 12/2020 | Harms et al. |
| 10,897,586 B2 | 1/2021 | Liu et al. |
| 10,915,995 B2 | 2/2021 | Moloney |
| 10,939,062 B2 | 3/2021 | Ogawa et al. |
| 10,970,619 B1 | 4/2021 | Xiao et al. |
| 10,984,235 B2 | 4/2021 | Gousev et al. |
| 10,999,539 B2 * | 5/2021 | Wendel ................. H04N 5/3452 |
| 11,057,581 B2 | 7/2021 | Liu |
| 11,126,497 B2 | 9/2021 | Oh et al. |
| 11,204,835 B2 | 12/2021 | Lu et al. |
| 11,568,609 B1 | 1/2023 | Liu et al. |
| 11,630,724 B2 | 4/2023 | Shin et al. |
| 2002/0113886 A1 | 8/2002 | Hynecek |
| 2003/0005231 A1 | 1/2003 | Ooi et al. |
| 2003/0020100 A1 | 1/2003 | Guidash |
| 2005/0057389 A1 | 3/2005 | Krymski |
| 2005/0058773 A1 | 3/2005 | Hasei et al. |
| 2005/0073874 A1 | 4/2005 | Chan et al. |
| 2005/0237380 A1 | 10/2005 | Kakii et al. |
| 2006/0224792 A1 | 10/2006 | Ooi |
| 2007/0076109 A1 | 4/2007 | Krymski |
| 2007/0222881 A1 | 9/2007 | Mentzer |
| 2008/0007731 A1 | 1/2008 | Botchway et al. |
| 2008/0055736 A1 | 3/2008 | Tsuji et al. |
| 2008/0226170 A1 | 9/2008 | Sonoda |
| 2009/0033588 A1 | 2/2009 | Kajita et al. |
| 2009/0245637 A1 | 10/2009 | Barman et al. |
| 2010/0194956 A1 | 8/2010 | Yuan et al. |
| 2010/0197821 A1 | 8/2010 | Jeong et al. |
| 2010/0197876 A1 | 8/2010 | Lyu et al. |
| 2010/0245600 A1 | 9/2010 | Chang et al. |
| 2010/0276572 A1 | 11/2010 | Iwabuchi et al. |
| 2011/0055461 A1 | 3/2011 | Steiner et al. |
| 2011/0075470 A1 | 3/2011 | Liaw |
| 2011/0155892 A1 | 6/2011 | Neter et al. |
| 2011/0254986 A1 | 10/2011 | Nishimura et al. |
| 2011/0267362 A1 | 11/2011 | Handschy et al. |
| 2012/0002459 A1 | 1/2012 | Rimondi et al. |
| 2012/0002460 A1 | 1/2012 | Rimondi et al. |
| 2012/0044399 A1 | 2/2012 | Hirai et al. |
| 2012/0086082 A1 | 4/2012 | Malinge et al. |
| 2012/0105475 A1 | 5/2012 | Tseng |
| 2012/0105668 A1 | 5/2012 | Velarde et al. |
| 2012/0113119 A1 | 5/2012 | Massie |
| 2012/0133807 A1 | 5/2012 | Wu et al. |
| 2012/0161088 A1 | 6/2012 | Choi et al. |
| 2012/0198312 A1 | 8/2012 | Kankani et al. |
| 2012/0200499 A1 | 8/2012 | Osterhout et al. |
| 2012/0212465 A1 | 8/2012 | White et al. |
| 2012/0240007 A1 | 9/2012 | Barndt et al. |
| 2012/0262616 A1 | 10/2012 | Sa et al. |
| 2013/0056809 A1 | 3/2013 | Mao et al. |
| 2013/0057742 A1 | 3/2013 | Nakamura et al. |
| 2013/0068929 A1 | 3/2013 | Solhusvik et al. |
| 2013/0069787 A1 | 3/2013 | Petrou |
| 2013/0141619 A1 | 6/2013 | Lim et al. |
| 2013/0185609 A1 | 7/2013 | Park et al. |
| 2013/0187027 A1 | 7/2013 | Qiao et al. |
| 2013/0198577 A1 | 8/2013 | Oh et al. |
| 2013/0207219 A1 | 8/2013 | Ahn |
| 2013/0215290 A1 | 8/2013 | Solhusvik et al. |
| 2013/0293753 A1 | 11/2013 | Keelan et al. |
| 2013/0299674 A1 | 11/2013 | Fowler et al. |
| 2013/0300009 A1 | 11/2013 | Oganesian et al. |
| 2013/0314591 A1 | 11/2013 | Eromaki |
| 2013/0326116 A1 | 12/2013 | Goss et al. |
| 2014/0042299 A1 | 2/2014 | Wan et al. |
| 2014/0055635 A1 | 2/2014 | Seo |
| 2014/0063250 A1 | 3/2014 | Park |
| 2014/0170345 A1 | 6/2014 | Aoshima et al. |
| 2014/0247382 A1 | 9/2014 | Moldovan et al. |
| 2014/0368687 A1 | 12/2014 | Yu et al. |
| 2015/0050479 A1 | 2/2015 | Nakamura et al. |
| 2015/0050480 A1 | 2/2015 | Suzuki et al. |
| 2015/0085134 A1 | 3/2015 | Novotny et al. |
| 2015/0158259 A1 | 6/2015 | Yamamoto et al. |
| 2015/0189209 A1 | 7/2015 | Yang et al. |
| 2015/0201142 A1 | 7/2015 | Smith et al. |
| 2015/0222827 A1 | 8/2015 | Isobe |
| 2015/0229859 A1 | 8/2015 | Guidash et al. |
| 2015/0279884 A1 | 10/2015 | Kusumoto |
| 2015/0309311 A1 | 10/2015 | Cho |
| 2015/0309316 A1 | 10/2015 | Osterhout et al. |
| 2015/0312502 A1 | 10/2015 | Borremans |
| 2015/0358571 A1 | 12/2015 | Dominguez Castro et al. |
| 2015/0381911 A1 | 12/2015 | Shen et al. |
| 2016/0011422 A1 | 1/2016 | Thurber et al. |
| 2016/0018645 A1 | 1/2016 | Haddick et al. |
| 2016/0021302 A1 | 1/2016 | Cho et al. |
| 2016/0028974 A1 | 1/2016 | Guidash et al. |
| 2016/0032074 A1 | 2/2016 | Aizenberg et al. |
| 2016/0078614 A1 | 3/2016 | Ryu et al. |
| 2016/0088253 A1 | 3/2016 | Tezuka |
| 2016/0100115 A1 | 4/2016 | Kusano |
| 2016/0165160 A1 * | 6/2016 | Hseih ................. H04N 5/35581 |
| | | 348/308 |
| 2016/0210785 A1 | 7/2016 | Balachandreswaran et al. |

(56) References Cited

U.S. PATENT DOCUMENTS

| | | | |
|---|---|---|---|
| 2016/0344965 | A1 | 11/2016 | Grauer et al. |
| 2016/0360127 | A1 | 12/2016 | Dierickx et al. |
| 2017/0039906 | A1 | 2/2017 | Jepsen |
| 2017/0041571 | A1 | 2/2017 | Tyrrell et al. |
| 2017/0117310 | A1 | 4/2017 | Tatani et al. |
| 2017/0154909 | A1 | 6/2017 | Ishizu |
| 2017/0161579 | A1 | 6/2017 | Gousev et al. |
| 2017/0228345 | A1 | 8/2017 | Gupta et al. |
| 2017/0248789 | A1 | 8/2017 | Yokoyama |
| 2017/0270664 | A1 | 9/2017 | Hoogi et al. |
| 2017/0272768 | A1 | 9/2017 | Tall et al. |
| 2017/0280031 | A1 | 9/2017 | Price et al. |
| 2017/0293799 | A1* | 10/2017 | Skogö .............. H01L 27/14649 |
| 2017/0307887 | A1 | 10/2017 | Stenberg et al. |
| 2017/0310910 | A1 | 10/2017 | Smith et al. |
| 2017/0338262 | A1 | 11/2017 | Hirata |
| 2017/0339327 | A1 | 11/2017 | Koshkin et al. |
| 2018/0027174 | A1 | 1/2018 | Sengoku |
| 2018/0115725 | A1 | 4/2018 | Zhang et al. |
| 2018/0136471 | A1 | 5/2018 | Miller et al. |
| 2018/0143701 | A1 | 5/2018 | Suh et al. |
| 2018/0167575 | A1 | 6/2018 | Watanabe et al. |
| 2018/0176545 | A1 | 6/2018 | Aflaki Beni |
| 2018/0204867 | A1 | 7/2018 | Kim et al. |
| 2018/0211582 | A1 | 7/2018 | Sakariya et al. |
| 2018/0224658 | A1 | 8/2018 | Teller |
| 2018/0239108 | A1 | 8/2018 | Ishii et al. |
| 2018/0241953 | A1 | 8/2018 | Johnson |
| 2018/0252857 | A1 | 9/2018 | Glik et al. |
| 2018/0270436 | A1 | 9/2018 | Ivarsson et al. |
| 2018/0276841 | A1 | 9/2018 | Krishnaswamy et al. |
| 2018/0284594 | A1 | 10/2018 | Gao |
| 2019/0019023 | A1 | 1/2019 | Konttori et al. |
| 2019/0027454 | A1 | 1/2019 | Chen et al. |
| 2019/0035154 | A1 | 1/2019 | Liu |
| 2019/0046044 | A1 | 2/2019 | Tzvieli et al. |
| 2019/0098232 | A1* | 3/2019 | Mori .................. H04N 5/37455 |
| 2019/0110039 | A1 | 4/2019 | Linde et al. |
| 2019/0123088 | A1 | 4/2019 | Kwon |
| 2019/0149751 | A1 | 5/2019 | Wise |
| 2019/0172227 | A1 | 6/2019 | Kasahara |
| 2019/0191116 | A1 | 6/2019 | Madurawe |
| 2019/0199946 | A1 | 6/2019 | Wendel et al. |
| 2019/0204527 | A1 | 7/2019 | Nakajima |
| 2019/0246036 | A1 | 8/2019 | Wu et al. |
| 2019/0253650 | A1 | 8/2019 | Kim |
| 2019/0307313 | A1 | 10/2019 | Wade |
| 2019/0331914 | A1 | 10/2019 | Lee et al. |
| 2019/0361250 | A1 | 11/2019 | Lanman et al. |
| 2019/0363118 | A1 | 11/2019 | Berkovich et al. |
| 2020/0035661 | A1 | 1/2020 | Yu et al. |
| 2020/0053299 | A1 | 2/2020 | Zhang et al. |
| 2020/0098096 | A1 | 3/2020 | Moloney |
| 2020/0193206 | A1 | 6/2020 | Turkelson et al. |
| 2020/0195828 | A1 | 6/2020 | Reyserhove et al. |
| 2020/0195875 | A1 | 6/2020 | Berkovich et al. |
| 2020/0273784 | A1 | 8/2020 | Mallik et al. |
| 2020/0280689 | A1 | 9/2020 | Takahashi et al. |
| 2021/0026796 | A1 | 1/2021 | Graif et al. |
| 2021/0110187 | A1 | 4/2021 | Pillai et al. |
| 2021/0118847 | A1 | 4/2021 | Chuang et al. |
| 2021/0185264 | A1 | 6/2021 | Wong et al. |
| 2021/0227159 | A1 | 7/2021 | Sambonsugi |
| 2021/0264679 | A1 | 8/2021 | Liu et al. |
| 2021/0283871 | A1 | 9/2021 | Lee et al. |
| 2021/0306586 | A1 | 9/2021 | Yamamoto et al. |
| 2021/0368124 | A1 | 11/2021 | Berkovich et al. |
| 2021/0409625 | A1 | 12/2021 | Zhu et al. |
| 2022/0021833 | A1 | 1/2022 | Berkovich |
| 2022/0076726 | A1 | 3/2022 | Hulton et al. |

FOREIGN PATENT DOCUMENTS

| | | |
|---|---|---|
| CN | 104204904 A | 12/2014 |
| CN | 106255978 A | 12/2016 |
| CN | 106791504 A | 5/2017 |
| CN | 107005641 A | 8/2017 |
| CN | 109298528 A | 2/2019 |
| DE | 102015122055 A1 | 6/2017 |
| EP | 0775591 A2 | 5/1997 |
| EP | 1603170 A1 | 12/2005 |
| EP | 1746820 A1 | 1/2007 |
| EP | 1788802 A1 | 5/2007 |
| EP | 2037505 A1 | 3/2009 |
| EP | 2228846 A1 | 9/2010 |
| EP | 2330173 A2 | 6/2011 |
| EP | 2357679 A2 | 8/2011 |
| EP | 2804074 A2 | 11/2014 |
| EP | 3229457 A1 | 10/2017 |
| EP | 3833005 A1 | 6/2021 |
| JP | 2003319262 A | 11/2003 |
| JP | 2005129139 A | 5/2005 |
| JP | 2006348085 A | 12/2006 |
| JP | 2008270500 A | 11/2008 |
| JP | 2013043383 A | 3/2013 |
| KR | 20110100974 A | 9/2011 |
| WO | 2014055391 A2 | 4/2014 |
| WO | 2016095057 A1 | 6/2016 |
| WO | 2017003477 A1 | 1/2017 |
| WO | 2017013806 A1 | 1/2017 |
| WO | 2017047010 A1 | 3/2017 |
| WO | 2018231962 A1 | 12/2018 |
| WO | 2019018084 A1 | 1/2019 |
| WO | 2019111528 A1 | 6/2019 |
| WO | 2019145578 A1 | 8/2019 |
| WO | 2019178060 A1 | 9/2019 |
| WO | 2019244142 A2 | 12/2019 |
| WO | 2020077283 A1 | 4/2020 |

OTHER PUBLICATIONS

PCT/US2019/034007, "International Search Report and Written Opinion", dated Oct. 28, 2019, 19 pages.
PCT/US2019/066805, "International Search Report and Written Opinion", dated Mar. 6, 2020, 13 pages.
PCT/US2019/066831, "International Search Report and Written Opinion", dated Feb. 27, 2020, 15 pages.
U.S. Appl. No. 17/083,920, "Advisory Action", dated Oct. 1, 2021, 4 pages.
PCT/US2021/033321, "International Search Report and Written Opinion", dated Sep. 6, 2021, 11 pages.
Corrected Notice of Allowance dated Mar. 22, 2022 for U.S. Appl. No. 16/716,050, filed Dec. 16, 2019, 2 Pages.
Non-Final Office Action dated Mar. 2, 2022 for U.S. Appl. No. 17/127,670, filed Dec. 18, 2020, 18 pages.
Notice of Allowance dated Feb. 7, 2022 for U.S. Appl. No. 17/324,803, filed May 19, 2021, 8 pages.
Notice of Allowance dated Mar. 7, 2022 for U.S. Appl. No. 16/421,441, filed May 23, 2019, 18 pages.
Notice of Allowance dated Mar. 11, 2022 for U.S. Appl. No. 16/716,050, filed Dec. 16, 2019, 13 pages.
Notice of Allowance dated Apr. 20, 2022 for U.S. Appl. No. 17/083,920, filed Oct. 29, 2020, 06 pages.
Office Action dated Apr. 5, 2022 for European Patent Application No. 19731047.7, filed May 24, 2019, 7 pages.
Notice of Allowance dated Jun. 2, 2022 for U.S. Appl. No. 16/716,050, filed Dec. 16, 2019, 13 pages.
Notice of Allowance dated May 23, 2022 for U.S. Appl. No. 17/324,803, filed May 19, 2021, 9 pages.
Notice of Allowance dated May 24, 2022 for U.S. Appl. No. 16/715,792, filed Dec. 16, 2019, 9 pages.
U.S. Appl. No. 16/421,441, "Non-Final Office Action", dated May 7, 2021, 17 pages.
U.S. Appl. No. 16/715,792, "Notice of Allowance", dated Apr. 16, 2021, 10 pages.
U.S. Appl. No. 16/715,792, "Notice of Allowance", dated Aug. 25, 2021, 9 pages.
U.S. Appl. No. 16/716,050, "Non-Final Office Action", dated May 14, 2021, 16 pages.

(56) References Cited

OTHER PUBLICATIONS

U.S. Appl. No. 17/083,920, "Non-Final Office Action", dated Apr. 21, 2021, 17 pages.
PCT/US2020/044807, "International Search Report and Written Opinion", dated Sep. 30, 2020, 12 pages.
PCT/US2020/059636, "International Search Report and Written Opinion", dated Feb. 11, 2021, 18 pages.
Amir M.F., et al., "3-D Stacked Image Sensor With Deep Neural Network Computation," IEEE Sensors Journal, IEEE Service Center, New York, NY, US, May 15, 2018, vol. 18 (10), pp. 4187-4199, XP011681876.
Cho K., et al., "A Low Power Dual CDS for a Column-Parallel CMOS Image Sensor," Journal of Semiconductor Technology and Science, Dec. 30, 2012, vol. 12 (4), pp. 388-396.
Chuxi L., et al., "A Memristor-Based Processing-in-Memory Architechture for Deep Convolutional Neural Networks Approximate Computation," Journal of Computer Research and Development, Jun. 30, 2017, vol. 54 (6), pp. 1367-1380.
Corrected Notice of Allowability dated Apr. 9, 2021 for U.S. Appl. No. 16/255,528, filed Jan. 23, 2019, 5 Pages.
Extended European Search Report for European Application No. 18179846.3, dated Dec. 7, 2018, 10 Pages.
Extended European Search Report for European Application No. 18179851.3, dated Dec. 7, 2018, 8 Pages.
Extended European Search Report for European Application No. 19743908.6, dated Sep. 30, 2020, 9 Pages.
Final Office Action dated Oct. 18, 2021 for U.S. Appl. No. 16/716,050, filed Dec. 16, 2019, 18 Pages.
Final Office Action dated Oct. 21, 2021 for U.S. Appl. No. 16/421,441, filed May 23, 2019, 23 Pages.
Final Office Action dated Jan. 27, 2021 for U.S. Appl. No. 16/255,528, filed Jan. 23, 2019, 31 Pages.
Final Office Action dated Jul. 28, 2021 for U.S. Appl. No. 17/083,920, filed Oct. 29, 2020, 19 Pages.
International Search Report and Written Opinion for International Application No. PCT/US2018/039350, dated Nov. 15, 2018, 11 Pages.
International Search Report and Written Opinion for International Application No. PCT/US2018/039352, dated Oct. 26, 2018, 8 Pages.
International Search Report and Written Opinion for International Application No. PCT/US2018/039431, dated Nov. 7, 2018, 12 Pages.
International Search Report and Written Opinion for International Application No. PCT/US2020/058097, dated Feb. 12, 2021, 09 Pages.
International Search Report and Written Opinion for International Application No. PCT/US2021/031201, dated Aug. 2, 2021, 13 Pages.
International Search Report and Written Opinion for International Application No. PCT/US2021/033321, dated Sep. 6, 2021, 11 pages.
Millet L., et al., "A 5500-Frames/s 85-GOPS/W 3-D Stacked BSI Vision Chip Based on Parallel In-Focal-Plane Acquisition and Processing," IEEE Journal of Solid-State Circuits, USA, Apr. 1, 2019, vol. 54 (4), pp. 1096-1105, XP011716786.
Non-Final Office Action dated Sep. 2, 2021 for U.S. Appl. No. 16/910,844, filed Jun. 24, 2020, 7 Pages.
Non-Final Office Action dated Jul. 10, 2020 for U.S. Appl. No. 16/255,528, filed Jan. 23, 2019, 27 Pages.
Non-Final Office Action dated Oct. 21, 2021 for U.S. Appl. No. 17/083,920, filed Oct. 29, 2020, 19 Pages.
Non-Final Office Action dated Nov. 23, 2018 for U.S. Appl. No. 15/847,517, filed Dec. 19, 2017, 21 Pages.
Non-Final Office Action dated Jul. 25, 2019 for U.S. Appl. No. 15/909,162, filed Mar. 1, 2018, 20 Pages.
Notice of Allowance dated Apr. 1, 2021 for U.S. Appl. No. 16/255,528, filed Jan. 23, 2019, 7 Pages.
Notice of Allowance dated Mar. 18, 2020 for U.S. Appl. No. 15/909,162, filed Mar. 1, 2018, 9 Pages.
Notice of Allowance dated Dec. 22, 2021 for U.S. Appl. No. 16/910,844, filed Jun. 24, 2020, 7 pages.
Notice of Allowance dated Nov. 24, 2021 for U.S. Appl. No. 16/910,844, filed Jun. 24, 2020, 8 pages.
Office Action dated Jul. 3, 2020 for Chinese Application No. 201810821296, filed Jul. 24, 2018, 17 Pages.
Office Action dated Mar. 9, 2021 for Chinese Application No. 201810821296, filed Jul. 24, 2018, 10 Pages.
Office Action dated Jun. 28, 2020 for Chinese Application No. 201810821296, filed Jul. 24, 2018, 2 Pages.
Partial European Search Report for European Application No. 18179838.0, dated Dec. 5, 2018, 13 Pages.
Restriction Requirement dated Feb. 2, 2021 for U.S. Appl. No. 16/716,050, filed Dec. 16, 2019, 7 Pages.
Sebastian A., et al., "Memory Devices and Applications for In-memory Computing," Nature Nanotechnology, Nature Publication Group, Inc, London, Mar. 30, 2020, vol. 15 (7), pp. 529-544, XP037194929.
Shi C., et al., "A 1000fps Vision Chip Based on a Dynamically Reconfigurable Hybrid Architecture Comprising a PE Array and Self-Organizing Map Neural Network," International Solid-State Circuits Conference, Session 7, Image Sensors, Feb. 10, 2014, pp. 128-130, XP055826878.
International Preliminary Report on Patentability for International Application No. PCT/US2020/044807, dated Feb. 17, 2022, 10 pages.
Notice of Allowance dated Feb. 14, 2022 for U.S. Appl. No. 16/715,792, filed Dec. 16, 2019, 9 pages.
Notice of Allowance dated Feb. 22, 2022 for U.S. Appl. No. 17/083,920, filed Oct. 29, 2020, 10 pages.
Invitation to Pay Additional Fees and Where Applicable, Protest Fee for International Application No. PCT/US2021/041775, Oct. 8, 2021, 12 pages.
Invitation to Pay Additional Fees and Where Applicable, Protest Fee for International Application No. PCT/US2021/041775, dated Oct. 8, 2021, 12 pages.
Notice of Allowance dated Jun. 17, 2022 for U.S. Appl. No. 16/715,792, filed Dec. 16, 2019, 2 pages.
Notice of Allowance dated Jun. 24, 2022 for U.S. Appl. No. 16/421,441, filed May 23, 2019, 17 pages.
Notice of Allowance dated Jun. 3, 2022 for U.S. Appl. No. 17/324,803, filed May 19, 2021, 6 pages.
Office Action dated Aug. 11, 2022 for European Patent Application No. 19731047.7, filed May 24, 2019, 10 pages.
Final Office Action dated Oct. 6, 2022 for U.S. Appl. No. 17/127,670, filed Dec. 18, 2020, 20 pages.
International Search Report and Written Opinion for International Application No. PCT/US2022/034259, dated Oct. 21, 2022, 10 pages.
Non-Final Office Action dated Nov. 2, 2022 for U.S. Appl. No. 16/983,863, filed Aug. 3, 2020, 20 pages.
Notice of Allowance dated Sep. 2, 2022 for U.S. Appl. No. 16/715,792, filed Dec. 16, 2019, 9 pages.
Notice of Allowance dated Sep. 6, 2022 for U.S. Appl. No. 16/421,441, filed May 23, 2019, 17 pages.
Notice of Allowance dated Sep. 8, 2022 for U.S. Appl. No. 17/324,803, filed May 19, 2021, 8 pages.
Notice of Allowance dated Sep. 9, 2022 for U.S. Appl. No. 17/083,920, filed Oct. 29, 2020, 10 pages.
Notice of Allowance dated Sep. 19, 2022 for U.S. Appl. No. 16/716,050, filed Dec. 16, 2019, 13 pages.
Notice of Allowance dated Sep. 28, 2022 for U.S. Appl. No. 16/716,050, filed Dec. 16, 2019, 6 pages.
Office Action dated Aug. 17, 2022 for Chinese Application No. 201980083991.5, filed Jun. 17, 2021, 24 pages.
Office Action dated Jul. 29, 2022 for Taiwan Application No. 108118209, filed May 27, 2019, 15 pages.
Non-Final Office Action dated Feb. 2, 2023 for U.S. Appl. No. 17/469,258, filed Sep. 8, 2021, 17 pages.
Notice of Allowance dated Jan. 3, 2023 for U.S. Appl. No. 16/421,441, filed May 23, 2019, 11 pages.
Notice of Allowance dated Jan. 3, 2023 for U.S. Appl. No. 16/715,792, filed Dec. 16, 2019, 9 pages.

(56) References Cited

OTHER PUBLICATIONS

Notice of Allowance dated Feb. 7, 2023 for U.S. Appl. No. 17/083,920, filed Oct. 29, 2020, 10 pages.
Notice of Allowance dated Feb. 8, 2023 for U.S. Appl. No. 17/324,803, filed May 19, 2021, 8 pages.
Notice of Allowance dated Jan. 26, 2023 for U.S. Appl. No. 16/716,050, filed Dec. 16, 2019, 14 pages.
Office Action dated Feb. 11, 2023 for Chinese Application No. 201980048866.0, filed May 24, 2019, 20 Pages.
Non-Final Office Action dated Mar. 6, 2023 for U.S. Appl. No. 17/992,648, filed Nov. 22, 2022, 24 pages.
Corrected Notice of Allowance dated Apr. 18, 2023 for U.S. Appl. No. 17/127,670, filed Mar. 5, 2021, 2 pages.
Final Office Action dated Apr. 12, 2023 for U.S. Appl. No. 16/983,863, filed Aug. 3, 2020, 21 pages.
International Search Report and Written Opinion for International Application No. PCT/US2023/011630, dated Apr. 6, 2023, 10 pages.
Notice of Allowance dated Jun. 7, 2023 for U.S. Appl. No. 16/716,050, filed Dec. 16, 2019, 18 pages.
Notice of Allowance dated May 15, 2023 for U.S. Appl. No. 16/421,441, filed May 23, 2019, 10 pages.
Notice of Allowance dated Apr. 19, 2023 for U.S. Appl. No. 16/715,792, filed Dec. 16, 2019, 9 pages.
Notice of Allowance dated May 22, 2023 for U.S. Appl. No. 17/324,803, filed May 19, 2021, 5 pages.
Notice of Allowance dated Mar. 27, 2023 for U.S. Appl. No. 17/127,670, filed Dec. 18, 2020,9 pages.
Office Action dated Feb. 13, 2023 for Taiwan Application No. 108146255, filed Dec. 17, 2019, 30 pages.
Office Action dated Mar. 14, 2023 for Taiwan Application No. 108146257, filed Dec. 17, 2019, 25 pages.
Office Action dated Mar. 23, 2023 for Chinese Application No. 201980083991.5, filed Jun. 17, 2021, 21 pages.
Amir M.F., et al., "NeuroSensor: A 3D Image Sensor with Integrated Neural Accelerator," IEEE SOI-3D-Subthreshold Microelectronics Technology Unified Conference (S3S), Oct. 2016, pp. 1-2.
Devlin N.R., et al., "Patterning Decomposable Polynorbornene with Electron Beam Lithography to Create Nanochannels," Journal of Vacuum Science and Technology, vol. 27, No. 6, Dec. 1, 2009, pp. 2508-2511.
Dong J., et al., "Self-Assembly of Highly Stable Zirconium(IV) Coordination Cages with Aggregation Induced Emission Molecular Rotors for Live-Cell Imaging," Angewandte Chemie International Edition, vol. 59, No. 25, Jun. 15, 2020,10 pages.
Final Office Action dated Sep. 25, 2023 for U.S. Appl. No. 17/469,258, filed Sep. 8, 2021, 17 pages.
International Preliminary Report on Patentability for International Application No. PCT/US2020/058439, dated Jun. 23, 2022, 11 pages.
International Preliminary Report on Patentability for International Application No. PCT/US2020/059560, dated Jun. 16, 2022, 8 pages.
International Preliminary Report on Patentability for International Application No. PCT/US2020/061218, dated Jun. 9, 2022, 9 pages.
International Preliminary Report on Patentability for International Application No. PCT/US2020/062991, dated Jul. 7, 2022, 8 pages.
International Preliminary Report on Patentability for International Application No. PCT/US2020/066992, dated Jul. 7, 2022, 27 pages.
International Preliminary Report on Patentability for International Application No. PCT/US2021/014970, dated Sep. 9, 2022, 7 pages.
International Preliminary Report on Patentability for International Application No. PCT/US2021/016158, dated Aug. 18, 2022, 7 pages.
International Search Report and Written Opinion for International Application No. PCT/US2020/056758, dated Feb. 17, 2021, 11 Pages.
International Search Report and Written Opinion for International Application No. PCT/US2020/058439, dated Apr. 6, 2021, 16 Pages.
International Search Report and Written Opinion for International Application No. PCT/US2020/059560, dated Feb. 9, 2021, 9 Pages.
International Search Report and Written Opinion for International Application No. PCT/US2020/061218, dated Feb. 16, 2021, 11 pages.
International Search Report and Written Opinion for International Application No. PCT/US2020/062991, dated Feb. 24, 2021, 9 Pages.
International Search Report and Written Opinion for International Application No. PCT/US2020/066992, dated May 17, 2021, 31 Pages.
International Search Report and Written Opinion for International Application No. PCT/US2021/014970, dated Apr. 26, 2021,8 Pages.
Khaled S.R., "A Review of Piezoelectric Polymers as Functional Materials for Electromechanical Transducers," Smart Materials and Structures, IOP Publishing LTD, Bristol, GB, Jan. 20, 2014 [retrieved on Jan. 20, 2014], vol. 23 (3), Article 33001,29 pages, XP020258249, ISSN: 0964-1726, DOI: 10.1088/0964-1726/23/3/033001.
Levola T., "Diffractive Optics for Virtual Reality Displays," Journal of the Society for Information Display—SID, May 2006, vol. 14 (5), pp. 467-475, XP008093627.
Non-Final Office Action dated Jul. 22, 2021 for U.S. Appl. No. 16/834,605, filed Mar. 30, 2020, 12 pages.
Non-Final Office Action dated Jun. 30, 2023 for U.S. Appl. No. 17/556,436, filed Dec. 20, 2021,25 pages.
Notice of Allowance dated Sep. 12, 2023 for U.S. Appl. No. 17/324,803, filed May 19, 2021, 2 pages.
Notice of Allowance dated Sep. 15, 2023 for U.S. Appl. No. 16/716,050, filed Dec. 16, 2019, 18 pages.
Notice of Allowance dated Aug. 16, 2023 for U.S. Appl. No. 16/715,792, filed Dec. 16, 2019, 9 pages.
Notice of Allowance dated Aug. 22, 2023 for U.S. Appl. No. 17/992,648, filed Nov. 22, 2022, 10 pages.
Notice of Allowance dated Mar. 22, 2022 for U.S. Appl. No. 16/834,605, filed Mar. 30, 2020, 8 pages.
Notice of Allowance dated Aug. 30, 2023 for U.S. Appl. No. 17/324,803, filed May 19, 2021, 5 pages.
Notice of Allowance dated May 31, 2022 for U.S. Appl. No. 16/706,859, filed Dec. 9, 2019, 13 pages.
Office Action dated Sep. 5, 2023 for Japanese Patent Application No. 2020-561752, filed on Nov. 2, 2020, 5 pages.
Office Action dated Sep. 20, 2023 for Taiwan Application No. 109139740, filed Nov. 13, 2020, 17 pages.

* cited by examiner

SPARSE IMAGE SENSING AND PROCESSING

RELATED APPLICATION

This patent application claims priority to U.S. Provisional Patent Application Ser. No. 62/932,067, titled "EFFICIENT HARDWARE ACCELERATOR FOR SPARSE SENSOR" and filed on Nov. 7, 2019, which is assigned to the assignee hereof and is incorporated herein by reference in its entirety for all purposes.

BACKGROUND

A typical image sensor includes an array of pixel cells. Each pixel cell may include a photodiode to sense light by converting photons into charge (e.g., electrons or holes). The charge converted at each pixel cell can be quantized to become a digital pixel value, and an image can be generated from an array of digital pixel values.

The images generated by the image sensor can be processed to support different applications such as, for example, a virtual-reality (VR) application, an augmented-reality (AR), or a mixed reality (MR) application. An image-processing operation can then be performed on the images to detect a certain object of interest and its locations in the images. Based on the detection of the object as well as its locations in the images, the VR/AR/MR application can generate and update, for example, virtual image data for displaying to the user via a display, audio data for outputting to the user via a speaker, etc., to provide an interactive experience to the user.

To improve spatial and temporal resolution of an image operation, an image sensor typically includes a large number of pixel cells and generates images at a high frame rate. The generation of high-resolution image frames at a high frame rate, as well as the transmission and processing of these high-resolution image frames, can lead to huge power consumption by the image sensor and by the image process operation. Moreover, given that typically only a small subset of the pixel cells receive light from the object of interest, a lot of the power is wasted in generating, transmitting, and processing pixel data that are not useful for the object detection/tracking operation, which degrades the overall efficiency of the image sensing and processing operations.

SUMMARY

The present disclosure relates to an image sensor. More specifically, and without limitation, this disclosure relates to techniques to perform sparse image sensing and processing operations.

In one example, an apparatus provided. The apparatus comprises an image sensor, a frame buffer, and a sensor compute circuit. The image sensor comprises a plurality of pixel cells, the image sensor being configurable by programming data to select a subset of the pixel cells to generate active pixels. The sensor compute circuit is configured to: receive, from the frame buffer, a first image frame comprising first active pixels and first inactive pixels, the first active pixels being generated by a first subset of the pixel cells selected based on first programming data, the first inactive pixels corresponding to a second subset of the pixel cells not selected to generate the first active pixels; perform an image-processing operation on a first subset of pixels of the first image frame, whereby a second subset of pixels of the first image frame are excluded from the image-processing operation, to generate a processing output; based on the processing output, generate second programming data; and transmit the second programming data to the image sensor to select a second subset of the pixel cells to generate second active pixels for a second image frame.

In some aspects, the image-processing operation comprises a processing operation by a neural network model to detect an object of interest in the first image frame. The first subset of pixels correspond to the object of interest.

In some aspects, the sensor compute circuit is coupled with a host device configured to execute an application that uses a result of the detection of the object of interest. The host device is configured to provide information about the object of interest to the sensor compute circuit.

In some aspects, the sensor compute circuit comprises: a compute memory configured to store: input data to a neural network layer of the neural network, weight data of the neural network layer, and intermediate output data of the neural network layer; a data processing circuit configured to perform arithmetic operations of the neural network layer on the input data and the weight data to generate the intermediate output data; and a compute controller configured to: fetch, from the compute memory, a first subset of the input data and a first subset of the weight data corresponding to the first subset of the input data, the first subset of the input data corresponding to at least some of the first active pixels; control the data processing circuit to perform the arithmetic operations on the first subset of the input data and the first subset of the weight data to generate a first subset of the intermediate output data for the first image frame, the first subset of the intermediate output data corresponding to the first subset of the input data; store the first subset of the intermediate output data for the first image frame in the compute memory; and store a predetermined value for a second subset of the intermediate output data for the first image frame in the compute memory, the second subset of the intermediate output data corresponding to the non-active pixels.

In some aspects, the predetermined value is stored based on resetting the compute memory prior to the image-processing operation.

In some aspects, the compute controller is configured to: fetch the input data from the compute memory; identify, from the fetched input data, the first subset of the input data; and provide the identified first subset of the input data to the compute controller.

In some aspects, the compute controller is configured to: determine an address region of the compute memory that stores the first subset of the input data; and fetch the first subset of the input data from the compute memory.

In some aspects, the address region is determined based on at least one of: the first programming data, or information about connectivity between neural network layers of the neural network model.

In some aspects, the first active pixels include static pixels and non-static pixels; the static pixels correspond to a first subset of the first active pixels for which degrees change of the pixel values between the first image frame and a prior image frame are above a change threshold; the non-static pixels correspond to a second subset of the first active pixels for which degrees change of the pixel values between the first image frame and the prior image frame are below the change threshold; and the compute controller is configured to fetch the first subset of the input data corresponding to the non-static pixels of the first active pixels.

In some aspects, the predetermined value is a first predetermined value. The frame buffer is configured to store a second predetermined value for each of the static pixels to signal the static pixels. The compute controller is configured to exclude the static pixels from the data processing circuit based on detecting that the static pixels have the second predetermined value.

In some aspects, the frame buffer is configured to store the second predetermined value for a pixel based on determining that the degree of change of the pixel across a threshold number of frames is below the change threshold.

In some aspects, the frame buffer is configured to set update a pixel value of a pixel based on a leaky integrator function having a time constant, and based on when the pixel last experiences a degree of change greater than the change threshold.

In some aspects, the compute controller is configured to: determine, based on a topology of the neural network model, a data change propagation map that indicates how changes in the non-static pixels propagate through different neural network layers of the neural network model; determine, based on the data change propagation map, a first address region of the compute memory to fetch the first subset of the input data and a second address region of the compute memory to store the first subset of the intermediate output data; fetch the first subset of the input data from the first address region; and store the first subset of the intermediate output data at the second address region.

In some aspects, the compute controller is configured to determine the change threshold based on a depth of the neural network model and a quantization precision at each neural network layer of the neural network model.

In some aspects, the change threshold is a first change threshold. The compute controller is configured to: track the degree of change of the pixel values of the first active pixels between two non-consecutive frames; and determine a third subset of the first active pixels as non-static pixels based on the degree of change exceeding a second change threshold.

In some aspects, the image sensor is implemented in a first semiconductor substrate. The frame buffer and the sensor compute circuit are implemented in one or more second semiconductor substrates. The first semiconductor substrate and the one or more second semiconductor substrates form a stack and housed in a single semiconductor package.

In some examples, a method is provided. The method comprises: transmitting first programming data to an image sensor comprising a plurality of pixel cells to select a first subset of the pixel cells to generate first active pixels; receiving, from a frame buffer, a first image frame comprising the first active pixels and first inactive pixels, the first inactive pixels corresponding to a second subset of the pixel cells not selected to generate the first active pixels; performing an image-processing operation a first subset of pixels of the first image frame, whereby a second subset of pixels of the first image frame are excluded from the image-processing operation, to generate a processing output; based on the processing output, generating second programming data; and transmitting the second programming data to the image sensor to select a second subset of the pixel cells to generate second active pixels for a second image frame.

In some aspects, the image-processing operation comprises a processing operation by a neural network to detect an object of interest in the first image frame. The first subset of pixels correspond to the object of interest.

In some aspects, the method further comprises: storing, in a compute memory, input data to a neural network layer of the neural network, weight data of the neural network layer; fetching, from the compute memory, a first subset of the input data and a first subset of the weight data corresponding to the first subset of the input data, the first subset of the input data corresponding to at least some of the first active pixels; performing, using a data processing circuit, arithmetic operations on the first subset of the input data and the first subset of the weight data to generate a first subset of intermediate output data for the first image frame, the first subset of the intermediate output data corresponding to the first subset of the input data; storing, in the compute memory, the first subset of the intermediate output data for the first image frame; and storing, in the compute memory, a predetermined value for a second subset of the intermediate output data for the first image frame, the second subset of the intermediate output data corresponding to the non-active pixels.

In some aspects, the first active pixels include static pixels and non-static pixels. The static pixels correspond to a first subset of the first active pixels for which degrees change of the pixel values between the first image frame and a prior image frame are above a change threshold. The non-static pixels correspond to a second subset of the first active pixels for which degrees change of the pixel values between the first image frame and the prior image frame are below the change threshold. The first subset of the input data correspond to the non-static pixels of the first active pixels.

BRIEF DESCRIPTION OF THE DRAWINGS

Illustrative examples are described with reference to the following figures.

Figure 1A:
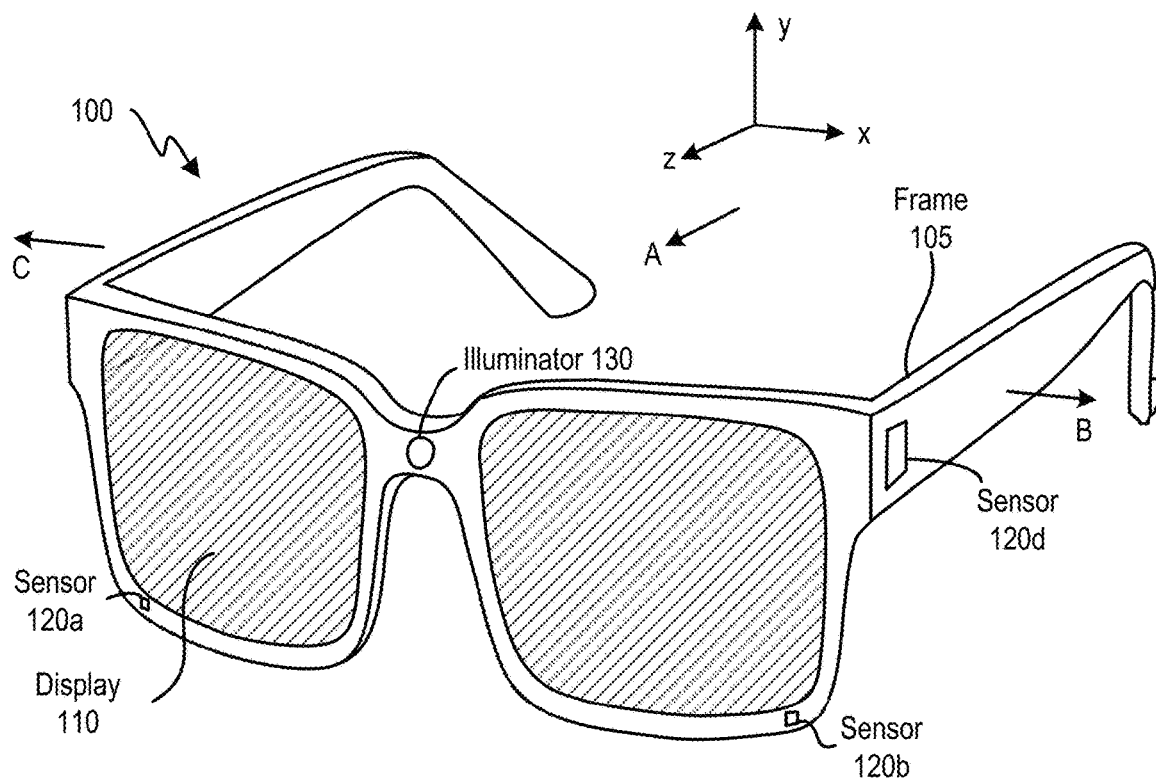
FIG. 1A and FIG. 1B are diagrams of an example of a near-eye display.
Figure 1A:
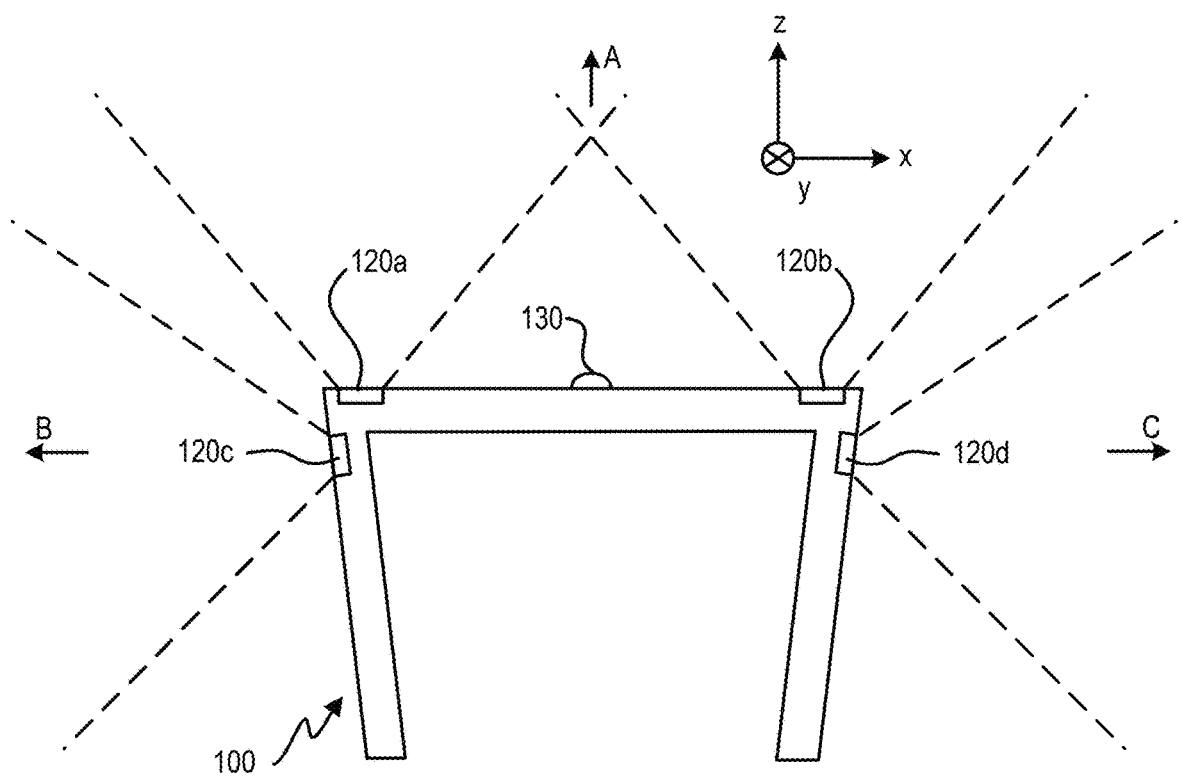

The figures depict examples of the present disclosure for purposes of illustration only. One skilled in the art will readily recognize from the following description that alternative examples of the structures and methods illustrated may be employed without departing from the principles of or benefits touted in this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth to provide a thorough understanding of certain inventive examples. However, it will be apparent that various examples may be practiced without these specific details. The figures and description are not intended to be restrictive.

As discussed above, an image sensor typically includes a large number of pixel cells and generates images at a high frame rate, to improve the spatial and temporal resolution of an imaging operation. But the generation of high resolution image frames at a high frame rate, as well as the transmission and processing of these high resolution image frames, can lead to huge power consumption by the image sensor and by the image process operation. Moreover, given that typically only a small subset of the pixel cells receive light from the object of interest, a lot of the power is wasted in generating, transmitting, and processing pixel data that are not useful for the object detection/tracking operation, which degrades the overall efficiency of the image sensing and processing operations.

This disclosure proposes image sensing and processing techniques that can address at least some of the issues above. In some examples, an apparatus comprises an image sensor, a frame buffer, and a compute circuit. The image sensor comprises a plurality of pixel cells, the image sensor being configurable by programming data to select a subset of the pixel cells to generate active pixels. The frame buffer can store a first image frame comprising at least some of the active pixels generated by a first subset of the pixel cells selected by the image sensor based on first programming data. The first image frame further comprises inactive pixels corresponding to a second subset of the pixel cells not selected to generate active pixels. The compute circuit can receive the first image frame from the frame buffer. The compute circuit can include an image processor to perform an image-processing operation on a first subset of pixels of the first image frame, whereby a second subset of pixels of the first image frame are excluded from the image-processing operation, to generate processing outputs. The compute circuit further includes a programming map generator to generate second programming data based on the processing outputs from the image processor, and transmit the second programming data to the image sensor to select a second subset of the pixel cells to output pixel data for a second image frame. The first subset of pixels of the first image frame on which the image-processing operation is performed can correspond to, for example, the active pixels, non-static pixels that experience a certain degree of changes between frames, etc.

In some examples, the apparatus can support an object detection and tracking operation based on a sparse image sensing operation. The first subset of pixel cells can be selectively enabled to only capture pixel data relevant for tracking and detecting the object as active pixels, or to only transmit the active pixels to the frame buffer, to support a sparse image sensing operation. As only a subset of pixel cells are enabled to generate and/or transmit active pixels, the volume of pixel data generated/transmitted for an image frame can be reduced, which can reduce the power consumption at the image sensor. The sparse image sensing operation can be continuously adjusted based on the result of the object detection and tracking operation, to account for a relative movement of the object with respect to the image sensor, which can improve the likelihood of the active pixels including image data of the object and improve the performance of applications (e.g., VR/AR/MR applications) that rely on the object detection and tracking operation. In addition, the compute circuit performs the image-processing operation only on active pixels, or a subset of the active pixels, that are likely to include image data of the object while the inactive pixels are excluded from the image-processing operation, which can further reduce the power consumption of the image process operation. All these can improve the overall power and computation efficiencies and performance of the image sensing and processing operations.

In some examples, the image-processing operation can include a neural network operation. Specifically, the image processor can include a data processing circuit to provide hardware acceleration for a neural network operation, such as a multi-layer convolutional neural network (CNN) including an input layer and an output layer. The image processor can include a compute memory to store the input image frame and a set of weights associated with each neural network layer. The set of weights can represent features of the object to be detected. The image processor can include a controller to control the data processing circuit to fetch the input image frame data and the weights from the compute memory. The controller can control the data processing circuit to perform arithmetic operations, such as multiply-and-accumulate (MAC) operations, between an input image frame and the weights to generate intermediate output data for the input layer. The intermediate output data are be post-processed based on, for example, an activation function, pooling operation, etc., and then the post-processed intermediate output data can be stored in the compute memory. The post-processed intermediate output data can be fetched from the compute memory and provided to the next neural network layer as inputs. The arithmetic operations, as well as fetching and storage of intermediate output data, are repeated for all the layers up to the output layer to generate the neural network outputs. The neural network output can indicate, for example, a likelihood of the object being present in the input image frame, and the pixel locations of the object in the input image frame.

The controller can configure the data processing circuit to process the sparse image data in an efficient manner. For example, for the input layer, the controller can control the data processing circuit to only fetch the active pixels and corresponding weights from the compute memory, and to perform the MAC operations only on the active pixels and the corresponding weights to generate a subset of the intermediate output corresponding to the active pixels for the input layer. The controller can also determine, based on the topology of the neural network and the connections among subsequent neural network layers, a subset of intermediate output data at each subsequent neural network that can be traced back to active pixels. The controller can control the data processing circuit to perform the MAC operations to only generate the subsets of intermediate output data at each subsequent neural network layer. In addition, to reduce the access of compute memory, a predetermined value (e.g., zero) for the intermediate output data for each layer can be stored in the compute memory prior to the neural network operation. Only the intermediate output data for active pixels are updated. All these can reduce the power consumption by the neural network operations over the sparse image data.

In some examples, to further reduce power consumption and improve power and computation efficiencies, the frame buffer and the compute circuit can support a temporal sparsity operation. As part of the temporal sparsity operation, pixels that are static and pixels that are non-static can be identified. The static pixels can correspond to a first part of a scene captured by the image sensor that which experience a small change (or no change) between the first image frame and a prior image frame, whereas the non-static pixels correspond to a second part of the scene that experience a large change between the first image frame and the prior image frame. A pixel can be determined to be static if the degree of change of the pixel is below a threshold. In some examples, non-static pixels can be identified from active pixels, whereas static pixels can be identified from both active pixels, as well as inactive pixels which remain inactive (and no change) between frames.

To reduce power consumption, the data processing circuit can perform the image-processing operations (e.g., neural network operations) only on the non-static pixels of the first image frame to generate updated outputs for the non-static pixels. For the static pixels, the image-processing operations can be skipped, while the outputs from the image-processing operations on the prior image frame can be retained. In a case where the image-processing operations comprise neural network operations, the controller can control the data processing circuit to only fetch the non-static pixels and the corresponding weights data from the compute memory to update the subset of intermediate output data corresponding to the non-static pixels for the input layer. The rest of the intermediate output data corresponding to the static pixels (obtained from prior image frame) and corresponding to the non-active pixels (e.g., having predetermined values such as zero) in the compute memory can be retained for the input layer. The controller can also determine based on the topology of the neural network and the connections among subsequent neural network layers a subset of intermediate output data at each subsequent neural network that can be traced back to non-static pixels, and only update the subsets of intermediate output data, to reduce access to the compute memory and to reduce power consumption.

In some examples, the frame buffer can detect static pixels from the active pixels output by the image sensor, and store pixel values for those pixels to signal to the image processor that those pixels are static pixels. For example, the frame buffer can store the most recent pixel data (including active and inactive pixels) from each pixel cell of the image sensor as the first image frame. For each pixel of the active pixels, the frame buffer can determine a degree of change of the pixel with respect to a prior frame, such as the image frame immediately before the first image frame. The frame buffer can set a pixel value to indicate a static pixel in various ways. For example, the frame buffer can set a pixel value for the pixel in the frame buffer based on a leaky integrator function having a time constant, and based on a number of consecutive image frames across which the pixel, output by the image sensor, has remained static. If the pixel has remained static for a large number of consecutive image frames, the pixel value of the pixel can settle at a predetermined pixel value. As another example, if the pixel has remained static for a threshold number of consecutive image frames (e.g., 10), the frame buffer can set a predetermined pixel value for the pixel in the frame buffer. The predetermined pixel value can correspond to a dark color (zero), a white color (255), a gray color (128), or any value that indicate a static pixel. In all these cases, the image processor can distinguish between static pixels and non-static pixels based on identifying pixel values that signal static pixels, and perform the image-processing operations only on the non-static pixels as described above.

In some examples, the image processor can also generate additional information to facilitate the processing of non-static pixels. For example, the image processor can determine a data change propagation map that tracks the propagation of data change from the input layer to the output layer of the neural network model based on the model's topology. Based on the propagation map, as well as the static pixels from the frame buffer, the image processor can identify input data for each neural network that are non-static, and only fetch those input data for the neural network operations at each layer. In addition, the image processor can also determine the threshold degree of change for static/non-static pixel determination based on the topology of the neural network model to ensure that the pixels determined to be non-static can lead to a requisite degree of change at the output layer. In addition, the image processor can also track the changes in the pixels between consecutive frames and between non-consecutive frames. The image processor can identify pixels that exhibit small changes between consecutive frames but also identify huge changes between non-consecutive frames as non-static pixels so that the image processor can perform image-processing operations on those pixels.

With the disclosed techniques, an image sensor can be configured to perform a sparse image sensing operation to generate sparse images, which can reduce power consumption at the image sensor. Moreover, an image processor can be configured to perform image-processing operations only on active and/or non-static pixels, while skipping the image-processing operations on the inactive and/or static pixels, which can further reduce power consumption. Moreover, the selection of the pixel cells to generate active pixels can be based on the image processing results to ensure that active pixels contain the relevant information (e.g., image of an object of interest). All these can improve the power and computation efficiencies of the image sensor and the image processor.

The disclosed techniques may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some examples, artificial reality may also be associated with applications, products, accessories, services, or some combination thereof, that are used to, for example, create content in an artificial reality and/or are otherwise used in (e.g., perform activities) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an example of a near-eye display 100. Near-eye display 100 presents media to a user. Examples of media presented by near-eye display 100 include one or more images, video, and/or audio. In some examples, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some examples, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some examples, display 110 comprises a waveguide display assembly for directing light from one or more images to an eye of the user.

Near-eye display 100 further includes image sensors 120*a*, 120*b*, 120*c*, and 120*d*. Each of image sensors 120*a*, 120*b*, 120*c*, and 120*d* may include a pixel array configured to generate image data representing different fields of views along different directions. For example, sensors 120*a* and 120*b* may be configured to provide image data representing two fields of view towards a direction A along the Z axis, whereas sensor 120*c* may be configured to provide image data representing a field of view towards a direction B along the X axis, and sensor 120*d* may be configured to provide image data representing a field of view towards a direction C along the X axis.

In some examples, sensors 120*a*-120*d* can be configured as input devices to control or influence the display content of the near-eye display 100, to provide an interactive VR/AR/MR experience to a user who wears near-eye display 100. For example, sensors 120*a*-120*d* can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some examples, the location tracking system may operate a simultaneous localization and mapping (SLAM) algorithm to track a set of objects in the physical environment and within a field of view of the user as the user moves within the physical environment. The location tracking system can construct and update a map of the physical environment based on the set of objects, and track the location of the user within the map. By providing image data corresponding to multiple fields of view, sensors 120*a*-120*d* can provide the location tracking system with a more holistic view of the physical environment, which can lead to more objects included in the construction and updating of the map. With such an arrangement, the accuracy and robustness of tracking a location of the user within the physical environment can be improved.

In some examples, near-eye display 100 may further include one or more active illuminators 130 to project light into the physical environment. The light projected can be associated with different frequency spectrums (e.g., visible light, infrared (IR) light, ultraviolet light), and can serve various purposes. For example, illuminator 130 may project light in a dark environment (or in an environment with low intensity of (IR) light, ultraviolet light, etc.) to assist sensors 120*a*-120*d* in capturing images of different objects within the dark environment to, for example, enable location tracking of the user. Illuminator 130 may project certain markers onto the objects within the environment, to assist the location tracking system in identifying the objects for map construction/updating.

In some examples, illuminator 130 may also enable stereoscopic imaging. For example, one or more of sensors 120*a* or 120*b* can include both a first pixel array for visible light sensing and a second pixel array for (IR) light sensing. The first pixel array can be overlaid with a color filter (e.g., a Bayer filter), with each pixel of the first pixel array being configured to measure intensity of light associated with a particular color (e.g., one of red, green or blue (RGB) colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120*a*-120*d* may need to have a wide dynamic range to be able to operate properly (e.g., to generate an output that correlates with the intensity of incident light) across a very wide range of light intensities associated with different operating environments for near-eye display 100.

Figure 1B:
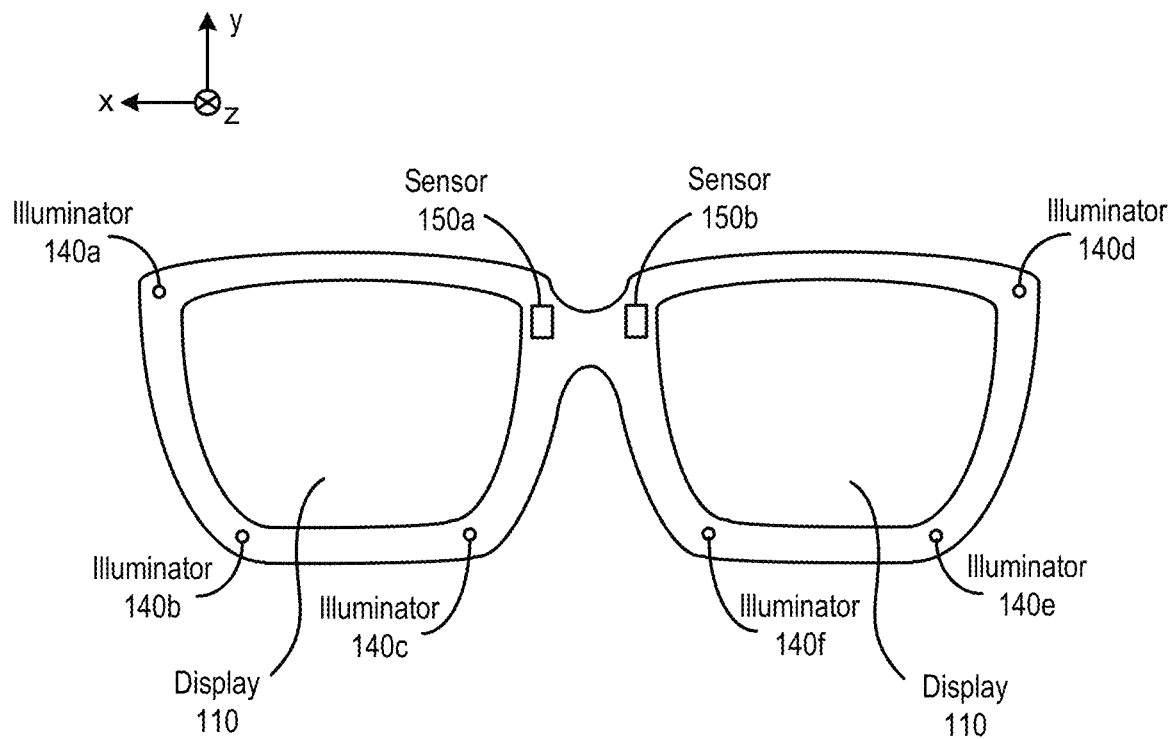
Figure 1B:
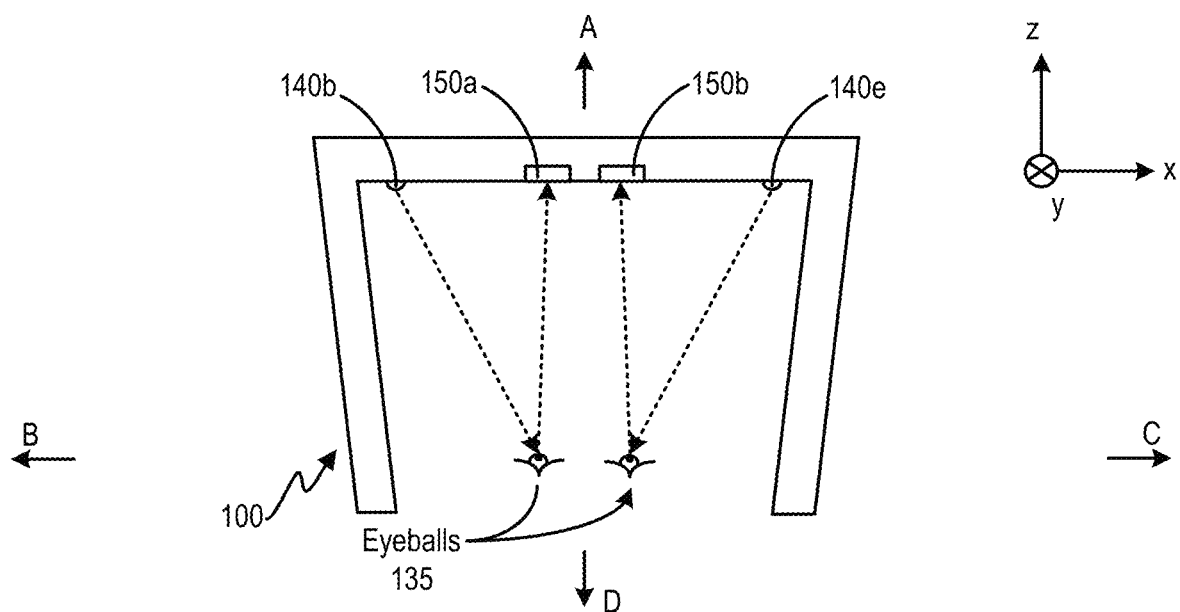

FIG. 1B is a diagram of another example of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140*a*, 140*b*, 140*c*, 140*d*, 140*e*, and 140*f*. Near-eye display 100 further includes a plurality of image sensors 150*a* and 150*b*. Illuminators 140*a*, 140*b*, and 140*c* may emit lights of certain frequency range (e.g., near-infra red (NIR)) towards direction D (which is opposite to direction A of FIG. 1A). The emitted light may be associated with a certain pattern, and can be reflected by the left eyeball of the user. Sensor 150*a* may include a pixel array to receive the reflected light and generate an image of the reflected pattern. Similarly, illuminators 140*d*, 140*e*, and 140*f* may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 2:
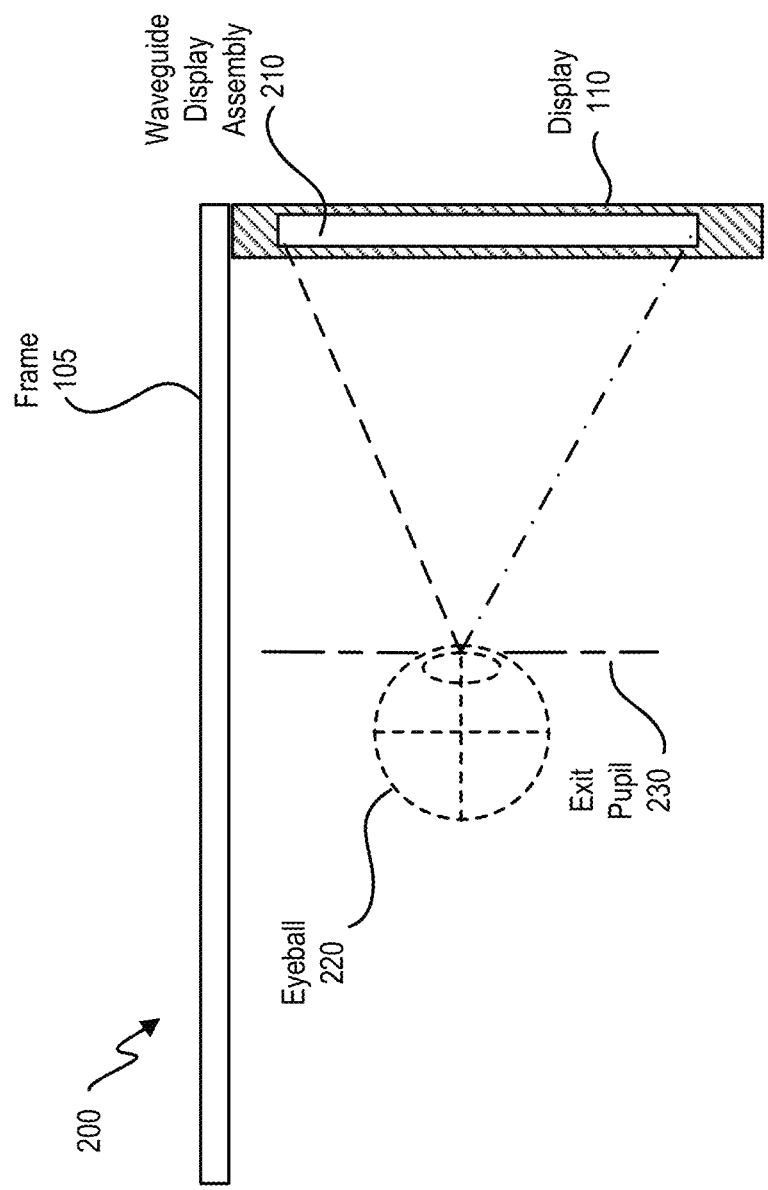
FIG. 2 is an example of a cross section of the near-eye display.

FIG. 2 is an example of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass) with one or more refractive indices. In some examples, near-eye display 100 includes one or more optical elements between waveguide display assembly 210 and eyeball 220.

In some examples, waveguide display assembly 210 includes a stack of one or more waveguide displays including, but not restricted to, a stacked waveguide display, a varifocal waveguide display, etc. The stacked waveguide display is a polychromatic display (e.g., a RGB display) created by stacking waveguide displays whose respective monochromatic sources are of different colors. The stacked waveguide display is also a polychromatic display that can be projected on multiple planes (e.g., multiplanar colored display). In some configurations, the stacked waveguide display is a monochromatic display that can be projected on multiple planes (e.g., multiplanar monochromatic display). The varifocal waveguide display is a display that can adjust a focal position of image light emitted from the waveguide display. In alternate examples, waveguide display assembly 210 may include the stacked waveguide display and the varifocal waveguide display.

Figure 3:
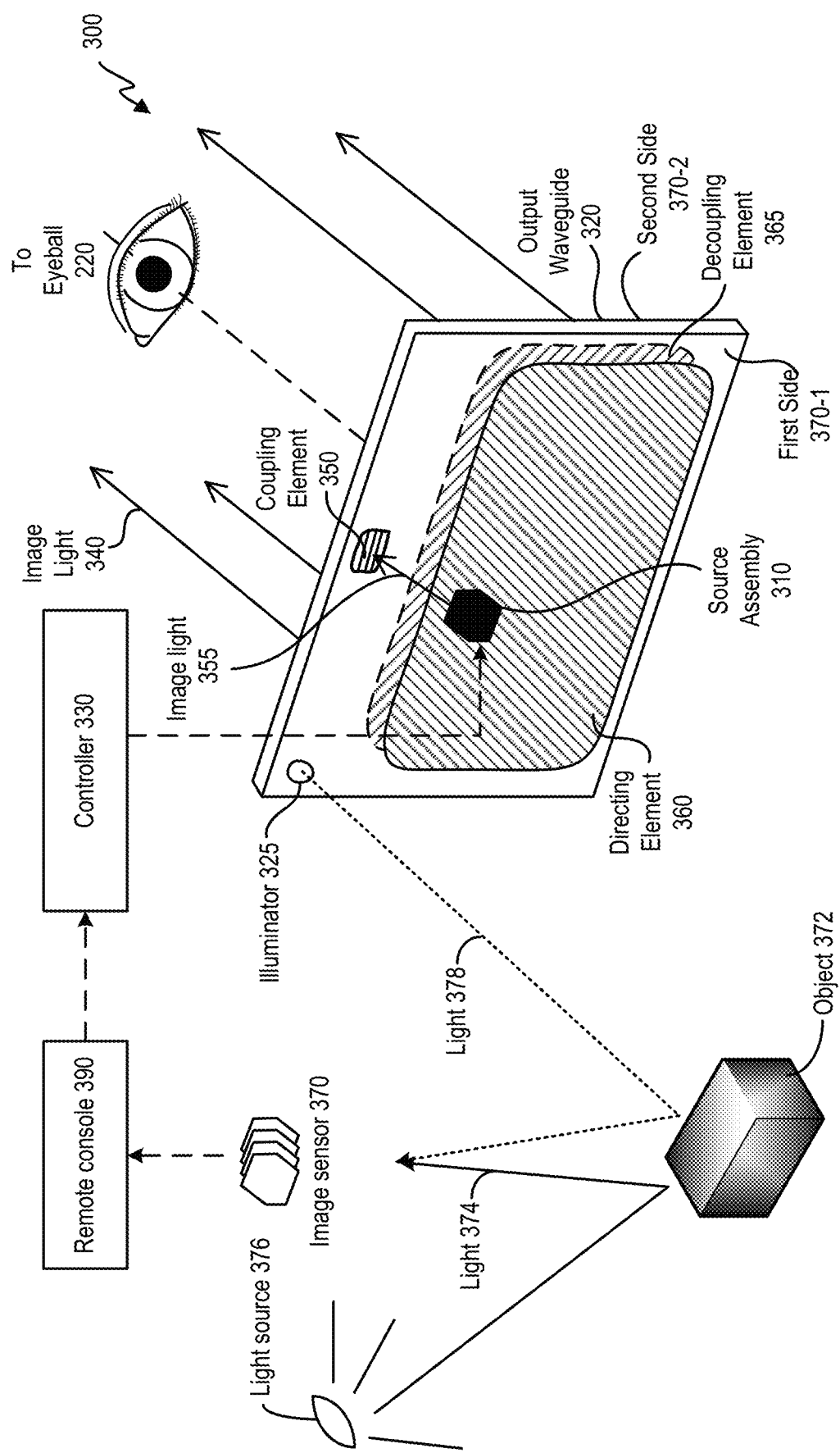
FIG. 3 illustrates an isometric view of an example of a waveguide display with a single source assembly.

FIG. 3 illustrates an isometric view of an example of a waveguide display 300. In some examples, waveguide display 300 is a component (e.g., waveguide display assembly 210) of near-eye display 100. In some examples, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some examples, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some examples, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, the first side 370-1 of output waveguide 320. Decoupling element 365 is part of, or affixed to, the second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and ay-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some examples, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A. Image sensors 120a-120d can be operated to perform 2D sensing and 3D sensing of, for example, an object 372 in front of the user (e.g., facing first side 370-1). For 2D sensing, each pixel cell of image sensors 120a-120d can be operated to generate pixel data representing an intensity of light 374 generated by a light source 376 and reflected off object 372. For 3D sensing, each pixel cell of image sensors 120a-120d can be operated to generate pixel data representing a time-of-flight measurement for light 378 generated by illuminator 325. For example, each pixel cell of image sensors 120a-120d can determine a first time when illuminator 325 is enabled to project light 378 and a second time when the pixel cell detects light 378 reflected off object 372. The difference between the first time and the second time can indicate the time-of-flight of light 378 between image sensors 120a-120d and object 372, and the time-of-flight information can be used to determine a distance between image sensors 120a-120d and object 372. Image sensors 120a-120d can be operated to perform 2D and 3D sensing at different times, and provide the 2D and 3D image data to a remote console 390 that may be (or may be not) located within waveguide display 300. The remote console may combine the 2D and 3D images to, for example, generate a 3D model of the environment in which the user is located, to track a location and/or orientation of the user, etc. The remote console may determine the content of the images to be displayed to the user based on the information derived from the 2D and 3D images. The remote console can transmit instructions to controller 330 related to the determined content. Based on the instructions, controller 330 can control the generation and outputting of image light 355 by source assembly 310, to provide an interactive experience to the user.

Figure 4:
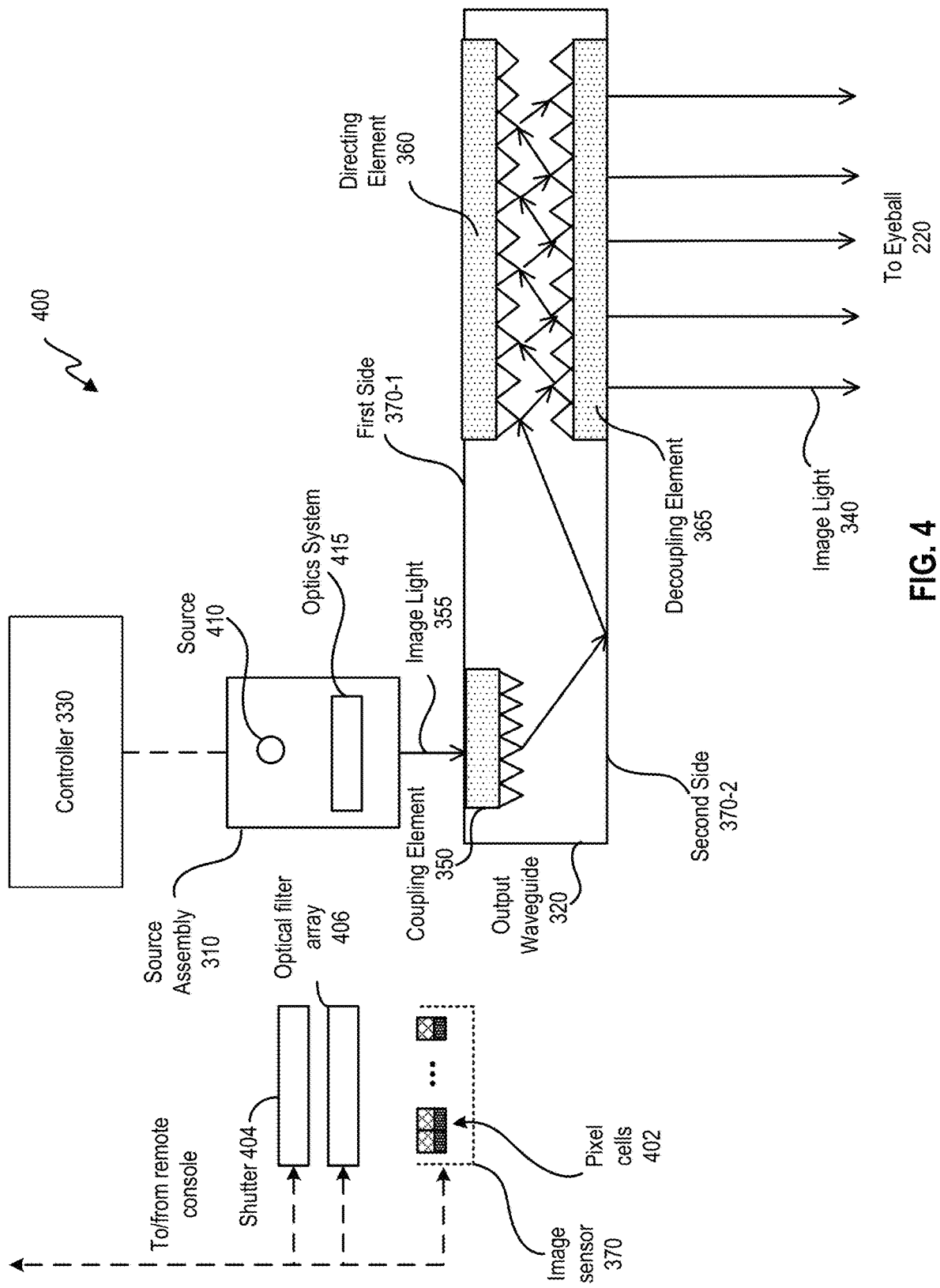
FIG. 4 illustrates a cross section of an example of the waveguide display.

FIG. 4 illustrates an example of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some examples, there can be a mechanical shutter 404 and an optical filter array 406 interposed between the set of pixel cells 402 and the physical environment. Mechanical shutter 404 can control the exposure of the set of pixel cells 402. In some examples, the mechanical shutter 404 can be replaced by an electronic shutter gate, as to be discussed below. Optical filter array 406 can control an optical wavelength range of light the set of pixel cells 402 is exposed to, as to be discussed below. Each of pixel cells 402 may correspond to one pixel of the image. Although not shown in FIG. 4, it is understood that each of pixel cells 402 may also be overlaid with a filter to control the optical wavelength range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some examples, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In examples where coupling element 350 is a diffraction grating, a pitch of the diffraction grating is chosen such that total internal reflection occurs in output waveguide 320 and image light 355 propagates internally in output waveguide 320 (e.g., by total internal reflection) toward decoupling element 365.

Directing element 360 redirects image light 355 toward decoupling element 365 for decoupling from output waveguide 320. In examples where directing element 360 is a diffraction grating, the pitch of the diffraction grating is chosen to cause incident image light 355 to exit output waveguide 320 at angle(s) of inclination relative to a surface of decoupling element 365.

In some examples, directing element 360 and/or decoupling element 365 are structurally similar. Expanded image light 340 exiting output waveguide 320 is expanded along one or more dimensions (e.g., may be elongated along x-dimension). In some examples, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
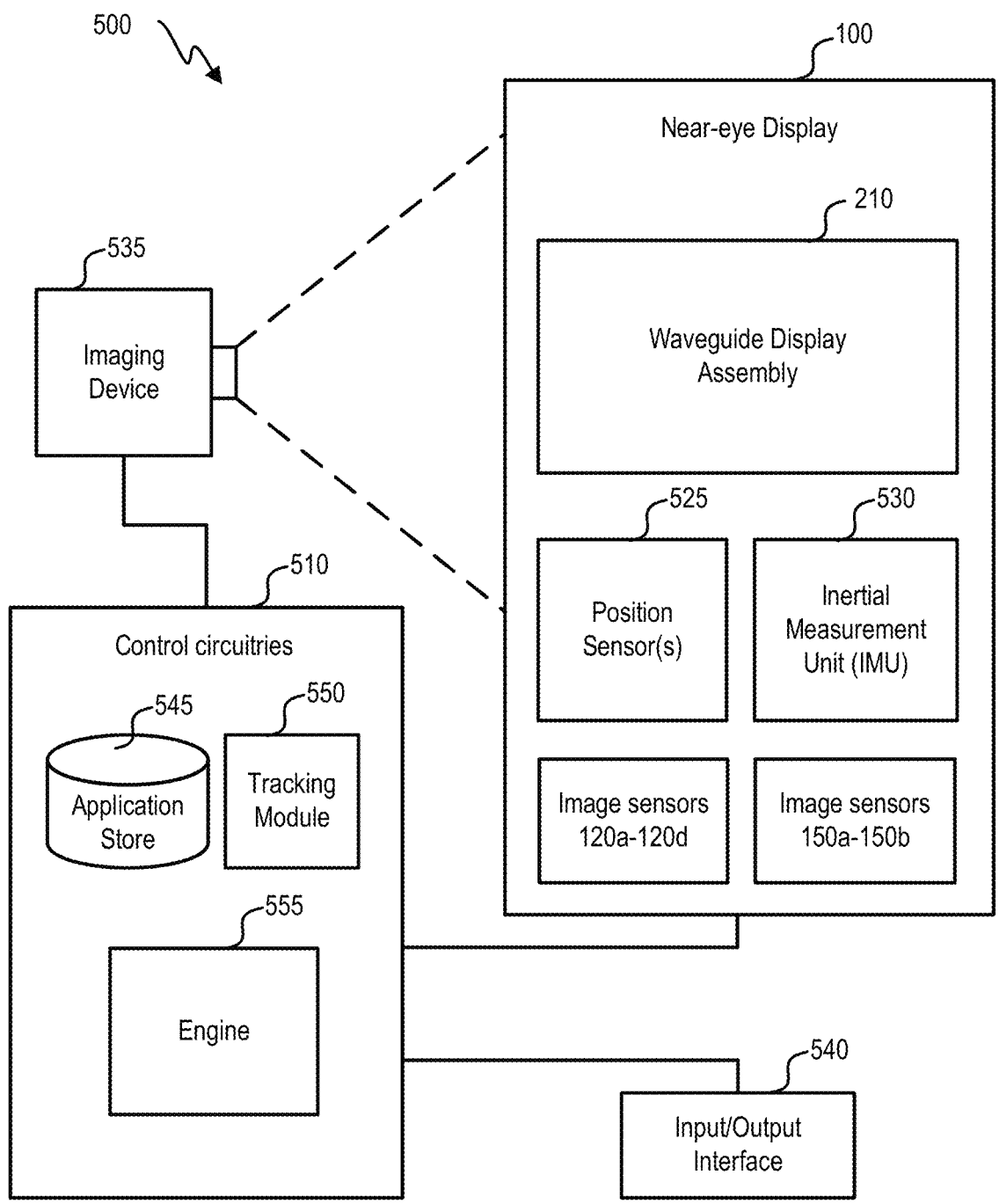
FIG. 5 is a block diagram of an example of a system including the near-eye display.

FIG. 5 is a block diagram of an example of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a mobile device, a wearable device, etc.

Near-eye display 100 is a display that presents media to a user. Examples of media presented by the near-eye display 100 include one or more images, video, and/or audio. In some examples, audio is presented via an external device (e.g., speakers and/or headphones) that receives audio information from near-eye display 100 and/or control circuitries 510 and presents audio data based on the audio information to a user. In some examples, near-eye display 100 may also act as an AR eyewear glass. In some examples, near-eye display 100 augments views of a physical, real-world environment with computer-generated elements (e.g., images, video, sound).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120*a*-120*d* of FIG. 1A for generating image data of a physical environment in which the user is located for performing location tracking of the user. Imaging device 535 may further include, for example, image sensors 150*a*-150*b* of FIG. 1B for generating image data for determining a gaze point of the user to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and/or input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some examples, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), or a distance between an object and user (e.g., based on image data provided by imaging device 535).

Figure 6A:
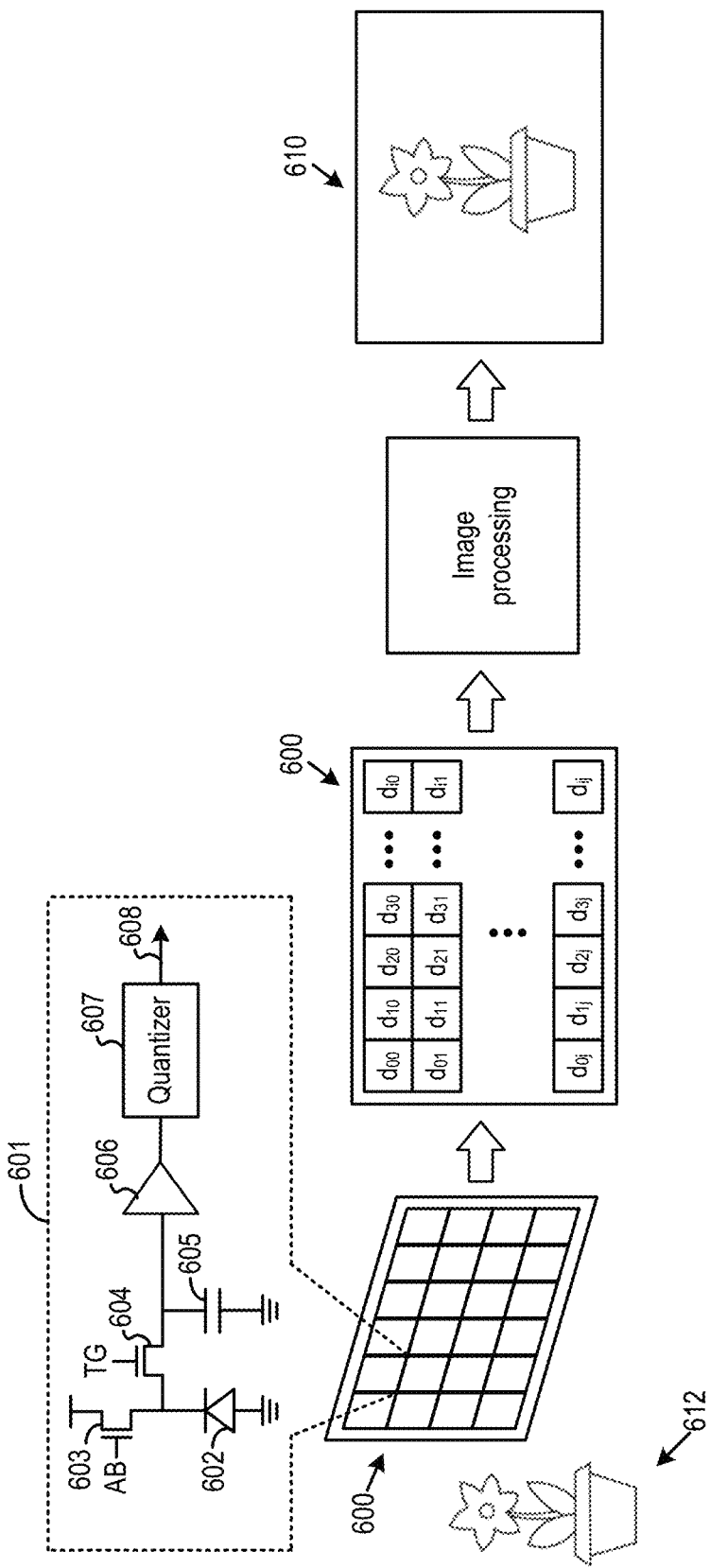
FIG. 6A and FIG. 6B illustrate examples of an image sensor and its operations.
Figure 6B:
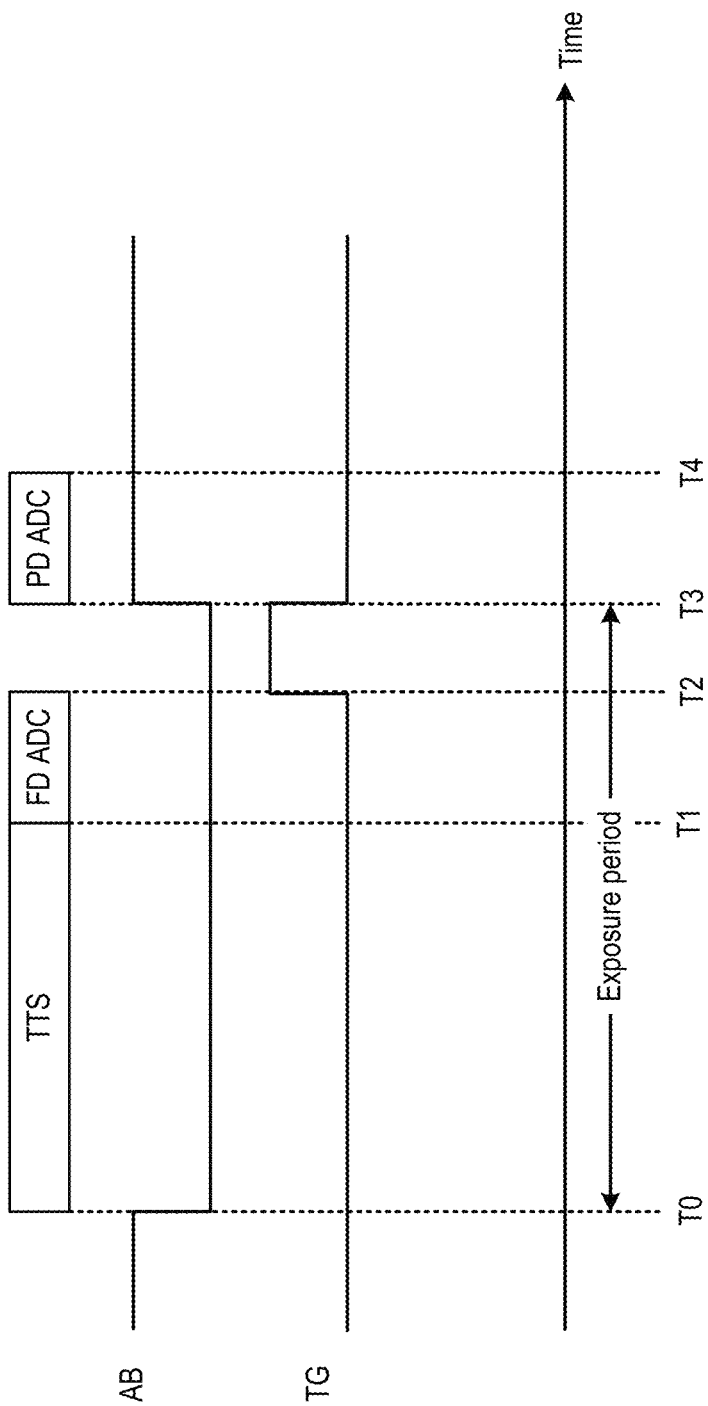

FIGS. 6A and 6B illustrate examples of an image sensor 600 and its operations. As shown in FIG. 6A, image sensor 600 can include an array of pixel cells, including pixel cell 601, and can generate digital intensity data corresponding to pixels of an image. Pixel cell 601 may be part of pixel cells 402 of FIG. 4. As shown in FIG. 6A, pixel cell 601 may include a photodiode 602, an electronic shutter switch 603, a transfer switch 604, a charge storage device 605, a buffer 606, and a quantizer 607. Photodiode 602 may include, for example, a P-N diode, a P-I-N diode, a pinned diode, etc., whereas charge storage device 605 can be a floating drain node of transfer switch 604. Photodiode 602 can generate and accumulate residual charge upon receiving light within an exposure period. Upon saturation by the residual charge within the exposure period, photodiode 602 can output overflow charge to charge storage device 605 via transfer switch 604. Charge storage device 605 can convert the overflow charge to a voltage, which can be buffered by buffer 606. The buffered voltage can be quantized by quantizer 607 to generate measurement data 608 to represent, for example, the intensity of light received by photodiode 602 within the exposure period.

Quantizer 607 may include a comparator to compare the buffered voltage with different thresholds for different quantization operations associated with different intensity ranges. For example, for a high intensity range where the quantity of overflow charge generated by photodiode 602 exceeds a saturation limit of charge storage device 605, quantizer 607 can perform a time-to-saturation (TTS) measurement operation by detecting whether the buffered voltage exceeds a static threshold representing the saturation limit, and if it does, measuring the time it takes for the buffered voltage to exceed the static threshold. The measured time can be inversely proportional to the light intensity. Also, for a medium intensity range in which the photodiode is saturated by the residual charge but the overflow charge remains below the saturation limit of charge storage device 605, quantizer 607 can perform a fully digital analog to digital converter (FD ADC) operation to measure a quantity of the overflow charge stored in charge storage device 605. Further, for a low intensity range in which the photodiode is not saturated by the residual charge and no overflow charge is accumulated in charge storage device 605, quantizer 607 can perform a digital process meter for analog sensors (PD ADC) operation to measure a quantity of the residual charge accumulated in photodiode 602. The output of one of TTS, FD ADC, or PD ADC operation can be output as measurement data 608 to represent the intensity of light.

FIG. 6B illustrates an example sequence of operations of pixel cell 601. As shown in FIG. 6B, the exposure period can be defined based on the timing of AB signal controlling electronic shutter switch 603, which can steer the charge generated by photodiode 602 away when enabled, and based on the timing of the TG signal controlling transfer switch 604, which be controlled to transfer the overflow charge and then the residual charge to charge storage device 605 for read out. For example, referring to FIG. 6B, the AB signal can be de-asserted at time T0 to allow photodiode 602 to generate charge. T0 can mark the start of the exposure period. Within the exposure period, the TG signal can set transfer switch 604 at a partially-on state to allow photodiode 602 to accumulate at least some of the charge as residual charge until photodiode 602 saturates, after which overflow charge can be transferred to charge storage device 605. Between times T0 and T1, quantizer 607 can perform a TTS operation to determine whether the overflow charge at charge storage device 605 exceeds the saturation limit, and then between times T1 and T2, quantizer 607 can perform a FD ADC operation to measure a quantity of the overflow charge at charge storage device 605. Between times T2 and T3, the TG signal can be asserted to bias transfer switch 604 in a fully-on state to transfer the residual charge to charge storage device 605. At time T3, the TG signal can be de-asserted to isolate charge storage device 605 from photodiode 602, whereas the AB signal can be asserted to steer the charge generated by photodiode 602 away. The time T3 can mark the end of the exposure period. Between times T3 and T4, quantizer 607 can perform a PD operation to measure a quantity of the residual charge.

The AB and TG signals can be generated by a controller (not shown in FIG. 6A) which can be part of pixel cell 601 to control the duration of the exposure period and the sequence of quantization operations. The controller can also detect whether charge storage device 605 is saturated and whether photodiode 602 is saturated to select the outputs from one of the TTS, FD ADC, or PD ADC operations as measurement data 608. For example, if charge storage device 605 is saturated, the controller can provide the TTS output as measurement data 608. If charge storage device 605 is not saturated but photodiode 602 is saturated, the controller can provide the FD ADC output as measurement data 608. If photodiode 602 is not saturated, the controller can provide the PD ADC output as measurement data 608. The measurement data 608 from each pixel cells of image sensor 600 generated within the exposure period can form an image frame. The controller can repeat the sequence of operations in FIG. 6B in subsequent exposure periods to generate subsequent image frames.

Figure 7A:
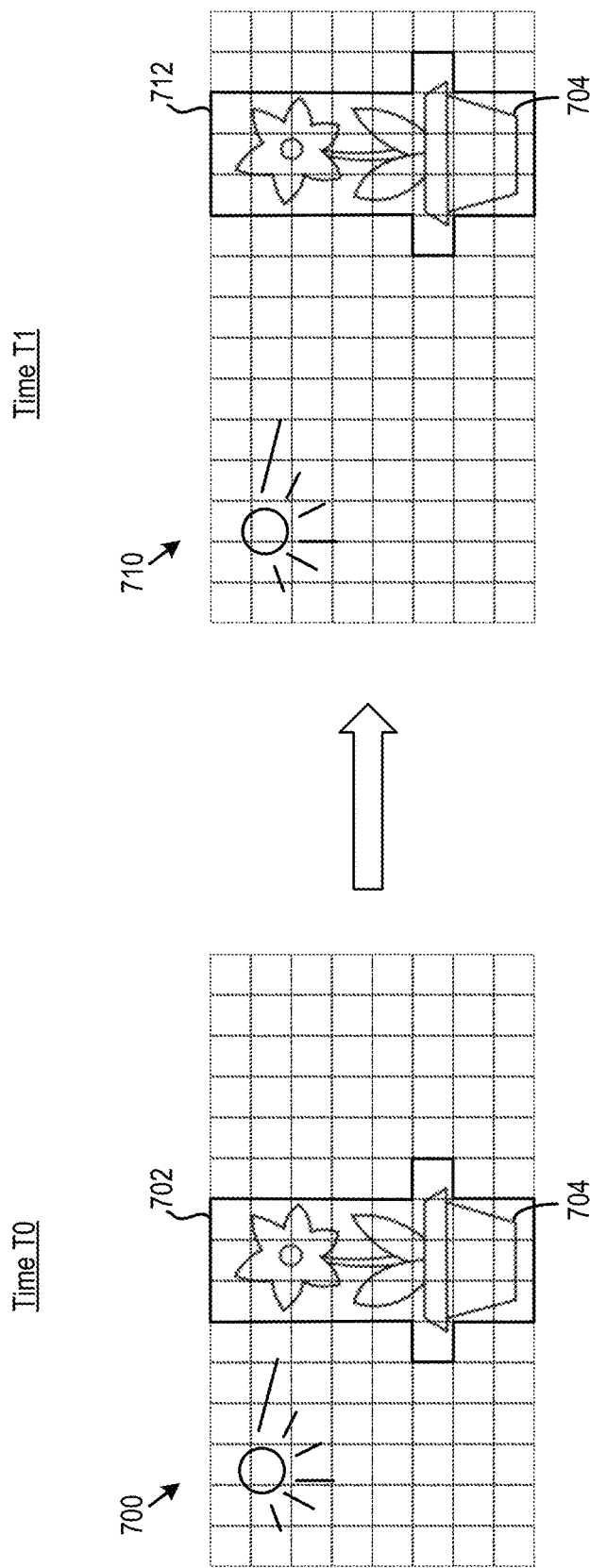
FIG. 7A, FIG. 7B, FIG. 7C, and FIG. 7D illustrate examples of applications supported by the output of image sensor of FIG. 6A and FIG. 6B.

The image frame data from image sensor 600 can be transmitted to a host processor (not shown in FIG. 6A and FIG. 6B) to support different applications, such as tracking one or more objects, detecting a motion (e.g., as part of a dynamic vision sensing (DVS) operation), etc. FIG. 7A-FIG. 7D illustrate examples of applications that can be supported by the image frame data from image sensor 600. FIG. 7A illustrates an example of an object-tracking operation based on image frames from image sensor 600. As shown in FIG. 7A, an application operating at the host processor can identify group of pixels in a region of interest (ROI) 702 corresponding to object 704 from an image frame 700 captured at time T0. The application can continue to track the location of object 704 in subsequent image frames, including image frame 710 captured at time T1, and identify group of pixels in ROI 712 corresponding to object 704. The tracking of the image location of object 704 within an image frame can be performed to support a SLAM algorithm, which can construct/update a map of an environment in which image sensor 600 (and a mobile device that includes image sensor 600, such as near-eye display 100) is situated, based on tracking the image location of object 704 in a scene captured by image sensor 600.

Figure 7B:
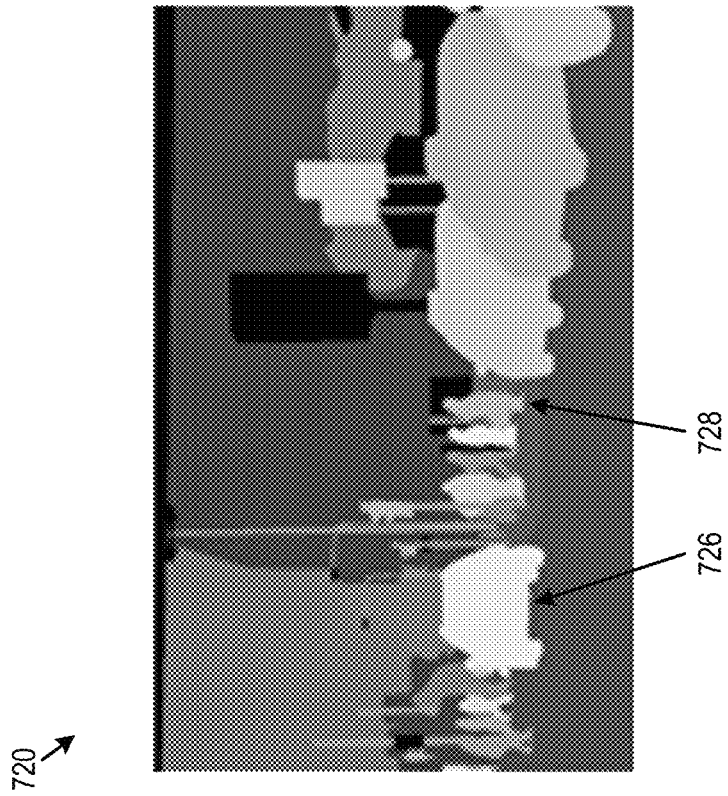
Figure 7B:
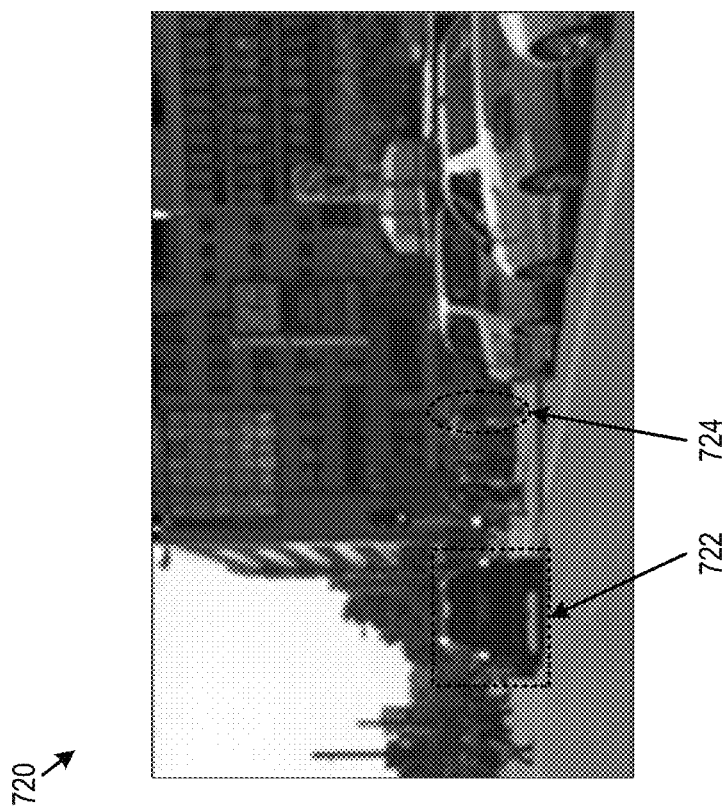

FIG. 7B illustrates an example of an object detection operation on image frames from image sensor 600. As shown on the left of FIG. 7B, the host processor may identify one or more objects in a scene captured in an image frame 720, such as a vehicle 722 and a person 724. As shown on the right of FIG. 7B, based on the identification, the host processor may determine that group of pixels 726 corresponds to vehicle 722, whereas group of pixels 728 corresponds to person 724. The identification of vehicle 722 and person 724 can be performed to support various applications, such as a surveillance application in which vehicle 722 and person 724 are surveillance targets, a mixed reality (MR) application in which vehicle 722 and person 724 are replaced with virtual objects, a foveated-imaging operation to reduce the resolution of certain images (e.g., license plates of vehicle 722, the face of person 724) for privacy, etc.

Figure 7C:
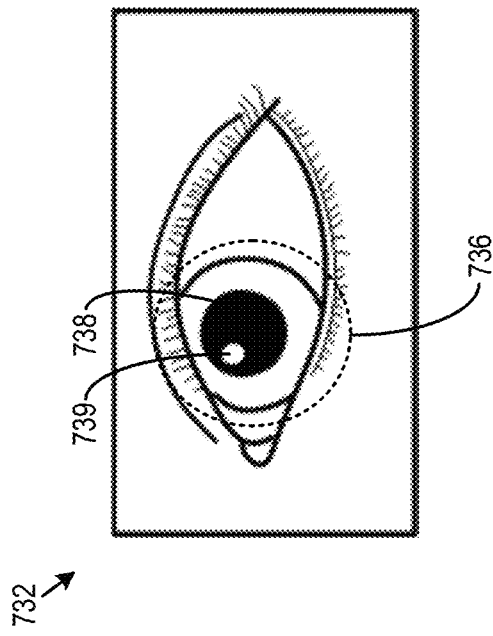
Figure 7C:
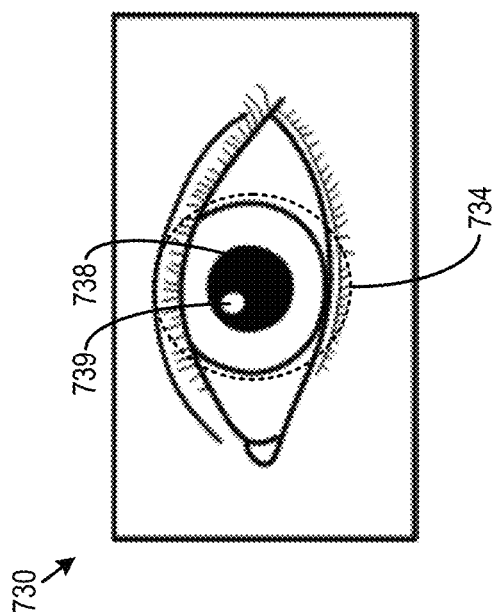

FIG. 7C illustrates an example of an eye-tracking operation on image frames from image sensor 600. As shown in FIG. 7C, the host processor may identify, from image 730 and 732 of an eyeball, a group of pixels 734 and 736 corresponding to a pupil 738 and a glint 739. The identification of pupil 738 and glint 739 can be performed to support the eye-tracking operation. For example, based on the image locations of pupil 738 and glint 739, the application can determine the gaze directions of the user at different times, which can be provided as inputs to the system to determine, for example, the content to be displayed to the user.

Figure 7D:
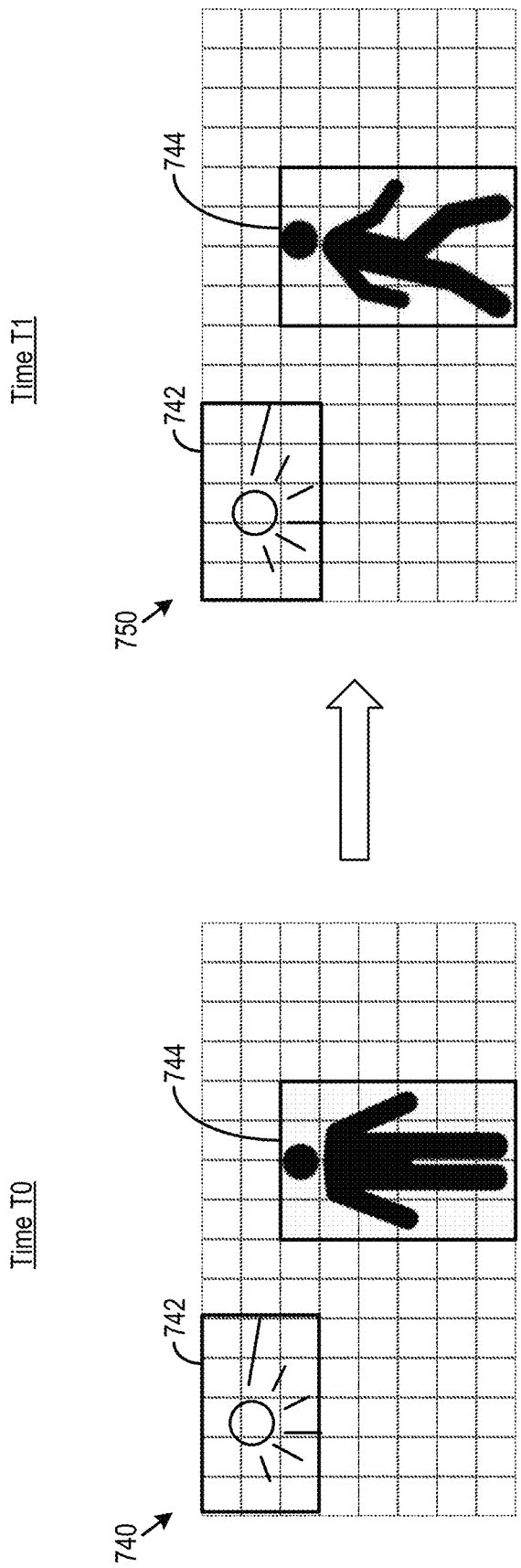

FIG. 7D illustrates an example of a dynamic vision sensing (DVS) operation on image frames from image sensor 600. In a DVS operation, image sensor 600 can output only pixels that experience a predetermined degree of change in brightness (reflected in pixel values), while pixels that do not experience the degree of change are not output by image sensor 600. The DVS operation can be performed to detect a motion of an object and/or to reduce the volume of pixel data being output. For example, referring to FIG. 7D, at time T0 an image 740 is captured, which contains a group of pixels 742 of a light source and a group of pixels 744 of a person. Both group of pixels 742 and 744 can be output as part of image 740 at time T0. At time T1 an image 750 is captured. The pixel values of group of pixels 742 corresponding to the light source remain the same between times T0 and T1, and the group of pixels 742 is not output as part of image 750. On the other hand, the person changes from standing to walking between times T0 and T1, which results in changes in the pixel values of group of pixels 744 between times T0 and T1. As a result, the group of pixels 744 of the person are output as part of image 750.

In the operations of FIG. 7A-FIG. 7D, image sensor 600 can be controlled to perform a sparse capture operation, in which only a subset of pixel cells is selected to output pixel data of interest to the host processor. The pixel data of interest can include pixel data needed to support a particular operation at the host processor. For example, in the object tracking operation of FIG. 7A, image sensor 600 can be controlled to only transmit groups of pixels in ROIs 702 and 712 of object 704 in, respectively, image frames 700 and 710. In the object detection operation of FIG. 7B, image sensor 600 can be controlled to only transmit groups of pixels 726 and 728 of, respectively, vehicle 722 and person 724. In addition, in the eye-tracking operation of FIG. 7C, image sensor 600 can be controlled to only transmit groups of pixels 734 and 736 containing pupil 738 and glint 739. Further, in the DVS operation of FIG. 7D, image sensor 600 can be controlled to only transmit group of pixels 744 of the moving person at time T1 but not a group of pixels 742 of the static light source. All these arrangements can allow generation and transmission of higher resolution images without corresponding increases in power and bandwidth. For example, a larger pixel cell array including more pixel cells can be included in image sensor 600 to improve image resolution, while the bandwidth and power required to provide the improved image resolution can be reduced when only a subset of the pixel cells generate the pixel data of interest at a high resolution and transmit the high resolution pixel data to the host processor while the rest of the pixel cells are either not generating/transmitting pixel data, or generating/transmitting pixel data at a low resolution. Moreover, while image sensor 600 can be operated to generate images at a higher frame rate, the increases in bandwidth and power can be reduced when each image only includes a small set of pixel values that are at high resolution and represented by a large number of bits while the rest of the pixel values are either not transmitted, or are represented by a smaller number of bits.

The volume of pixel data transmission can also be reduced in the case of 3D sensing. For example, referring to FIG. 6D, an illuminator 640 can project a pattern 642 of structured light onto an object 650. The structured light can be reflected on a surface of an object 650, and a pattern 652 of reflected light can be captured by image sensor 600 to generate an image. Host processor can match pattern 652 with pattern 642 and determine the depth of object 650 with respect to image sensor 600 based on the image locations of pattern 652 in the image. For 3D sensing, only groups of pixel cells 660, 662, 664, and 666 contain relevant information (e.g., pixel data of pattern 652). To reduce the volume of pixel data being transmitted, image sensor 600 can be configured to send only the pixel data from groups of pixel cells 660, 662, 664, and 666, or to send the pixel data from groups of pixel cells 660, 662, 664, and 666 at a high resolution while the rest of the pixel data are at a low resolution, to the host processor.

Figure 8A:
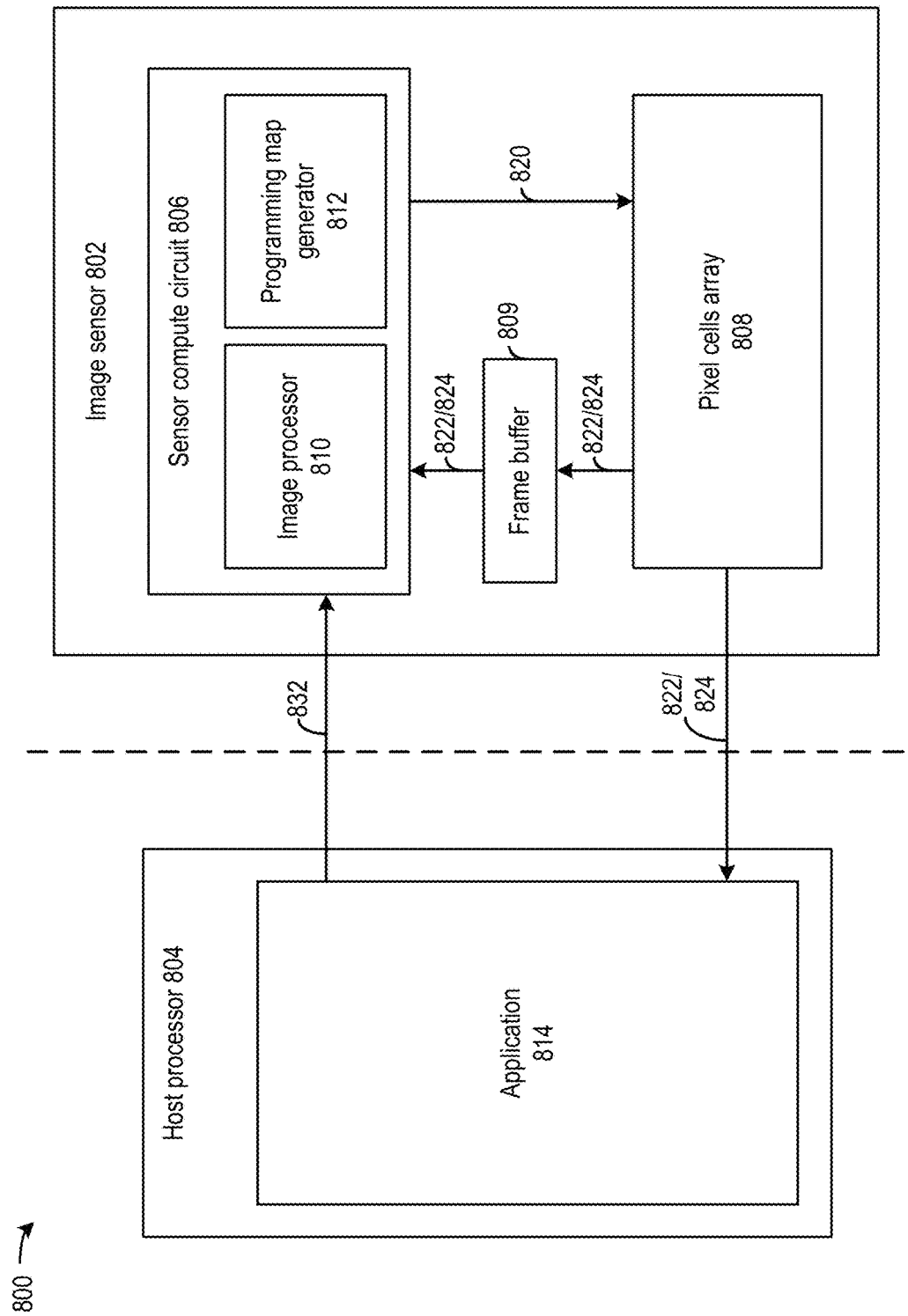
FIG. 8A and FIG. 8B illustrate examples of an imaging system to support the operations illustrated in FIG. 7A-FIG. 7D.
Figure 8B:
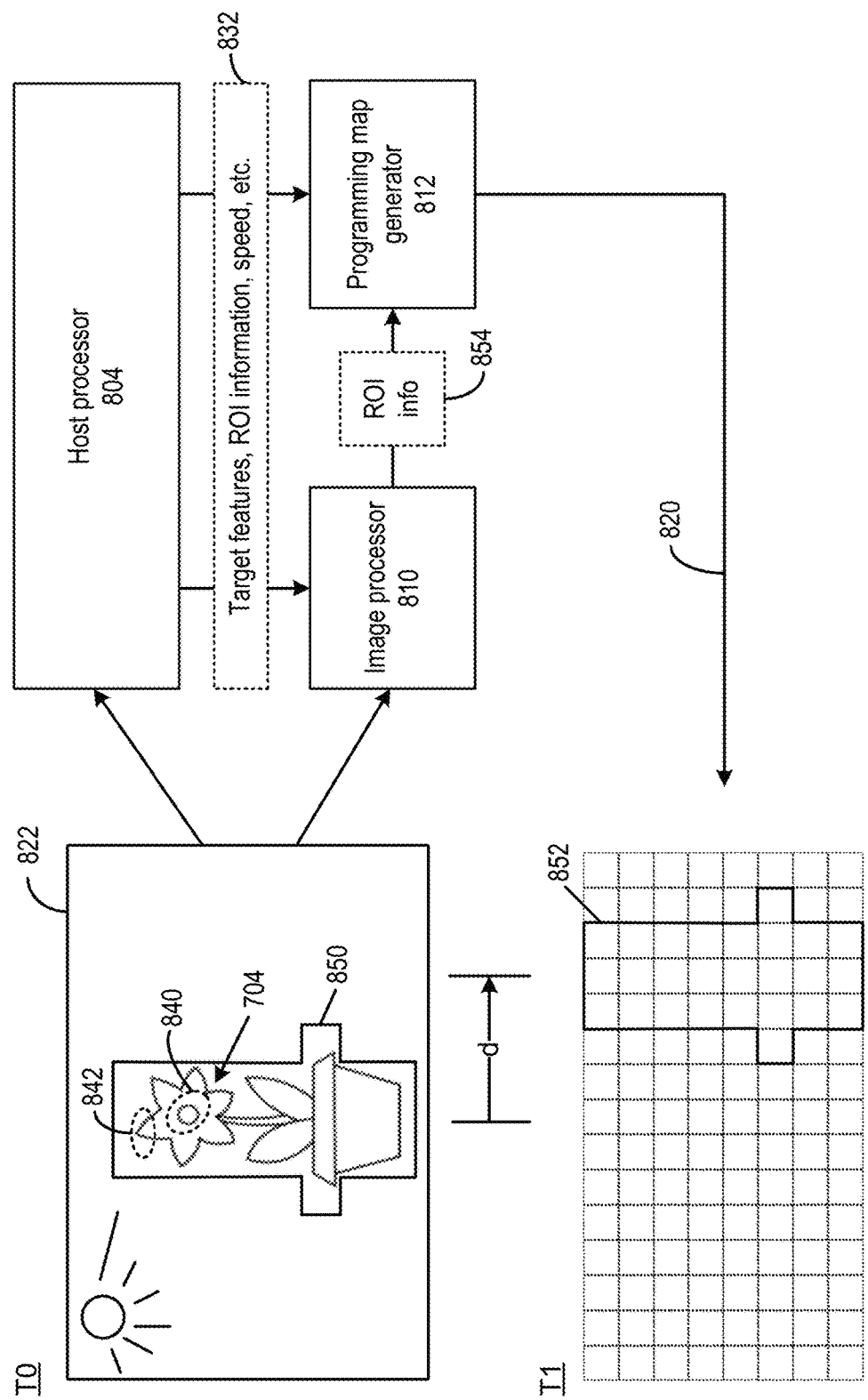

FIG. 8A and FIG. 8B illustrate examples of an imaging system 800 that can perform sparse capture operations to support the operations illustrated in FIG. 7A-FIG. 7D. As shown in FIG. 8A, imaging system 800 includes an image sensor 802 and a host processor 804. Image sensor 802 includes a sensor compute circuit 806, a pixel cell array 808, and a frame buffer 809. Sensor compute circuit 806 includes an image processor 810 and a programming map generator 812. In some examples, sensor compute circuit 806 can be implemented as an application specific integrated circuit (ASIC), a field programmable gate array (FPGA), or a hardware processor that executes instructions to implement the functions of image processor 810 and programming map generator 812. Frame buffer 809 can include a memory to store image frames output by pixel cells array 808, and provide the image frames to sensor compute circuit 806 for processing. Frame buffer 809 can include an on-chip memory integrated on the same wafer as sensor compute circuit 806 (e.g., static random access memory (SRAM)), or an off-chip memory (e.g., resistive random access memory (ReRAM), dynamic random access memory (DRAM)). In addition, host processor 804 includes a general purpose central processing unit (CPU) which can execute an application 814.

Each pixel cell of pixel cell array 808, or blocks of pixel cells, can be individually programmable to, for example, enable/disable outputting of a pixel value, set a resolution of the pixel value output by the pixel cell, etc. Pixel cell array 808 can receive first programming signals 820, which can be in the form of a programming map that contains programming data for each pixel cell from programming map generator 812 of sensor compute circuit 806. Pixel cell array 808 can sense light from a scene and generate a first image frame 822 of the scene and based on first programming signals 820. Specifically, pixel cell array 808 can be controlled by first programming signals 820 to operate in different sparsity modes, such as in a full-frame mode in which first image frame 822 includes a full image frame of pixels, and/or in a sparse mode in which first image frame 822 only includes a subset of the pixels specified by the programming map. Pixel cell array 808 can output first image frame 822 to both host processor 804 and to sensor compute circuit 806. In some examples, pixel cell array 808 can also output first image frame 822 with different pixel sparsity to host processor 804 and sensor compute circuit 806. For example, pixel cell array 808 can output first image frame 822 with a full image frame of pixels back to sensor compute circuit 806, and output first image frame 822 with sparse pixels defined by first programming signals 820 to host processor 804.

In addition to generating first programming signals 820, sensor compute circuit 806 can also generate global signals that are sent to each pixel cell of pixel cells array 808. The global signals can include, for example, threshold voltages used for quantization operations in TTS, FD ADC, and PD ADC operations (e.g., a global voltage ramp for FD ADC and PD ADC operation, a flat voltage for TTS operation, etc.), as well as global control signals such as AB and TG signals of FIG. 6B.

Sensor compute circuit 806 and host processor 804, together with image sensor 802, can form a two-tier feedback system based on first image frame 822 to control the image sensor to generate a subsequent image frame 824. In a two-tier feedback operation, image processor 810 of sensor compute circuit 806 can perform an image-processing operation on first image frame 822 to obtain a processing result, and then programming map generator 812 can update first programming signals 820 based on the processing result. The image-processing operation at image processor 810 can be guided/configured based on second programming signals 832 received from application 814, which can generate second programming signals 832 based on first image frame 822. Pixel cell array 808 can then generate subsequent image frame 824 based on the updated first programming signals 820. Host processor 804 and sensor compute circuit 806 can then update, respectively, first programming signals 820 and second programming signals 832 based on the subsequent image frame 824.

In the aforementioned two-tier feedback system, second programming signals 832, from host processor 804, can be in the form of a teaching/guidance signal, the result of a neural network training operation (e.g., backward propagation results), etc., to influence the image-processing operation and/or programming map generation at sensor compute circuit 806. Host processor 804 can generate the teaching/guidance signal based on not just the first image frame but also other sensor data (e.g., other image frames captured by other image sensors, audio information, motion sensor outputs, inputs from the user) to determine a context of the light sensing operation by image sensor 802, and then determine the teaching/guidance signal. The context may include, for example, an environment condition image sensor 802 operating in a location of image sensor 802 or any other requirements of application 814. The teaching/guidance signals can be updated at a relatively low rate (e.g., lower than the frame rate) based on the context, given that the context typically changes at a much lower rate than the frame rate while the image-processing operation and the updating of the programming map at sensor compute circuit 806 can occur at a relatively high rate (e.g., at the frame rate) to adapt to the images captured by pixel cell array 808.

Although FIG. 8A illustrates that pixel cell array 808 transmits first image frame 822 and second image frame 824 to both host processor 804 and sensor compute circuit 806, in some cases pixel cell array 808 may transmit image frames of different sparsity to host processor 804 and sensor compute circuit 806. For example, pixel cell array 808 can transmit first image frame 822 and second image frame 824 having full pixels to image processor 810 while a sparse version of both image frames, each including subsets of pixels selected based on first programming signals 820, are sent to host processor 804.

FIG. 8B illustrates an example of an operation of imaging system 800 to support the object tracking operation of FIG. 7A. Specifically, at time T0, pixel cell array 808 (not shown in FIG. 8B) generates first image frame 822 including full pixels of a scene including object 704, based on first programming signals 820 indicating that a full frame of pixels is to be generated and transmits first image frame 822 to both host processor 804 and image processor 810. Host processor 804, based on executing an application 814, can determine that object 704 is to be tracked. Such a determination can be based on, for example, a user input, a requirement by application 814, etc. Host processor 804 can also process first image frame 822 to extract spatial features of object 704, such as features 840 and 842. Based on the processing result, host processor 804 can determine an approximate location, size, and shape of a ROI 850 that includes pixels of object 704 (or other objects, such as pupil 738 and glint 739 of FIG. 7C) in first image frame 822. In addition, based on other outputs from other sensors (e.g., IMU), host processor 804 also determines that image sensor 802 is moving relative to object 704 at a certain speed, and can estimate the new location of an ROI 852 in a subsequent image frame. Host processor 804 can then transmit as part of second programming signals 832 the target features of object 704 (e.g., features 840 and 842), information of ROI (e.g., initial location, shape, size of ROI 850), speed, etc., to image processor 810 and programming map generator 812.

Based on second programming signals 832, image processor 810 can process first image frame 822 to detect the target image features of object 704, and determine the precise location, size, and shape of ROI 852 based on the detection result. Image processor 810 can then transmit ROI information 854 including the precise location, size, and shape of ROI 850 in first image frame 822 to programming map generator 812. Based on ROI information 854 as well as second programming signals 832, programming map generator 812 can estimate the expected location, size, and shape of ROI 852 in a subsequent image frame to be captured at time T1. For example, based on the speed information included in second programming signals 832, programming map generator 812 can determine that ROI 850 will have moved by a distance of d between times T0 and T1 to become ROI 852, and determine the location of ROI 852 at time T1 based on the distance d. As another example, in a case where pupil 738 and glint 739 of FIG. 7C is being tracked as part of an eye-tracking operation, programming map generator 812 can obtain information about a gaze change of the user, and determine an expected location of an ROI (e.g., ROI 852) including pupil 738 and glint 739 at time T1 based on the gaze change. Programming map generator 812 can then update first programming signals 820 to select pixel cells within ROI 852 at time T1 to output pixel data of object 704 (or pupil 738 and glint 739, or other objects) for the subsequent image frame.

Figure 9A:
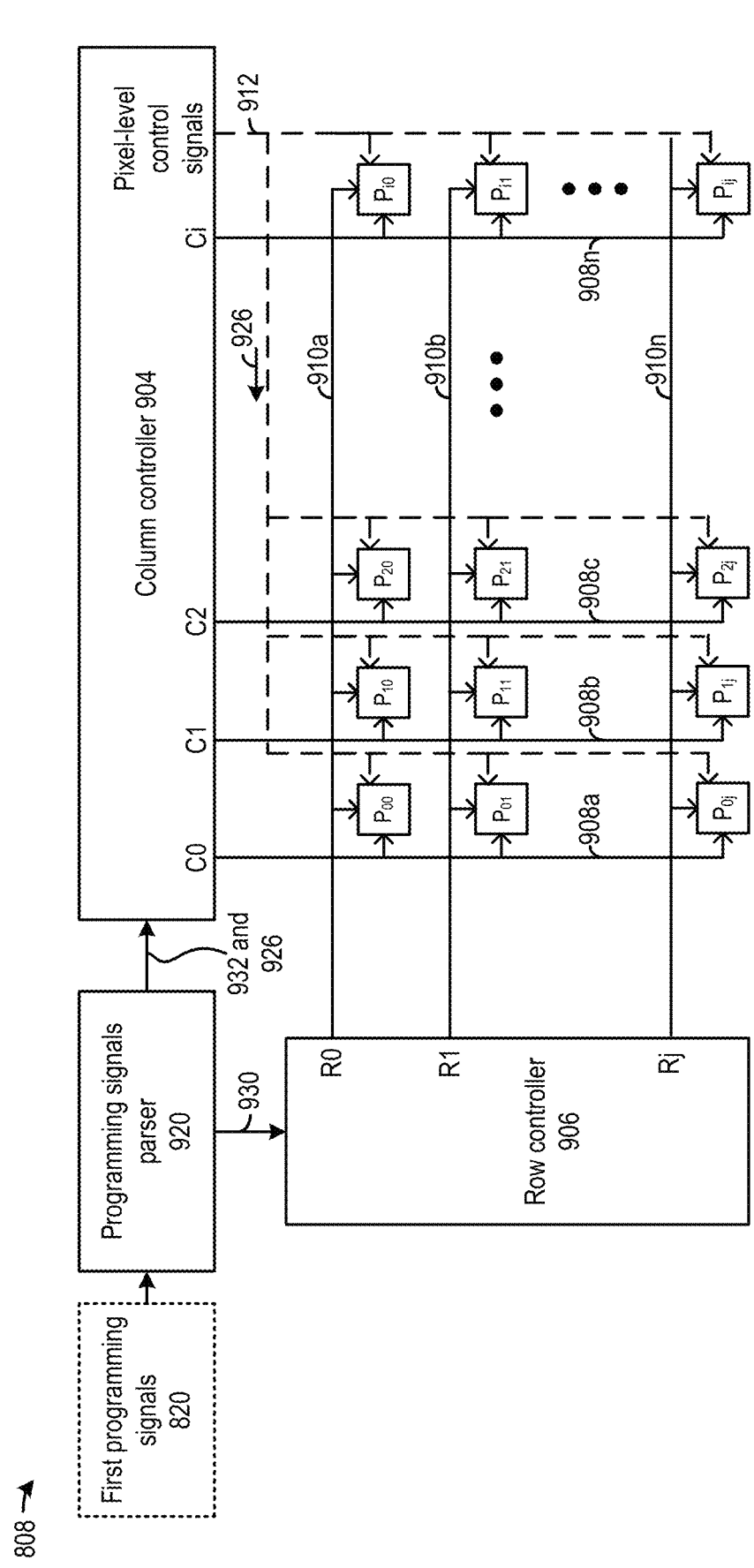
FIG. 9A, FIG. 9B, and FIG. 9C illustrate example internal components of the imaging system of FIG. 8A and FIG. 8B and their operations.
Figure 9B:
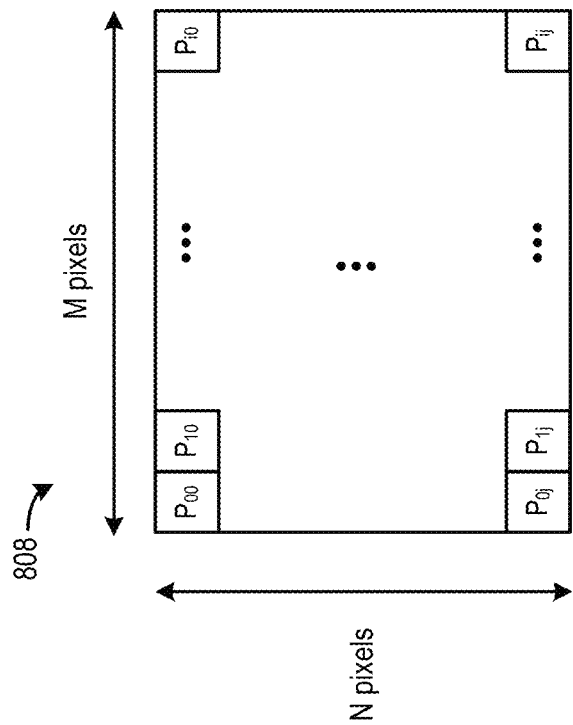
Figure 9B:
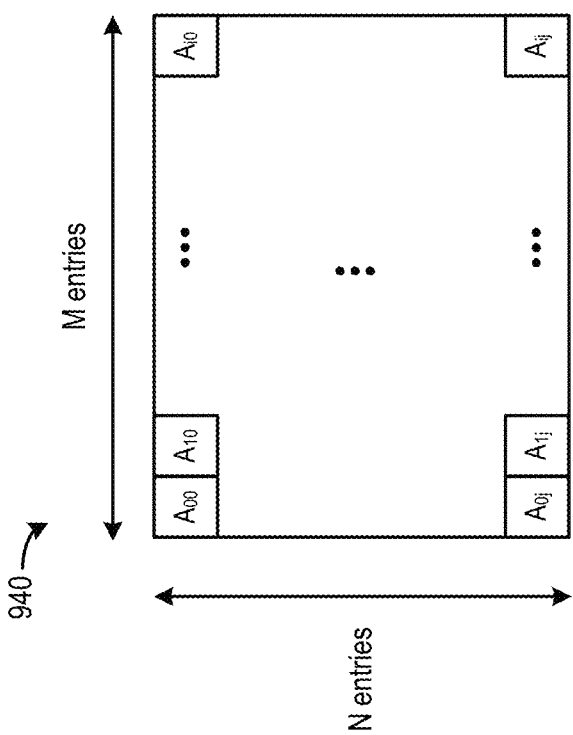
Figure 9C:
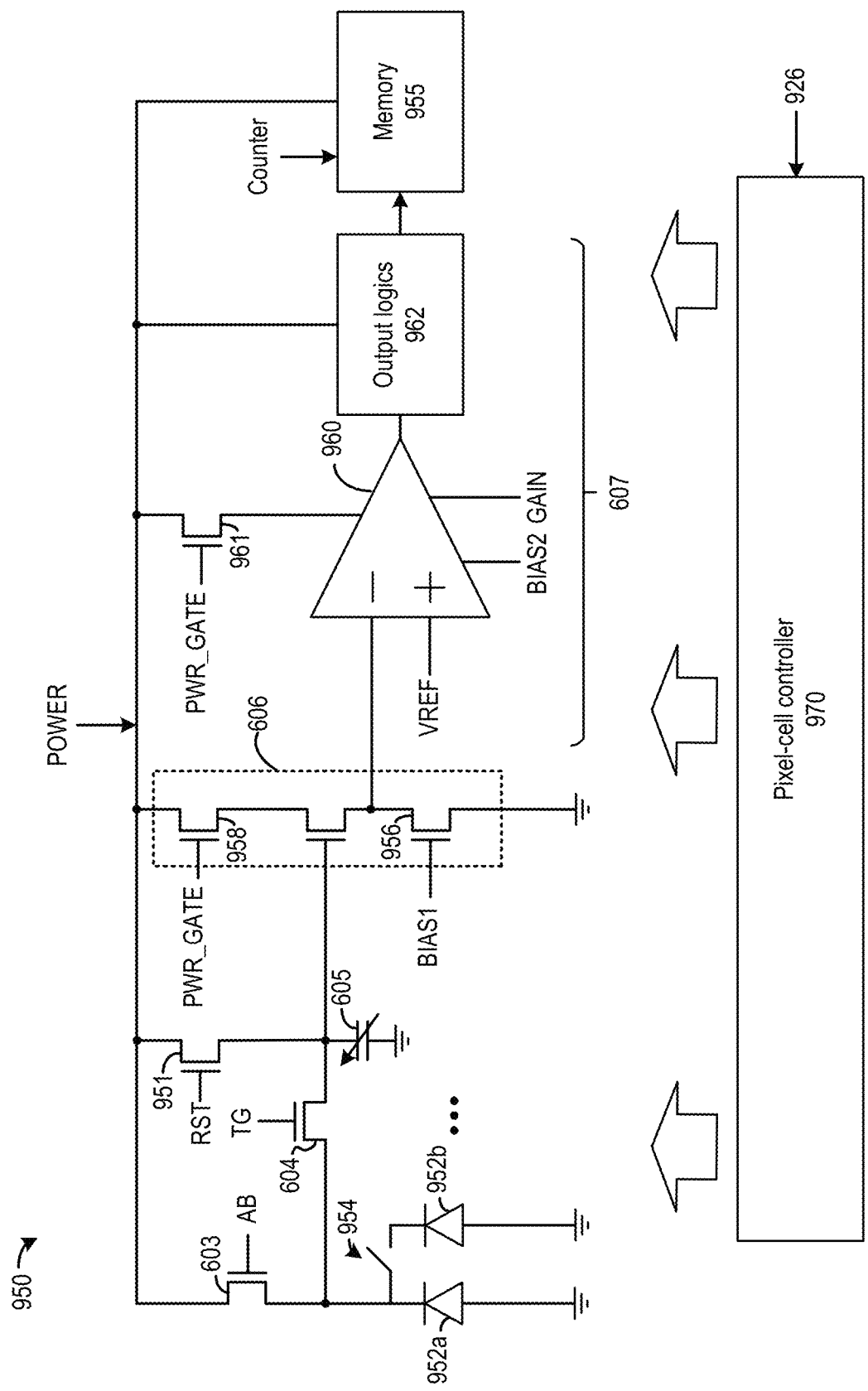

FIG. 9A, FIG. 9B, and FIG. 9C illustrate examples of internal components of pixel cells array 808 of FIG. 8A. As shown in FIG. 9A, pixel cell array 808 may include a column controller 904, a row controller 906, and a programming signals parser 920. Column controller 904 is connected with column buses 908 (e.g., 908a, 908b, 908c, ... 908n), whereas row controller 906 is connected with row buses 910 (e.g., 910a, 910b, ... 908n). One of column controller 904 or row controller 906 is also connected with a programming bus 912 to transmit pixel-level programming signals 926 targeted at a particular pixel cell or a group of pixel cells. Each box labelled $P_{00}$, $P_{01}$, $P_{0j}$, etc. can represent a pixel cell or a group of pixel cells (e.g., a group of 2×2 pixel cells).

Each pixel cell or group of pixel cells can be connected to one of column buses 908, one of row buses 910, programming bus 912, and an output data bus to output pixel data (not shown in FIG. 9A). Each pixel cell (or each group of pixel cells) is individually addressable by column address signals 930 on column buses 908 provided by column controller 904, and row address signals 932 on row buses 910 provided by row controller 906, to receive pixel-level programming signals 926 via pixel-level programming bus 912 at a time. Column address signals 930, row address signals 932, as well as pixel-level programming signals 926, can be generated based on first programming signals 820 from programming map generator 812.

In addition, FIG. 9A includes programming signals parser 920 which can extract pixel-level programming signals from first programming signals 820. In some examples, first programming signals 820 can include a programming map which can include programming data for each pixel cell or each group of pixel cells of pixel cell array 808. FIG. 9B illustrates an example of pixel array programming map 940. As shown in FIG. 9B, pixel array programming map 940 can include a two-dimensional array of pixel-level programming data, with each pixel-level programming data of the two-dimensional array targeted at a pixel cell or a group of pixel cells of pixel cell array 808. For example, in a case where each pixel-level programming datum is targeted at a pixel cell, and assuming pixel cell array 808 has a width of M pixels (e.g., M columns of pixels) and a height of N pixels (e.g., N rows of pixels), pixel array programming map 940 can also have a width of M entries (e.g., M columns of entries) and a height of N entries (e.g., N rows of entries), with each entry storing pixel-level programming data for a corresponding pixel cell. For example, the pixel-level programming data $A_{00}$ at entry (0, 0) of pixel array programming map 940 is targeted at pixel cell $P_{00}$ at pixel location (0, 0) of pixel cell array 808, whereas the pixel-level programming data $A_{01}$ at entry (0, 1) of pixel array programming map 940 is targeted at pixel cell Poi at pixel location (0, 1) of pixel cell array 808. In a case where pixel-level programming data is targeted at a group of pixel cells, the number of entries of pixel array programming map 940 along the height and the width can be scaled based on a number of pixel cells in each group.

Pixel array programming map 940 can be configured to support the feedback operations described in FIG. 9B. For example, the pixel-level programming data stored at each entry can individually program each pixel cell (or each group of pixel cells) to, for example, power on or off, to enable or disable outputting of pixel data, to set a quantization resolution, to set a precision of output pixel data, to select a quantization operation (e.g., one of TTS, FD ADC, PD ADC), to set a frame rate, etc. As described above, programming map generator 812 can generate pixel array programming map 940 based on, for example, prediction of one or more ROIs, in which the pixel-level programming data for pixel cells within an ROI are different from the pixel-level programming data for pixel cells outside the ROI. For example, pixel array programming map 940 can enable a subset of pixel cells (or groups of pixel cells) to output pixel data, while the rest of the pixel cells do not output pixel data. As another example, pixel array programming map 940 can control a subset of pixel cells to output pixel data at a higher resolution (e.g., using a larger number of bits to represent each pixel), whereas the rest of pixel cells output pixel data at a lower resolution.

Referring back to FIG. 9A, programming map parser 920 can parse pixel array programming map 940, which can be in a serial data stream, to identify the pixel-level programming data for each pixel cell (or each group of pixel cells). The identification of the pixel-level programming data can be based on, for example, a predetermined scanning pattern by which the two-dimensional pixel array programming map is converted into the serial format, as well as the order by which the pixel-level programming data is received by programming signals parser 920 from the serial data stream. For each entry of programming data, programming signals parser 920 can generate a row address signal 930 and a column address signal 832, and transmit row address signal 830 and column address signal 832 to, respectively, row sensor compute circuit 806 and column controller 904 to select a pixel cells and transmit pixel-level programming signals 826 to the selected pixel cell (or group of pixel cells).

FIG. 9C illustrates example internal components of a pixel cell 950 of pixel cell array 808, which can include at least some of the components of pixel cell 601 of FIG. 6A. Pixel cell 950 can include one or more photodiodes, including photodiodes 952a, 952b, etc., each can be configured to detect light of a different frequency range. For example, photodiode 952a can detect visible light (e.g., monochrome, or one of red, green, or blue color), whereas photodiode 952b can detect infrared light. Pixel cell 950 further includes a switch 954 (e.g., a transistor, a controller barrier layer) to control which photodiode outputs charge for pixel data generation.

In addition, pixel cell 950 further includes electronic shutter switch 603, transfer switch 604, charge storage device 605, buffer 606, quantizer 607 as shown in FIG. 6A, as well as a memory 955. In some examples, pixel cell 950 can include a separate transfer switch 604 and/or a separate charge storage device 605 for each photodiode. Charge storage device 605 can have a configurable capacitance to set a charge-to-voltage conversion gain. In some examples, the capacitance of charge storage device 605 can be increased to store overflow charge for FD ADC operation for a medium light intensity to reduce the likelihood of charge storage device 605 being saturated by the overflow charge. The capacitance of charge storage device 605 can also be decreased to increase the charge-to-voltage conversion gain for PD ADC operation for a low light intensity. The increase in the charge-to-voltage conversion gain can reduce quantization error and increase the quantization resolution. In some examples, the capacitance of charge storage device 605 can also be decreased during the FD ADC operation to increase the quantization resolution. Buffer 606 includes a current source 956 of which the current can be set by a bias signal BIAS1, as well as a power gate 958 which can be controlled by a PWR_GATE signal to turn on/off buffer 606. Buffer 606 can be turned off as part of disabling pixel cell 950.

In addition, quantizer 607 includes a comparator 960 and output logics 962. Comparator 960 can compare the output of buffer with a reference voltage (VREF) to generate an output. Depending on a quantization operation (e.g., TTS, FD ADC, and PD ADC operations), comparator 960 can compare the buffered voltage with different VREF voltages to generate the output, and the output be further processed by output logics 962 to cause memory 955 to store a value from a free running counter as the pixel output. The bias current of comparator 960 can be controlled by a bias signal BIAS2 which can set the bandwidth of comparator 960, which can be set based on the frame rate to be supported by pixel cell 950. Moreover, the gain of comparator 960 can be controlled by a gain control signal GAIN. The gain of comparator 960 can be set based on a quantization resolution to be supported by pixel cell 950. Comparator 960 further includes a power switch 961 which can also be controlled by the PWR_GATE signal to turn on/off comparator 960. Comparator 960 can be turned off as part of disabling pixel cell 950.

In addition, output logics 962 can select the outputs of one of the TTS, FD ADC, or PD ADC operations and based on the selection, determine whether to forward the output of comparator 960 to memory 955 to store the value from the counter. Output logics 962 can include internal memory to store indications, based on the output of comparator 960, of whether the photodiode 952 (e.g., photodiode 952a) is saturated by the residual charge, and whether charge storage device 605 is saturated by the overflow charge. If charge storage device 605 is saturated by the overflow charge, output logics 962 can select TTS output to be stored in memory 955 and prevent memory 955 from overwriting the TTS output by the FD ADC/PD ADC output. If charge storage device 605 is not saturated but the photodiodes 952 are saturated, output logics 962 can select the FD ADC output to be stored in memory 955; otherwise, output logics 962 can select the PD ADC output to be stored in memory 955. In some examples, instead of the counter values, the indications of whether photodiodes 952 are saturated by the residual charge and whether charge storage device 605 is saturated by the overflow charge can be stored in memory 955 to provide the lowest precision pixel data.

In addition, pixel cell 950 may include a pixel-cell controller 970, which can include logic circuits to generate control signals such as AB, TG, BIAS1, BIAS2, GAIN, VREF, PWR_GATE, etc. Pixel-cell controller 970 can also be programmed by pixel-level programming signals 926. For example, to disable pixel cell 950, pixel-cell controller 970 can be programmed by pixel-level programming signals 926 to de-assert PWR_GATE to turn off buffer 606 and comparator 960. Moreover, to increase the quantization resolution, pixel-cell controller 970 can be programmed by pixel-level programming signals 926 to reduce the capacitance of charge storage device 605, to increase the gain of comparator 960 via GAIN signal, etc. To increase the frame rate, pixel-cell controller 970 can be programmed by pixel-level programming signals 926 to increase BIAS1 signal and BIAS2 signal to increase the bandwidth of, respectively, buffer 606 and comparator 960. Further, to control the precision of pixel data output by pixel cell 950, pixel-cell controller 970 can be programmed by pixel-level programming signals 926 to, for example, connect only a subset of bits (e.g., most significant bits) of the counter to memory 955 so that memory 955 only stores the subset of bits, or to store the indications stored in output logics 962 to memory 955 as the pixel data. In addition, pixel-cell controller 970 can be programmed by pixel-level programming signals 926 to control the sequence and timing of AB and TG signals to, for example, adjust the exposure period and/or select a particular quantization operation (e.g., one of TTS, FD ADC, or PD ADC) while skipping the others based on the operation condition, as described above.

Figure 10A:
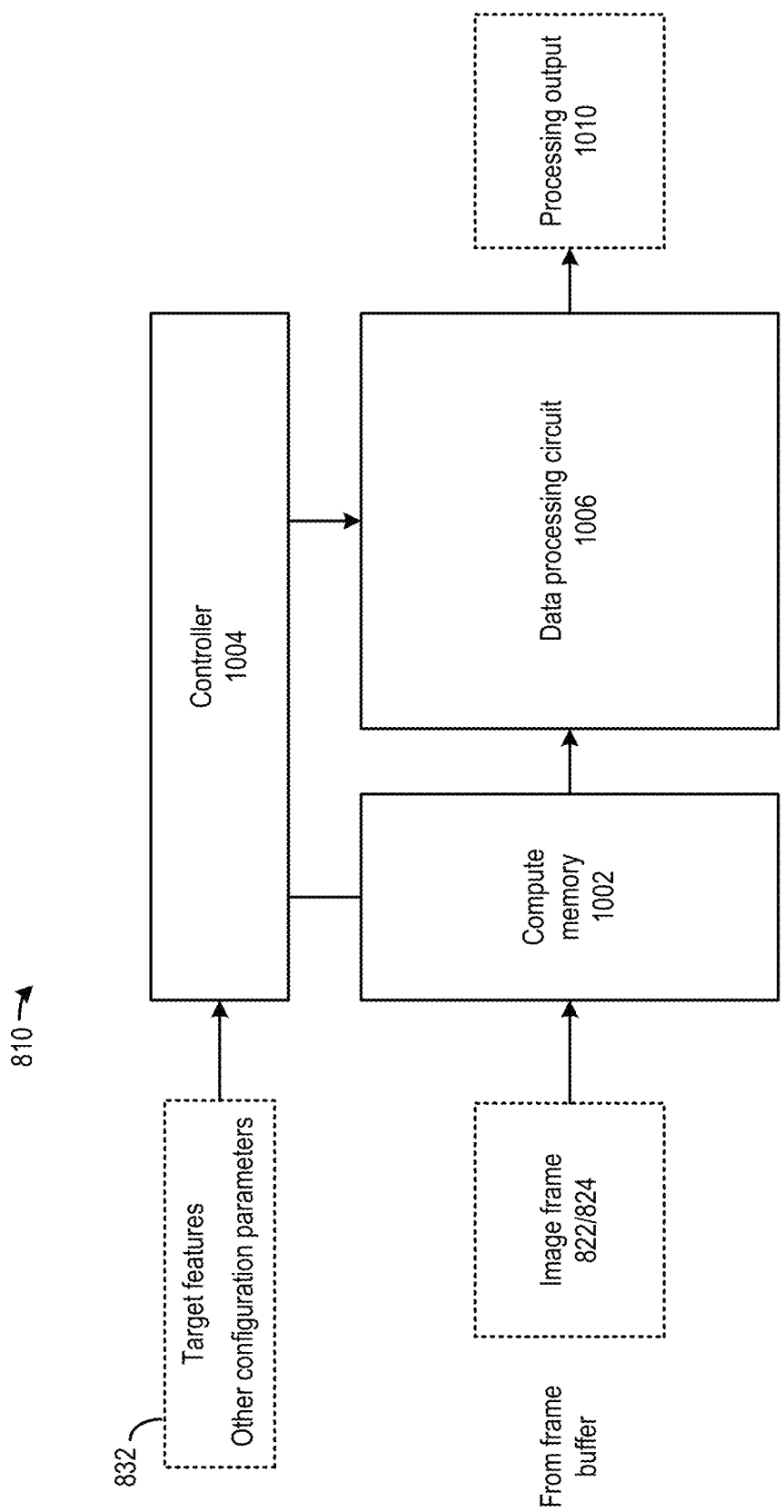
FIG. 10A, FIG. 10B, and FIG. 10C illustrate example internal components of an image processor of FIG. 8A and FIG. 8B and their operations.
Figure 10B:
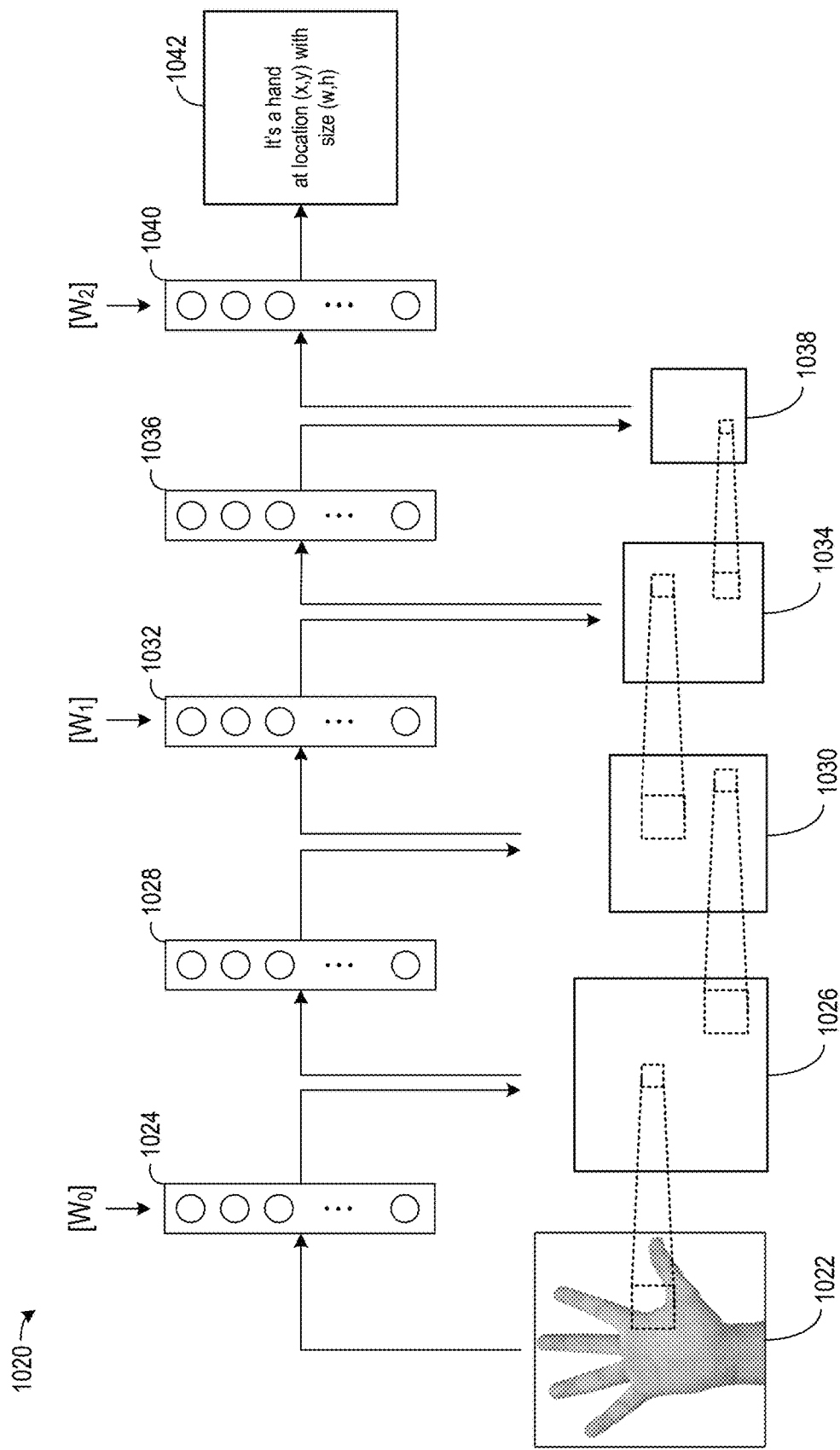
Figure 10C:
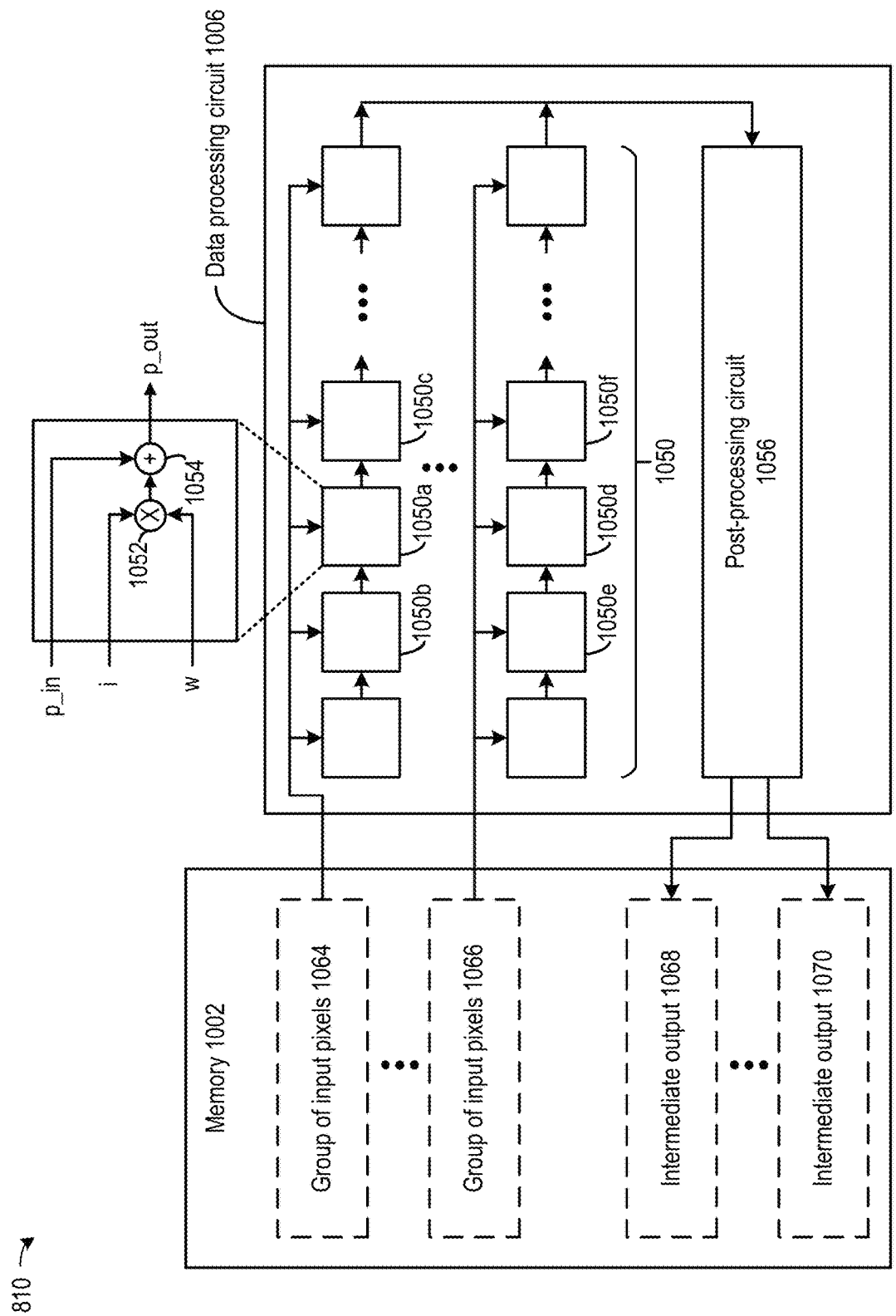

FIG. 10A, FIG. 10B, and FIG. 10C illustrate examples of internal components of image processor 810. As shown in FIG. 10A, image processor 810 may include a compute memory 1002, a controller 1004, and data processing circuit 1006. Compute memory 1002 can store pixels of an image frame to be processed by image processor 810, such as image frame 822/824 of FIG. 8A. Controller 1004 can receive, as part of second programming signals 832 from host processor 804, image processing configuration parameters. Controller 1004 can then control data processing circuit 1006 to fetch the image frame from compute memory 1002 to perform an image-processing operation based on the configuration parameters. For example, in a case where the image-processing operation is to detect an object of interest and to track its location in the image frame, second programming signals 832 can include image features of the object of interest. Data processing circuit 1006 can generate an image processing output 1008 indicating, for example, a pixel location of the object in the image frame.

In some examples, data processing circuit 1006 can implement a machine learning model, such as a convolutional neural network (CNN) model, to perform the object detection and tracking operation. FIG. 10B illustrates an example architecture of CNN 1020 that can be implemented by data processing circuit 1006. Referring to FIG. 10B, CNN 1020 may include four main operations: (1) convolution; (2) processing by an activation function (e.g., ReLU); (3) pooling or sub-sampling; and (4) classification (fully-connected layer). These operations may be the basic building blocks of every convolutional neural network. Different CNNs may have different combinations of these four main operations.

An image to be classified, such as input image 1022, may be represented by a matrix of pixel values. Input image 1022 may include multiple channels, each channel representing a certain component of the image. For example, an image from a digital camera may have a red channel, a green channel, and a blue channel. Each channel may be represented by a 2-D matrix of pixels having pixel values in the range of 0 to 255 (i.e., 8-bit). A gray-scale image may have only one channel. In the following description, the processing of a single image channel using CNN 1020 is described. Other channels may be processed similarly.

As shown in FIG. 10B, input image 1022 may be processed by a first convolution layer (e.g., an input layer) 1024 using a first weight array (labelled [W0] in FIG. 10B). First convolution layer 1024 may include multiple nodes, with each node assigned to multiply a pixel of input image 1022 with a corresponding weight in first weights array. As part of the convolution operation, blocks of pixels of input image 1022 can be multiplied with first weights array to generate a product, and the products are then accumulated to generate a sum, in a multiply-and-accumulate (MAC) operation. Each sum can then post-processed by an activation function to generate an intermediate output. The activation function can simulate the behavior of the linear perceptron in neural network. The activation function can include a linear function or a non-linear function (e.g., ReLU, softmax). The intermediate outputs can form an intermediate output tensor 1026. The first weights array can be used to, for example, extract certain basic features (e.g., edges) from input image 1022, and intermediate output tensor 1026 can represent a distribution of the basic features as a basic feature map. Intermediate output tensor 1026 may be passed to a pooling layer 1028, where intermediate output tensor 1026 may be subsampled or down-sampled by pooling layer 1028 to generate an intermediate output tensor 1030.

Intermediate output tensor 1030 may be processed by a second convolution layer 1032 using a second weights array (labelled [W₁ in FIG. 10B]. The second weights array can be used to, for example, identify patterns of features specific for an object, such as a hand, from intermediate output tensor 1030. As part of the convolution operation, blocks of pixels of tensor 1030 can be multiplied with the second weights array to generate a product, and the products can be accumulated to generate a sum. Each sum can also be then processed by an activation function to generate an intermediate output, and the intermediate outputs can form an intermediate output tensor 1034. Intermediate output tensor 1034 may represent a distribution of features representing a hand. Intermediate output tensor 1034 may be passed to a pooling layer 1036, where intermediate output tensor 1034 may be subsampled or down-sampled to generate an intermediate output tensor 1038.

Intermediate output tensor 1038 can then be passed through a fully-connected layer 1040, which can include a multi-layer perceptron (MLP). Fully-connected layer 1040 can perform a classification operation based on intermediate output tensor 1038 to, for example, classify whether the object in image 1022 represents a hand, the likely pixel location of the hand in image 1022, etc. Fully-connected layer 1040 can multiply intermediate output tensor 1038 with a third weights array (labelled [W₂] in FIG. 10B) to generate sums, and the sums can be processed by an activation function to generate a neural network output 1042. Neural network output 1042 can indicate, for example, whether an object of interest (e.g., a hand) is present in the image frame and its pixel location and size.

FIG. 10C illustrates an example of internal components of data processing circuit 1006 and their operations to implement CNN 1020. As shown in FIG. 10C, data processing circuit 1006 can include an array of arithmetic circuits 1050. Each arithmetic circuit, such as 1050a-1050f, can include a multiplier 1054 to multiply an input data element (represented with "i") and a weight data element (represented with "w") to generate a local partial sum. The input data element can correspond to, for example, a pixel in the image frame, whereas the weight data element can be a corresponding weight in the weight matrix (e.g., [W₀], [W₁], [W₂]) of a neural network layer. Each arithmetic circuit 1050 can also include an adder 1052 to add the local partial sum with an input partial sum (labelled "p_in") received from a neighboring arithmetic circuit and generate an output partial sum (labelled "p_out"). The output partial sum is then input to another neighboring arithmetic circuit. For example, arithmetic circuit 1050a can receive an input partial sum from arithmetic circuit 1050b, add its local partial sum to the input partial sum to generate an output partial sum, and provide the output partial sum to arithmetic circuit 1050c. As such, each arithmetic circuit generates a local partial sum, and the local partial sums are accumulated in the array of arithmetic circuits to form an intermediate output. Data processing circuit 1006 further includes a post-processing circuit 1056 to perform post-processing (e.g., activation function processing, pooling) on the intermediate outputs. In some examples, data processing circuit 1006 can include other types of circuits, such as look-up tables, to implement multiplier 1054 and post-processing circuit 1056.

To perform the convolution and post-processing operations of first input convolution layer 1024 and pooling layer 1028, controller 1004 (not shown in FIG. 10C) can control data processing circuit 1006 to fetch input data from compute memory 1002 based on predetermined mapping between the input data and the arithmetic circuits according to CNN 1020. For example, a first group of arithmetic circuits, including arithmetic circuits 1050a, 1050b, and 1050c, can fetch a group of input pixels 1064 from compute memory 1002, whereas a second group of arithmetic circuits, including arithmetic circuits 1050d, 1050e, and 1050f, can fetch a group of input pixels 1066 from compute memory 1002. Each group of arithmetic circuits can perform a convolution operation between the group of input pixels and the weight array based on the multiplication-and-accumulation operations to generate an intermediate output, as described above. The intermediate output can then be post-processed by post-processing circuit 1056. The post-processed output can be stored back to compute memory 1002. For example, an intermediate output 1068 can be generated from the convolution and post-processing of group of input pixels 1064, whereas an intermediate output 1070 can be generated from the convolution and post-processing of group of input pixels 1066. After the operations of first convolution layer 1024 and pooling layer 1028 complete and the intermediate outputs are stored in compute memory 1002, controller 1004 can control the array of arithmetic circuits 1050 to fetch the intermediate outputs to perform the convolution and post-processing operations of second convolution layer 1032 and pooling layer 1036 to generate and store a second set of intermediate outputs in compute memory 1002. The controller can then control the array of arithmetic circuits to fetch the second set of intermediate outputs, based on the topology of fully-connected layer 1040, to generate neural network output 1042.

Figure 11A:
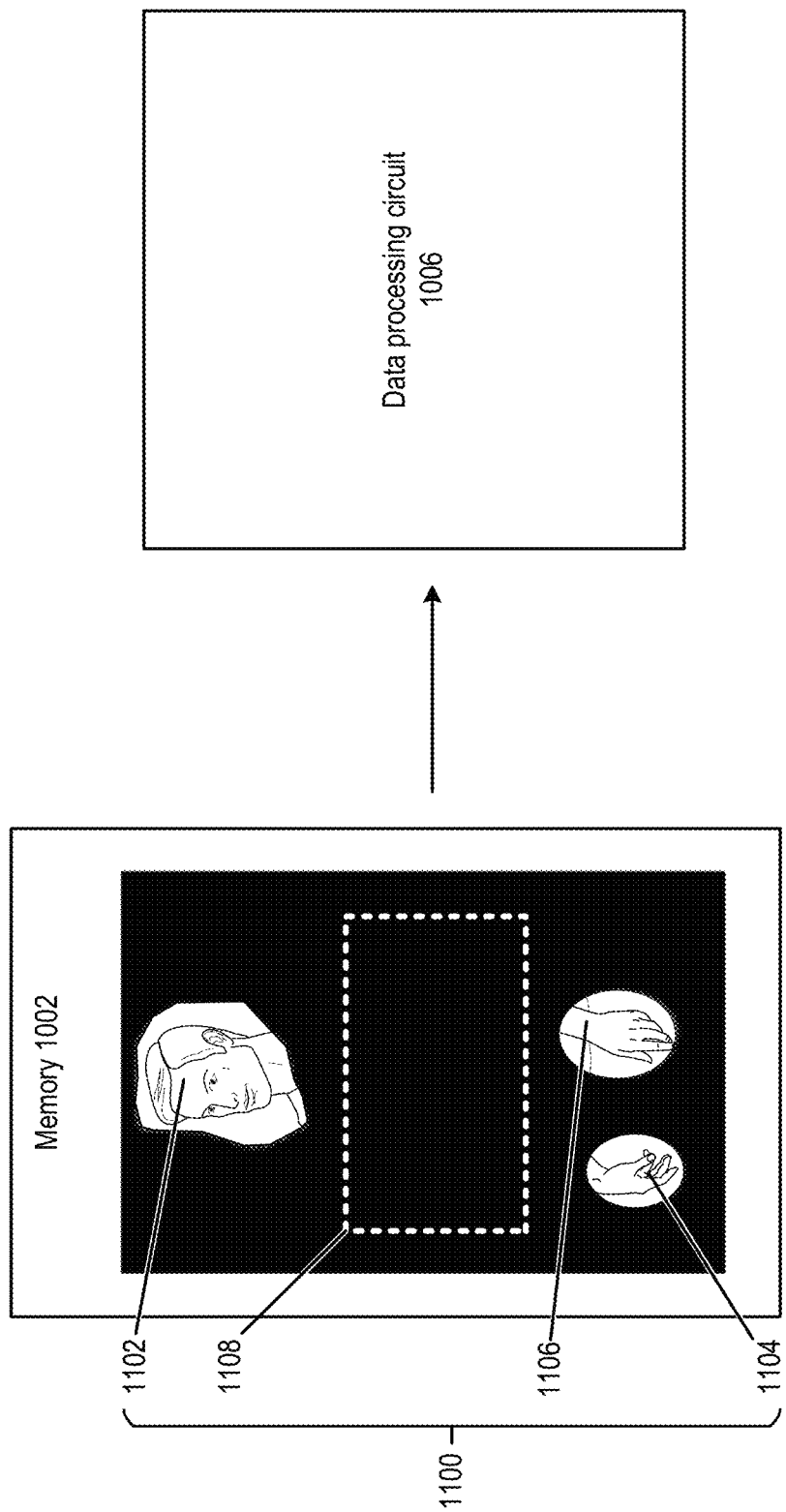
FIG. 11A, FIG. 11B, and FIG. 11C illustrate example internal components of the image processor of FIG. 10A-FIG. 10C and their operations.

As described in FIG. 8A, image processor 810 may receive a sparse image from frame buffer 809 which includes active pixels and inactive pixels. The active pixels may correspond to one or more objects of interests, whereas the inactive pixels may contain no image information (e.g., having completely dark or other predetermined colors). FIG. 11A illustrates an example of a sparse image 1100 stored in compute memory 1002 of image processor 810. As shown in FIG. 11A, to support an application that tracks a subject's head and hands, sparse image 1100 may include a first group of active pixels 1102 including pixels of a head of the subject, a second group of active pixels 1104 including pixels of a left hand of the subject, and a third group of active pixels 1106 including pixels of a right hand of the subject. The group of active pixels can be generated and transmitted by pixel cells array 808 based on first programming signals 820. The rest of the pixels of sparse image 1100, including a group of pixels 1108, are inactive and contain no image information. Each inactive pixel can have a pixel value of zero or another value to indicate the pixel being inactive. In some examples, the memory devices of frame buffer 809 can be reset prior to receiving active pixels of an image frame. While the active pixels are written into the corresponding memory devices of frame buffer 809, the rest of the memory devices that do not receive the active pixels may retain their reset state (e.g., a logical zero) and become inactive pixels. Pixel values representing the active pixels and inactive pixels of the image frame can then be stored in compute memory 1002 of image processor 810.

Although generation and transmission of sparse image 1100 can reduce the power consumption by pixel cells array 808, if data processing circuit 1006 are to perform an processing operation (e.g., convolution operation) on each and every pixel of sparse image 1100, data processing circuit 1006 may still consume a lot of power. On the other hand, as shown in FIG. 11A, given that only small subsets of the pixels are active pixels and contain image data while a majority of pixels are inactive pixels, having data processing circuit 1006 to perform the processing operations on the inactive pixels will not generate information useful for detecting and locating the object of interest. As a result, a huge amount of power is wasted in generating information that is not useful, which can degrade the overall power and computation efficiencies of the image-processing operation.

Figure 11B:
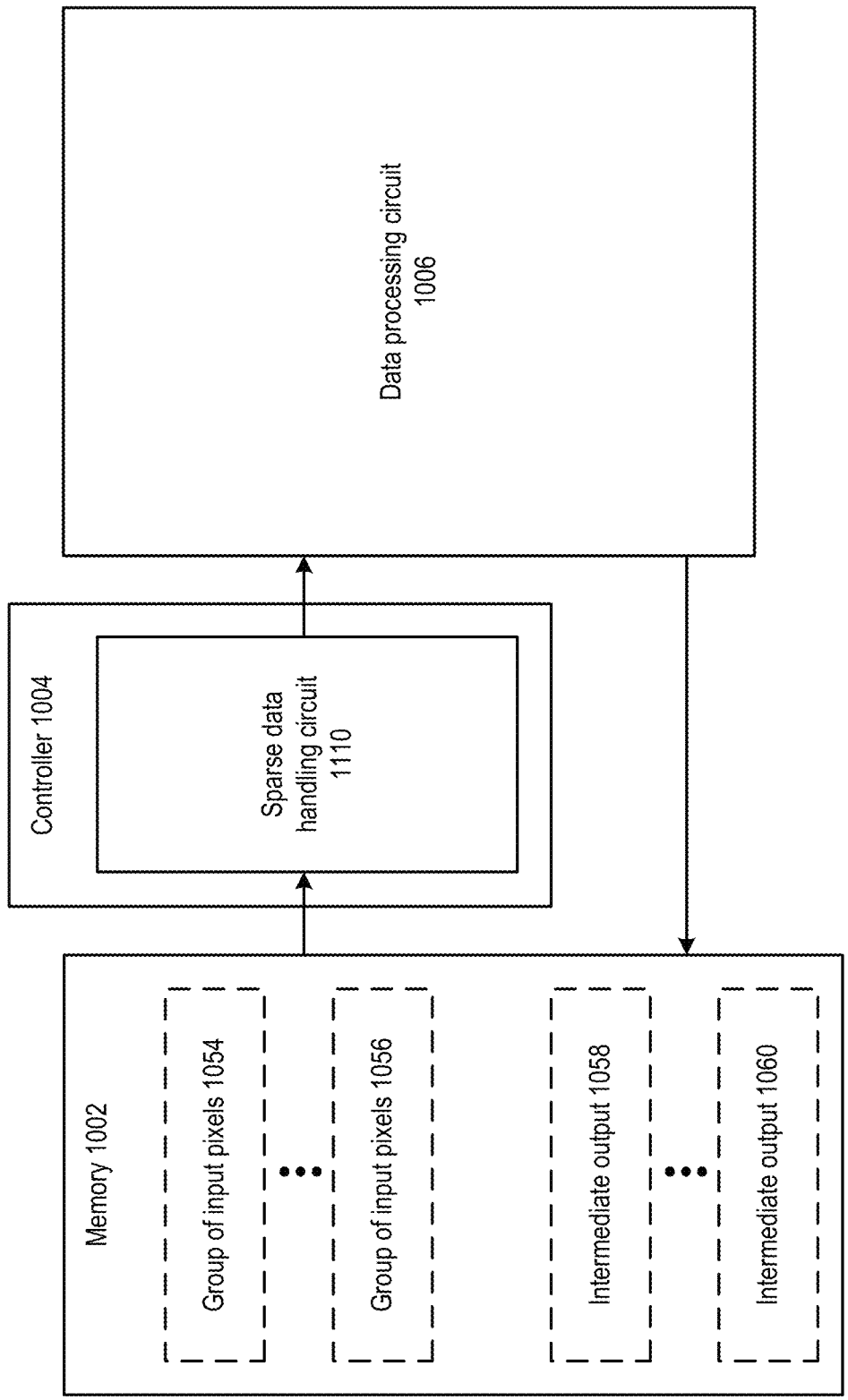

Referring to FIG. 11B, to improve the overall power and computation efficiencies, controller 1004 can include a sparse data handling circuit 1110. In some examples, sparse data handling circuit 1110 can fetch groups of input data from memory 1002 to a neural network layer (e.g., pixels, intermediate outputs, etc.) and detect a subset of the groups of input data where the entire group of input data have inactive values (e.g., zero), or otherwise contain no image information. Sparse data handling circuit 1110 can exclude those groups of inactive input data from data processing circuit 1006, and data processing circuit 1006 do not generate and write the intermediate outputs for those groups of inactive input data back to compute memory 1002. On the other hand, groups of input data that include active values (e.g., non-zero) representing image information can be forwarded by sparse data handling circuit 1110 to data processing circuit 1006, which can then process the group of active input data to generate and write the intermediate outputs back to compute memory 1002.

In some examples, sparse data handling circuit 1110 can also receive information about the sparsity of the image frame stored in memory 1002. The sparsity information can be based on, for example, programming map information from programming map generator 812, or based on neural network model topology as to be described below. Sparse data handling circuit 1110 can determine the memory addresses of memory 1002 that store active pixel data, and fetch the active pixel data from those memory addresses.

In a case where compute memory 1002 is reset/re-initialized (e.g., to logical zeroes) between different image frames, memory devices of compute memory 1002 that are assigned to store the intermediate outputs for groups of inactive input data (assigned based on mapping between inputs and outputs of the neural network layer) can retain their initialized/reset state and not accessed for the groups of inactive input data. Meanwhile, memory devices of compute memory 1002 that are assigned to store the intermediate outputs for groups of active input data can be updated by data processing circuit 1006. Such arrangements can reduce the access to compute memory 1002 for the processing of the sparse image data, which can further reduce power consumption by compute memory 1002 and image processor 810 as a whole.

For example, referring back to FIG. 10C, sparse data handling circuit 1110 can detect that group of input pixels 1064 may be entirely inactive and contain no image information, whereas group of input pixels 1066 contain active pixels and image information. Sparse data handling circuit 1110 can exclude group of input pixels 1064 and the corresponding weights from the first group of arithmetic circuits (including arithmetic circuits 1050a-1050c), or otherwise disable the first group of arithmetic circuits, such that no intermediate output is written back to compute memory 1002 for group of input pixels 1064. Intermediate output 1068 for group of input pixels 1064 can retain a reset value (e.g., a logical zero) at the end of the processing for first convolution layer 1024. On the other hand, sparse data handling circuit 1110 can provide group of input pixels 1066 and the corresponding weights to the second group of arithmetic circuits (including arithmetic circuits 1050d-1050f) to generate intermediate output 1070, which can then be written to compute memory 1002. Sparse data handling circuit 1110 can also repeat the sparse data handling for other neural network layers based on detecting inactive groups of input data and excluding them from data processing circuit 1006, to prevent data processing circuit 1006 from performing computations and writing the intermediate outputs to compute memory 1002 for those inactive groups of input data.

Figure 11C:
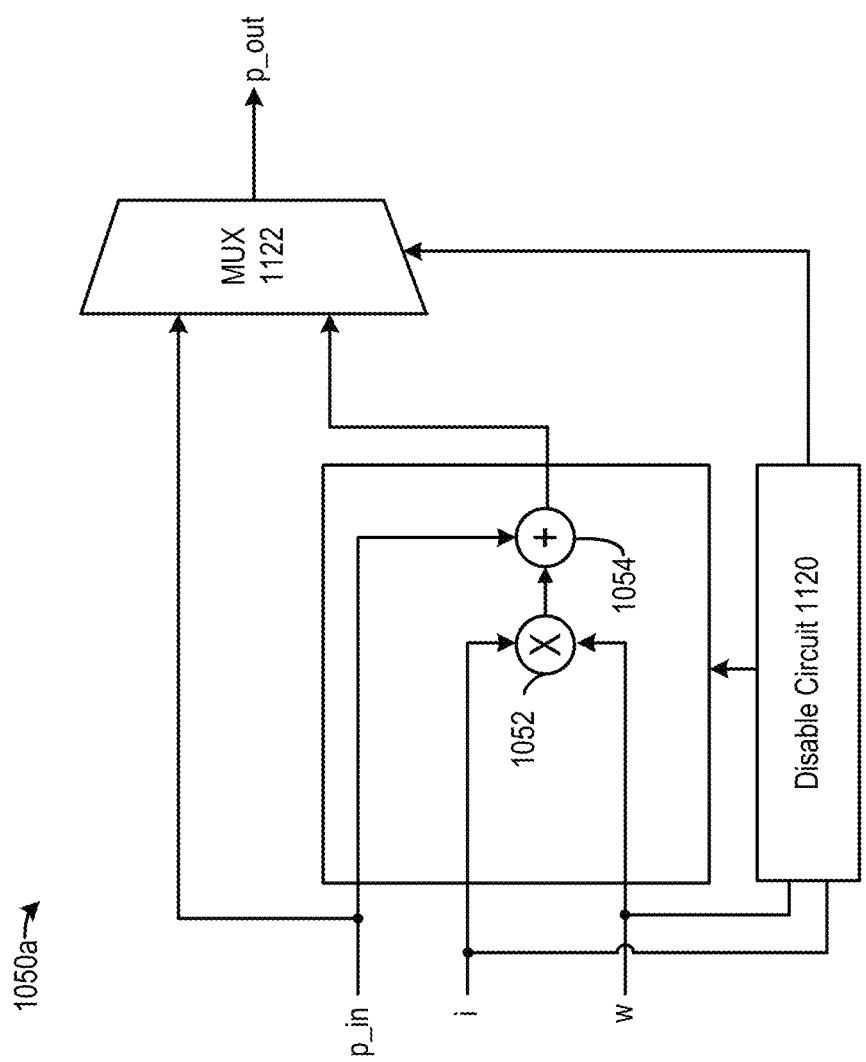

In addition, data processing circuit 1006 can also include bypass mechanisms to reduce power consumption associated with processing of inactive/zero input data within a group of active input data forwarded by sparse data handling circuit 1110. Specifically, referring to FIG. 11C, arithmetic circuit 1050a can include a disable circuit 1120 and a multiplexor 1122. When one or more of the input data element (i) or the weight data element (w) is a zero, the product will be zero. To avoid arithmetic circuit 1050a wasting power in computing a zero, disable circuit 1120 can disable adder 1052 and multiplier 1054 (e.g., based on cutting off their power supply) upon detecting that one or more of the input data element (i) or the weight data element (w) is a zero. Moreover, as the product will be zero, multiplexor 1122 can be controlled to directly pass input partial sum (p_in) as output partial sum (p_out).

In some examples to further reduce power consumption and improve power and computation efficiencies, image sensor 802 can support a temporal sparsity operation. As part of the temporal sparsity operation among the active pixels, pixels that are static and pixels that are non-static can be identified. Image processor 810 can be configured to perform image-processing operations only on the non-static pixels, whereas the static pixels, as well as the inactive pixels, can be excluded by sparse data handling circuit 1110 from data processing circuit 1006, to further reduce power consumption and improve power and computation efficiencies.

Figure 12A:
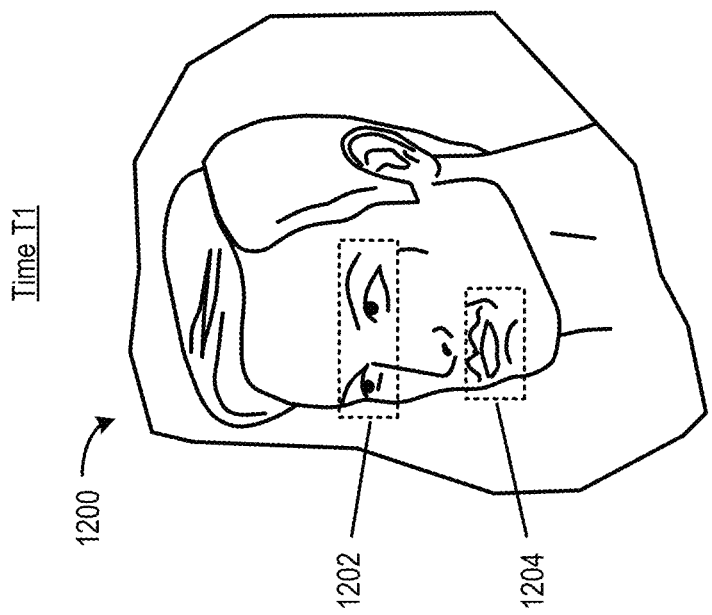
FIG. 12A, FIG. 12B, and FIG. 12C illustrate example internal components of the frame buffer of FIG. 8A and FIG. 8B and their operations.
Figure 12A:
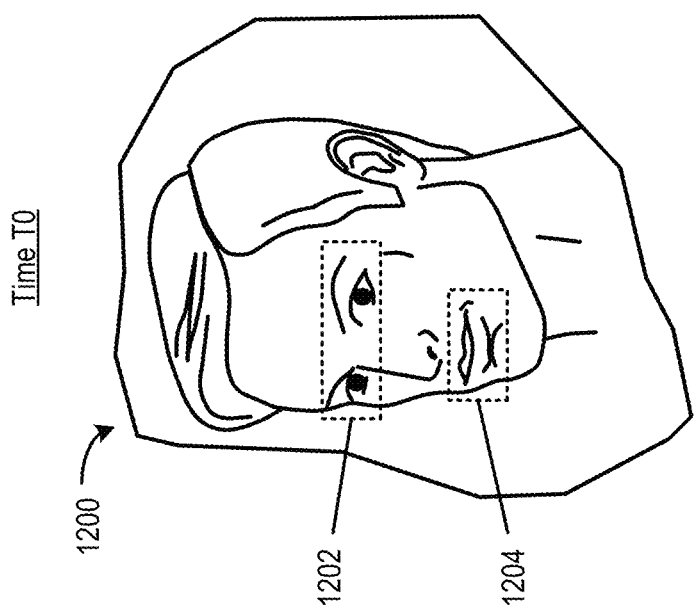

FIG. 12A illustrates an example of a group of active pixels 1200 having static and non-static pixels. As shown in FIG. 12A, group of active pixels 1200 are captured in two image frames at time T0 and at time T1. Group of active pixels 1200 can include an object of interest to be tracked (e.g., the head of a subject). Group of active pixels 1200 can also include subsets of pixels 1202 and 1204 (which include pixels of eyes and mouth in FIG. 12A) which experience changes between times T0 and T1, while the rest of active pixels 1200 remain static between times T0 and T1. A pixel can be determined to be static if the degree of change of the pixel is below a threshold.

Figure 12B:
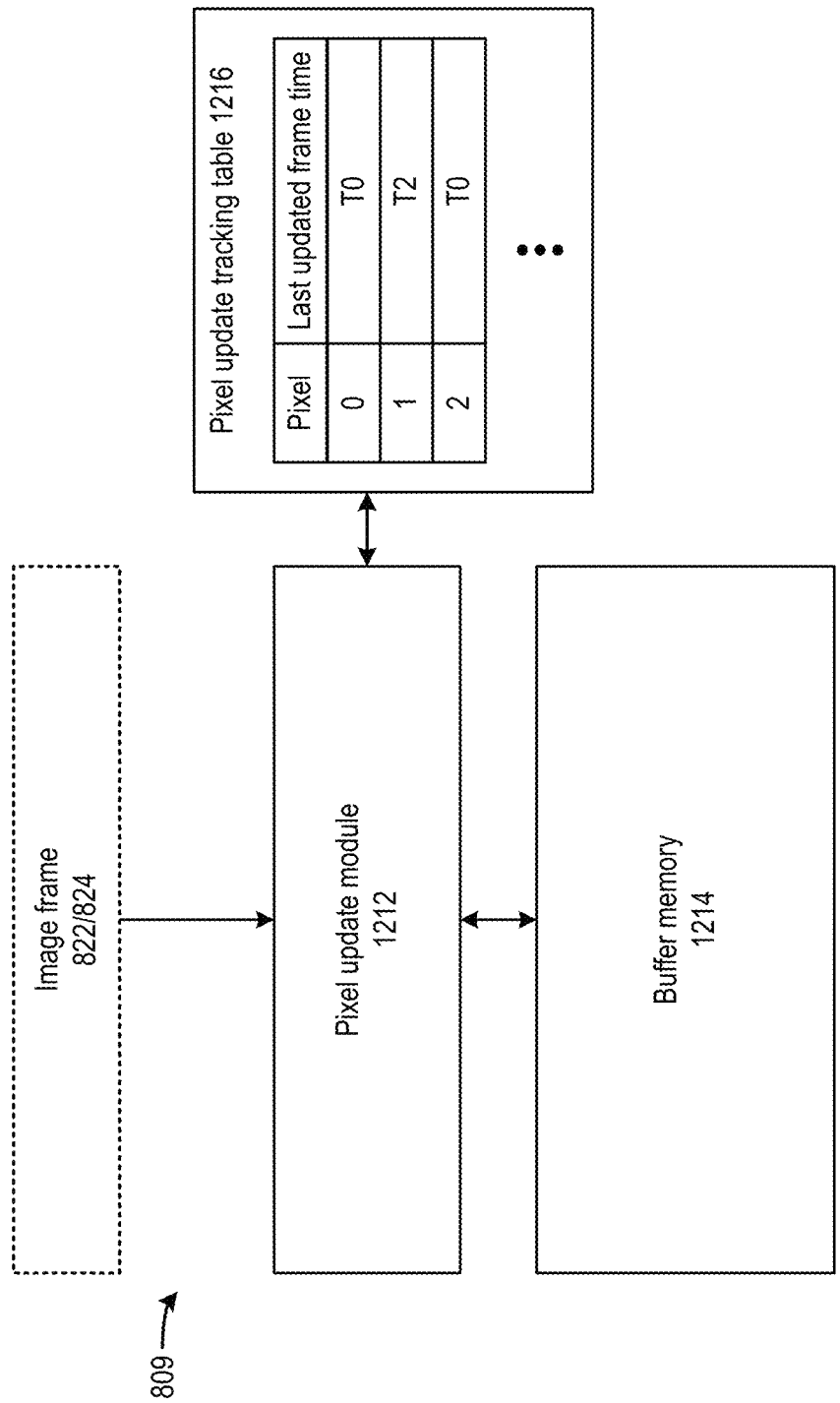

In some examples, frame buffer 809 can detect static pixels from the active pixels output by the image sensor, and store pixel values for those pixels to signal to the image processor circuit that those pixels are static pixels. In some examples, frame buffer 809 can also detect static pixels from pixels stored in the frame buffer, some of which can correspond to inactive pixels which the image sensor do not provide and hence remain static. FIG. 12B includes example internal components of frame buffer 809 to support signaling of static pixels. As shown in FIG. 12B, frame buffer 809 can include a pixel update module 1212, a buffer 1204, and a pixel update tracking table 1216. Specifically, pixel update module 1212 can receive the most recent image frame received from pixel cells array 808, including active and inactive pixels, and overwrite the prior image frame pixels in buffer memory 1214 with the most recent image frame. For each pixel in buffer memory 1214, pixel update module 1212 can determine a degree of change of the pixel with respect to the prior image frame, and determine whether the pixel is static or non-static based on whether the degree of change exceeds a threshold. Pixel update module 1212 can also update, in pixel update tracking table 1216, the last frame time the pixel was updated (and regarded as non-static) for each pixel. After pixel update module 1212 update a pixel with a pixel value from a prior frame generated by array of pixel cells 808, pixel update module 1212 can track a number of frames by which the pixel remains static (static frame time) based on information from pixel update tracking table 1216, and set the pixel value of the pixel based on the static frame time.

Figure 12C:
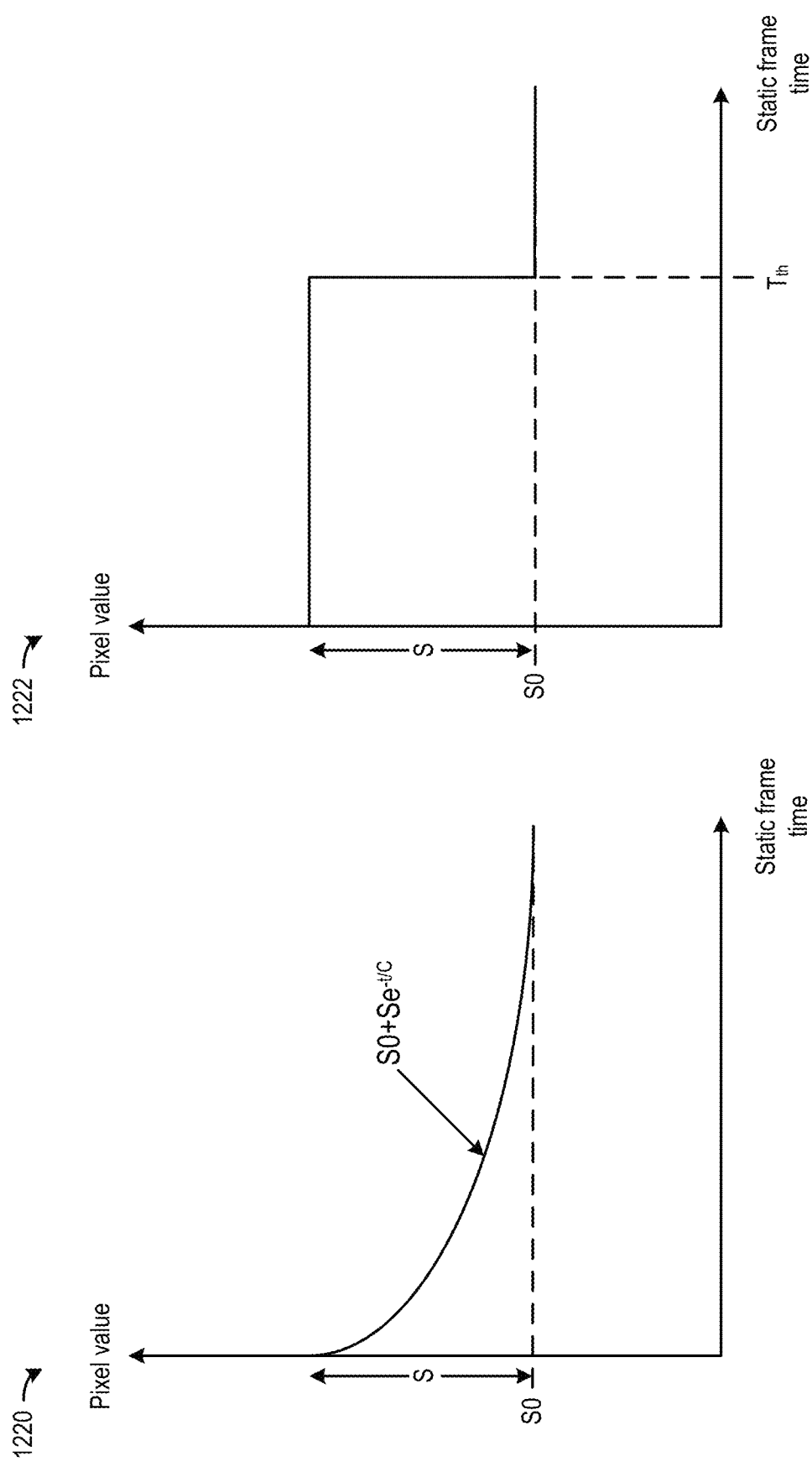

FIG. 12C illustrate examples techniques by which pixel update module 1212 can set the pixel values of the static pixels. As shown in chart 1220 on the left of FIG. 12C, pixel update module 1212 can set a pixel value of a static pixel based on a leaky integrator function having a time constant C as follows:

$$P = S0 + Se^{-t/C} \qquad \text{(Equation 1)}$$

In Equation 1, P represents the pixel value set by pixel update module 1212, S0 represents a predetermined pixel value to represent a static pixel, whereas S represents a difference between the original pixel value obtained the prior frame and S0. The original pixel value is obtained from the prior frame when that pixel last experiences a degree of change larger than the change threshold and is thus updated in the frame buffer. The pixel value of the static pixel is set at S0+S and decays as the pixel remains static. Ultimately the pixel value of the static pixel settles at S0 if the pixel remains static for an extended number of frames.

As another example, as shown in chart 1222 on the right of FIG. 12C, pixel update module 1212 can set a pixel value of a static pixel based on a step function. Specifically, pixel update module 1212 can leave the pixel value of the static pixel at S0+S for a threshold number of frames represented by $T_{th}$. After the threshold number of frames has passed, pixel update module 1212 can set the pixel value at the pixel value S0.

The predetermined pixel value S0 can correspond to a dark color (zero), a white color (255), a gray color (128), or any value that indicate a static pixel. In all these cases, the image processor can distinguish between static pixels and non-static pixels based on identifying pixel values that signal static pixels, and perform the image-processing operations only on the non-static pixels as described above.

Figure 13A:
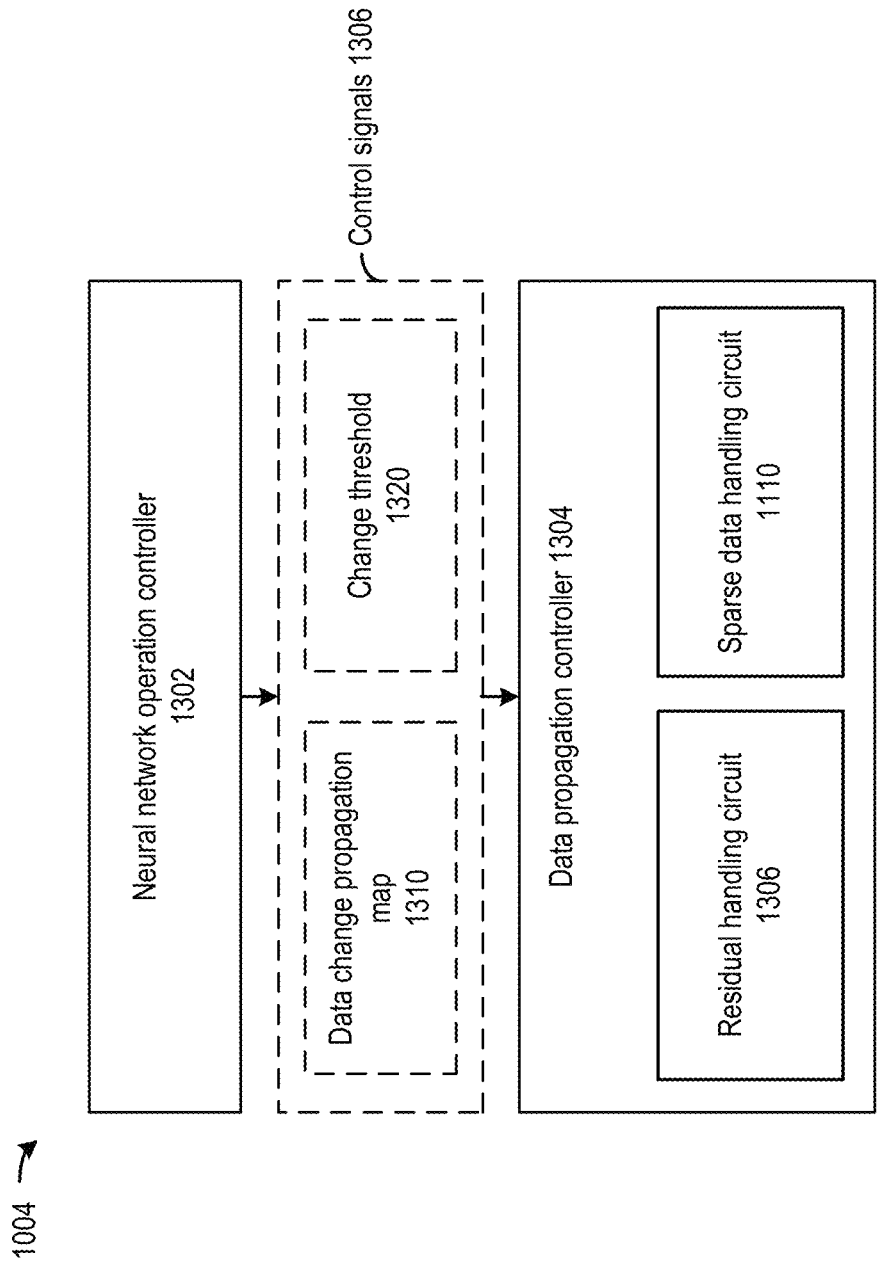
FIG. 13A, FIG. 13B, and FIG. 13C illustrate example internal components of the image processor of FIG. 10A-FIG. 10C and their operations.

In some examples, controller 1004 of image processor 810 can include additional components to further refine the handling of static pixels. As shown in FIG. 13A, controller 1004 can include a neural network operation controller 1302 and a data propagation controller 1304, which can include sparse data handling circuit 1110 of FIG. 11B. Neural network operation controller 1302 can determine the operations for each neural network layer including fetching of input data, storage of intermediate output data, arithmetic operations, and generate control signals 1306 that reflect these operations. Data propagation controller 1304 can carry out the fetching of input data and storage of intermediate output data based on control signals 1306.

Specifically, neural network operation controller 1302 can have topology information of the neural network model being implemented by data processing circuit 1006 including, for example, the input/output connectivity for each neural network layer and between adjacent network layers, the size of each neural network layer, the quantization operation and other post-processing operations (e.g., activation function processing, pooling operation.) at each neural network layer, the receptive field of the neural network, etc. Neural network operation controller 1302 can generate control signals 1306 to control fetching of input data, storage of intermediate output data, and the arithmetic operations based on the topology information. For example, neural network operation controller 1302 can include, as part of control signals 1306, a mapping between the addresses of the input data and the addresses of the intermediate output in compute memory 1002 for each neural network based on the connectivity information, which allow data propagation controller 1304 to fetch the input data and to store the intermediate output data at the correct memory locations within compute memory 1002.

In addition, neural network operation controller 1302 can include additional information in control signals 1306 to facilitate static pixel handling operations. For example, based on the topology information of the neural network model as well as the distribution of the active and inactive pixels, neural network operation controller 1302 can determine a data change propagation map 1310 which indicates how the change of pixels (between image frames) propagate in different layers of the neural network, and provide the map to data propagation controller 1304. Based on identifying the static pixels and the data change propagation map, data propagation controller 1304 (and sparse data handling circuit 1110) can selectively fetch input data that are predetermined to be non-static into data processing circuit 1006 to generate a subset of the intermediate output data, and to store the subset of the intermediate output data at compute memory 1002. Meanwhile, intermediate output data corresponding to the static pixels (generated from prior frames) are retained in compute memory 1002 and not updated.

Figure 13B:
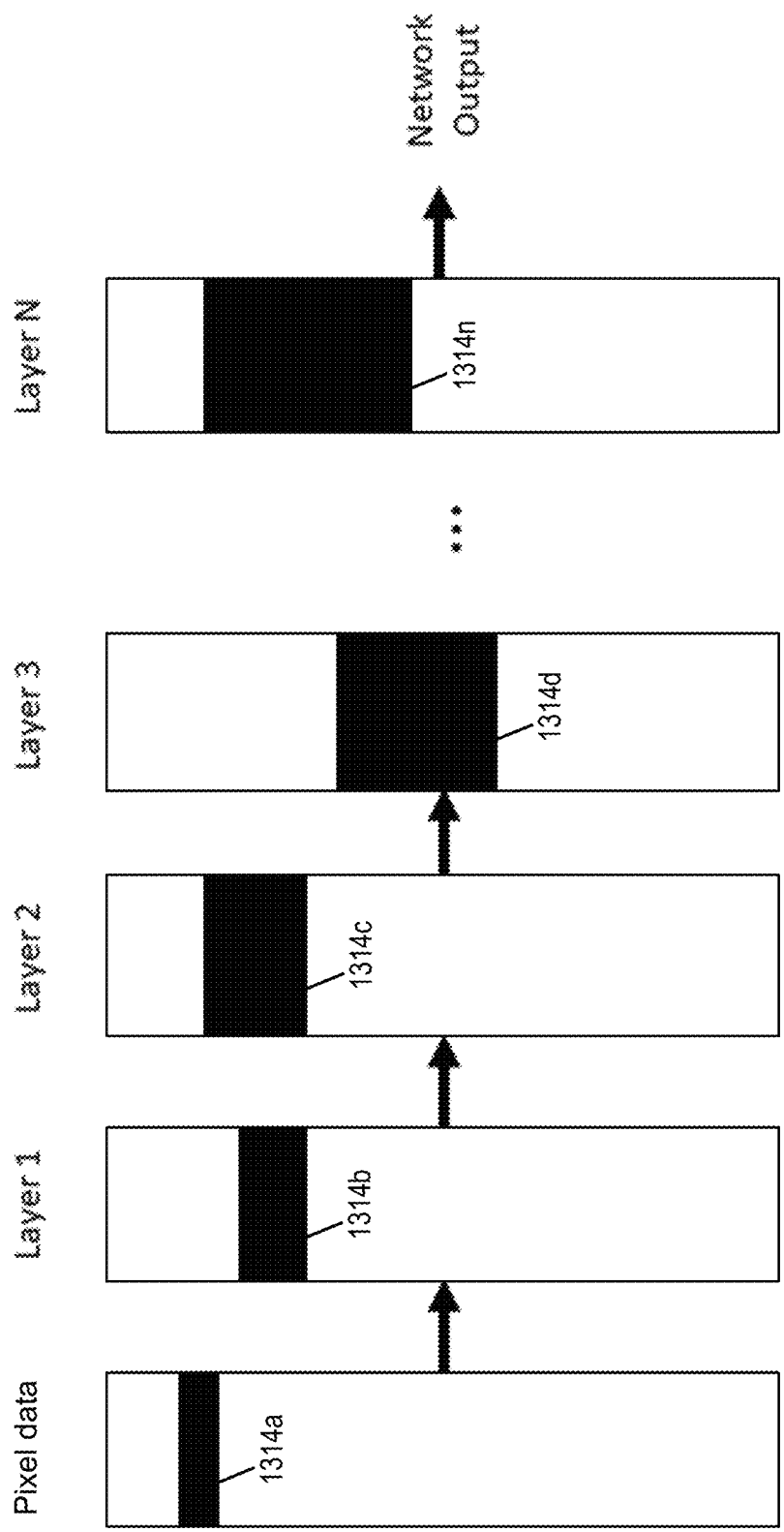

FIG. 13B illustrates an example operation of identifying non-static input/output for different neural network layer based on data change propagation map 1310. In FIG. 13B, the dark regions 1314a, 1314b, 1314c, 1314d, and 1314n can correspond to active data address regions in compute memory 1002 that store non-static/active pixel data, as well as non-static intermediate outputs at each neural network layer, while the white regions can correspond to address regions in compute memory 1002 that store static/inactive pixel data and static intermediate outputs. Based on data change propagation map 1310, data propagation controller 1304 can determine the data address regions in compute memory 1002 that store or will be storing non-static/active pixel data, and fetch pixel data and/or intermediate output data only from those data regions in compute memory 1002 to data processing circuit 1006 to perform the neural network computations (e.g., multiply and accumulation operations) for each neural network layer.

Referring back to FIG. 13A, neural network operation controller 302 can also determine a change threshold 1320 for determining whether a pixel is static. Change threshold 1320 can be determined based on the topology of the neural network model, such as the depth of the neural network model, and the quantization operations and pooling operations at each layer. Specifically, while changes in the pixel data can propagate through the different layers of the neural network model, the degree of changes in the intermediate outputs and in the output of the neural network model typically decreases at the higher neural network layer, especially if the input and output data are heavily quantized (e.g., represented by a very number of bits). Therefore, for a given neural network model having a certain number of layers and a certain quantization scheme, neural network operation controller 302 can determine a change threshold 1320 for the pixel data, such that pixels deemed to be non-static can produce at least a certain degree of change at the neural network model output. In some examples, neural network operation controller 302 can also determine different change thresholds 1320 for different neural network layers due to, for example, different pooling operations being performed at different neural network layers, different quantization precisions at different neural network layers, different sparsity distribution of input data for different neural network layers, etc., to ensure that the non-static input data being selected based on the change threshold can produce meaningful changes at the output data for that neural network layer.

Figure 13C:
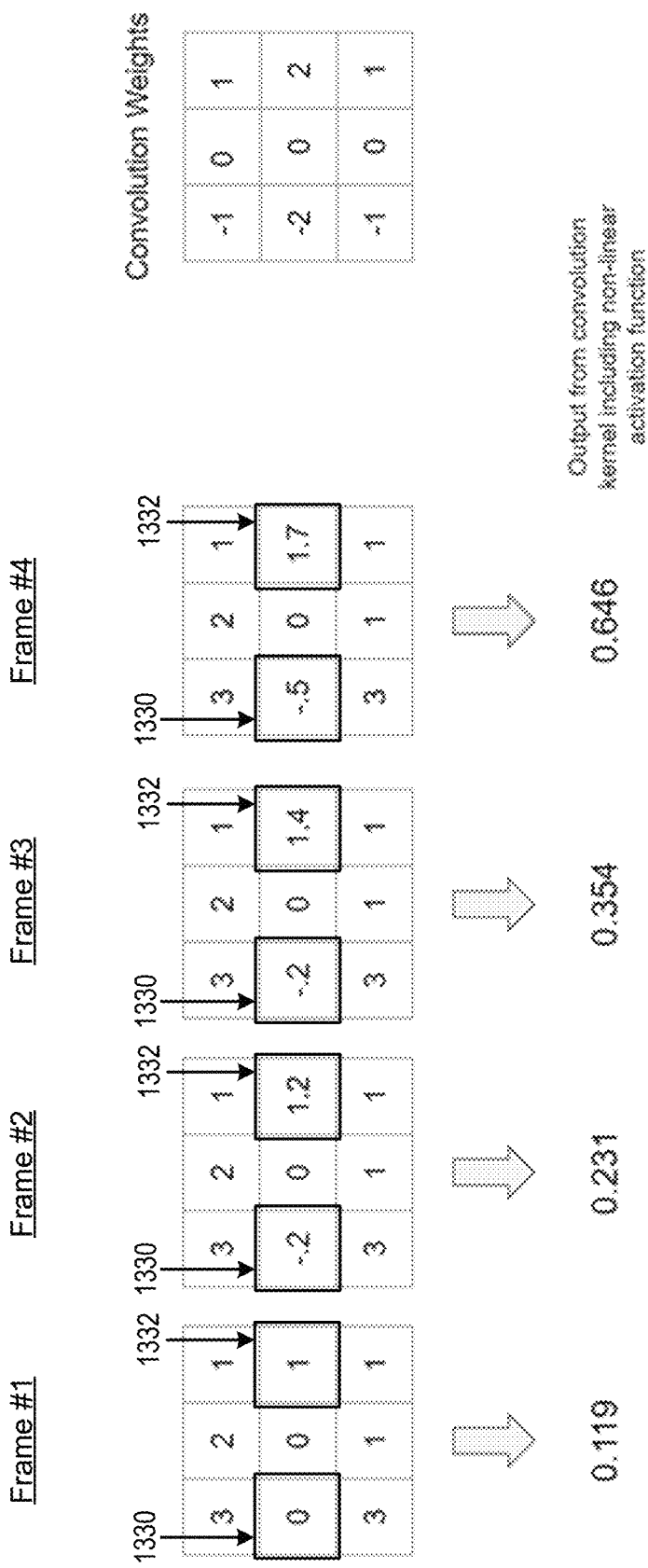

In some examples, data propagation controller 1304 can include a residual handling circuit 1316 to track both changes of the pixels between consecutive image frames, as well as changes of the pixels between non-consecutive image frames separated by a sequence (e.g., 10) of other image frames. Residual handling circuit 1316 can handle a situation where pixels are determined to be static due to having small changes between consecutive image frames, but the changes in the pixels between non-consecutive frames come large enough that the intermediate outputs of the neural network need to be updated. Such a situation is illustrated in FIG. 13C. As shown in FIG. 13C, between frames 1, 2, 3, and 4, only pixels 1330 and 1332 change between frames. Between consecutive frames the change in the pixel values (0.2-0.3) may be small, and those pixels may be determined to be static pixels. But between frame 4 and frame 1, the changes are 0.5-0.7 and are significant, and the changes are reflected in the significant difference in the convolution outputs between frames 1 and 4 (0.119 versus 0.646). To handle such a situation, residual handling circuit 1316 can determine whether a pixel is static based on not only the change in the pixel between two consecutive frames but also on a change between two non-consecutive frames separated by a predetermined number of frames. If the pixel exhibits a small change between two consecutive frames but a large change between the non-consecutive frames, residual handling circuit 1316 can determine that the pixel is a non-static pixel and allow data processing circuit 1006 to perform the image-processing operation on that pixel.

Figure 14A:
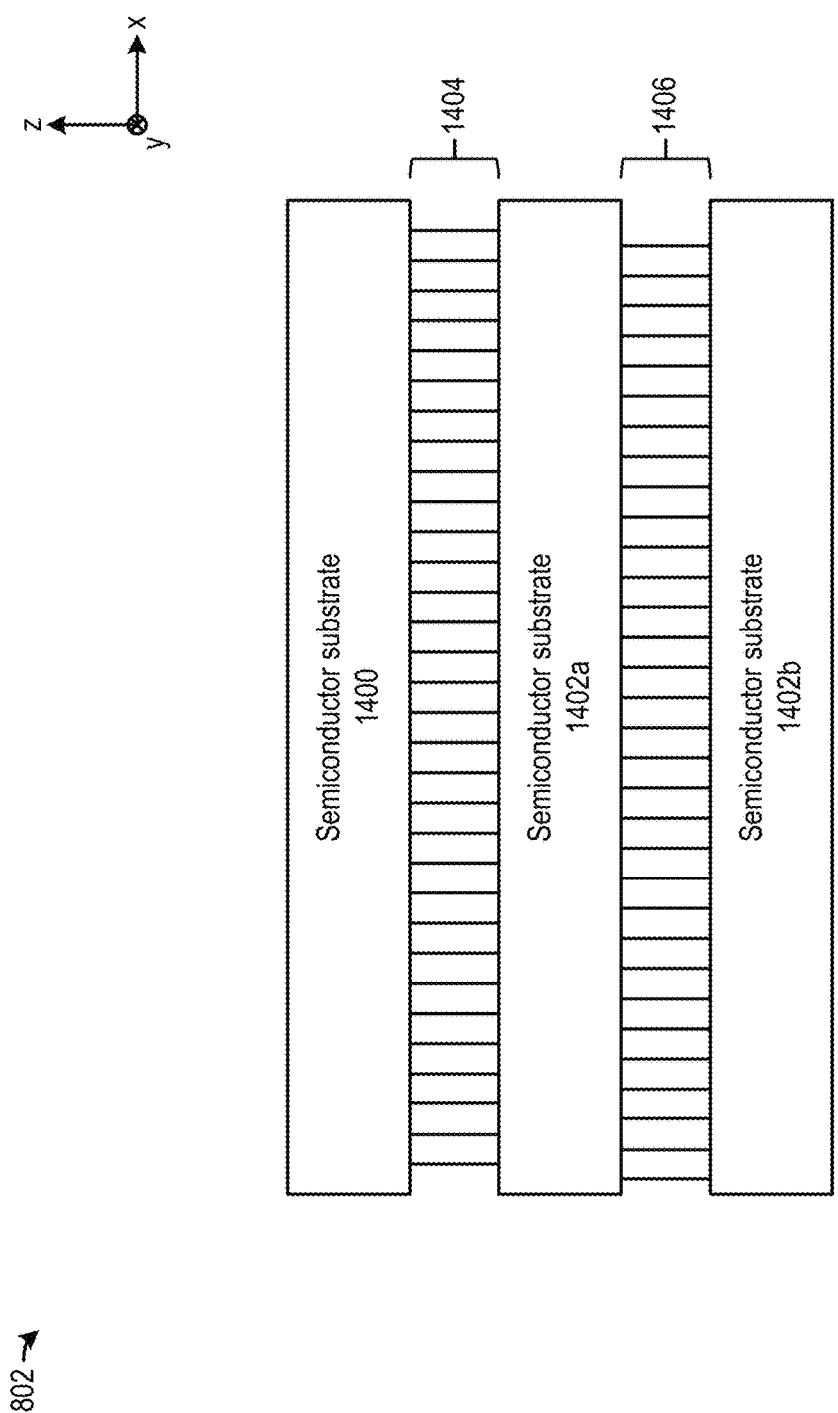
FIG. 14A and FIG. 14B illustrate examples of physical arrangements of the image sensor of FIG. 8A-FIG. 13C.
Figure 14B:
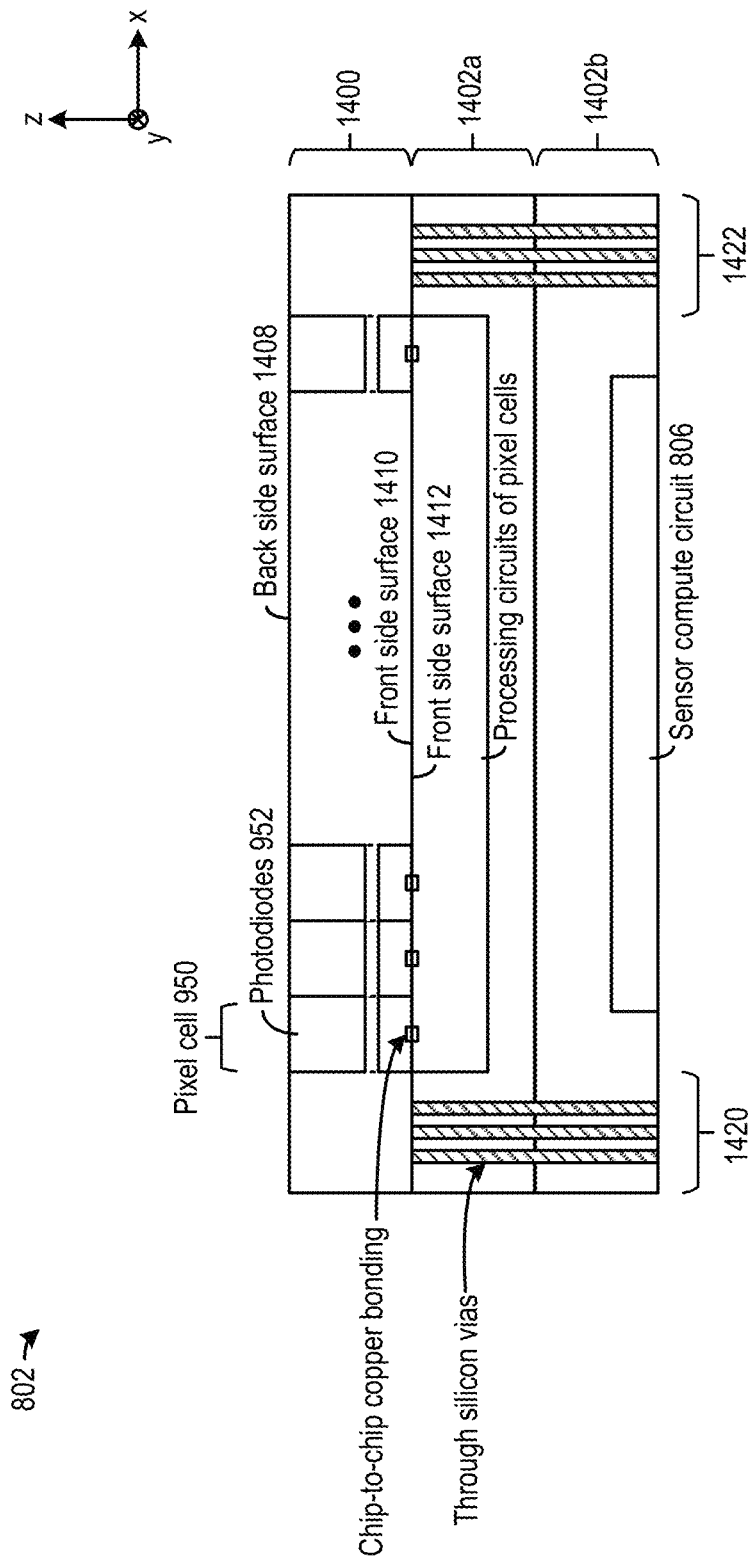

FIG. 14A and FIG. 14B illustrate examples of physical arrangements of image sensor 802. As shown in FIG. 14A, image sensor 802 may include a semiconductor substrate 1400 that includes some of the components of pixel cell array 808, such as photodiodes of the pixel cells, and one or more semiconductor substrates 1402 that include the processing circuits of pixel cell array 808, such as buffer 606, quantizer 607, and memory 955, as well as sensor compute circuit 806. In some examples, one or more semiconductor substrates 1402 includes a semiconductor substrate 1402a and a semiconductor substrate 1402b. Semiconductor substrate 1402a can include the processing circuits of the pixel cell array 808, whereas semiconductor substrate 1402b can include sensor compute circuit 806. Semiconductor substrate 1400 and one or more semiconductor substrates 1402 can be housed within a semiconductor package to form a chip.

In some examples, semiconductor substrate 1400 and one or more semiconductor substrates 1402 can form a stack along a vertical direction (e.g., represented by z-axis), with vertical interconnects 1404 and 1406 to provide electrical connection among the substrates. Such arrangements can reduce the routing distance of the electrical connections between pixel cell array 808 and sensor compute circuit 806, which can increase the speed of transmission of data (especially pixel data) from pixel cell array 808 to sensor compute circuit 806 and reduce the power required for the transmission. In some examples, image sensor 802 may include an array of memory devices (e.g., SRAM, RRAM, etc.) formed on or between the semiconductor substrates to provide frame buffer 809 and compute memory 1002.

FIG. 14B illustrates examples of details of the stack structure of image sensor 802. As shown in FIG. 14B, first semiconductor substrate 1000 may include a back side surface 1408 configured as a light receiving surface and includes photodiodes of each pixel cell, and a front side surface 1410 on which transfer transistor 604 and charge storage device 605 (e.g., a floating drain of transfer transistor 604) are implemented, whereas the processing circuits of the pixel cells including buffer 606, quantizer 607, memory 955, etc. are implemented below a front side surface 1412 of semiconductor substrate 1402a. Front side surface 1410 of semiconductor substrate 1400 may be electrically connected with front side surface 1012 of semiconductor substrate 1402a by vertical interconnects 1404 which include chip-to-chip copper bonding. The chip-to-chip copper bonding can provide pixel interconnects between, for example, the transfer transistor 604 of each pixel cell and the buffer 606 of each pixel cell.

In addition, imaging sensor 800 further includes through vertical interconnects, such as through silicon vias (TSVs), micro-TSVs, Copper-Copper bump, etc., between pixel cell array 808 and sensor compute circuit 806. The vertical interconnects can be on shoulder regions 1420 and 1422 of the stack and penetrate through semiconductor substrate 1402a and 1402b. The vertical interconnects can be configured to transmit, for example, first programming signals 820 and image frames (e.g., first image frames 822). The vertical interconnects can support, for example, transmission of full frame of pixel data (e.g., 1920 pixels×1080 pixels) at the normal frame rate (e.g., 60 frames/second) from pixel cell array 808 to image processor 810 to perform image feature extraction operations.

Figure 15:
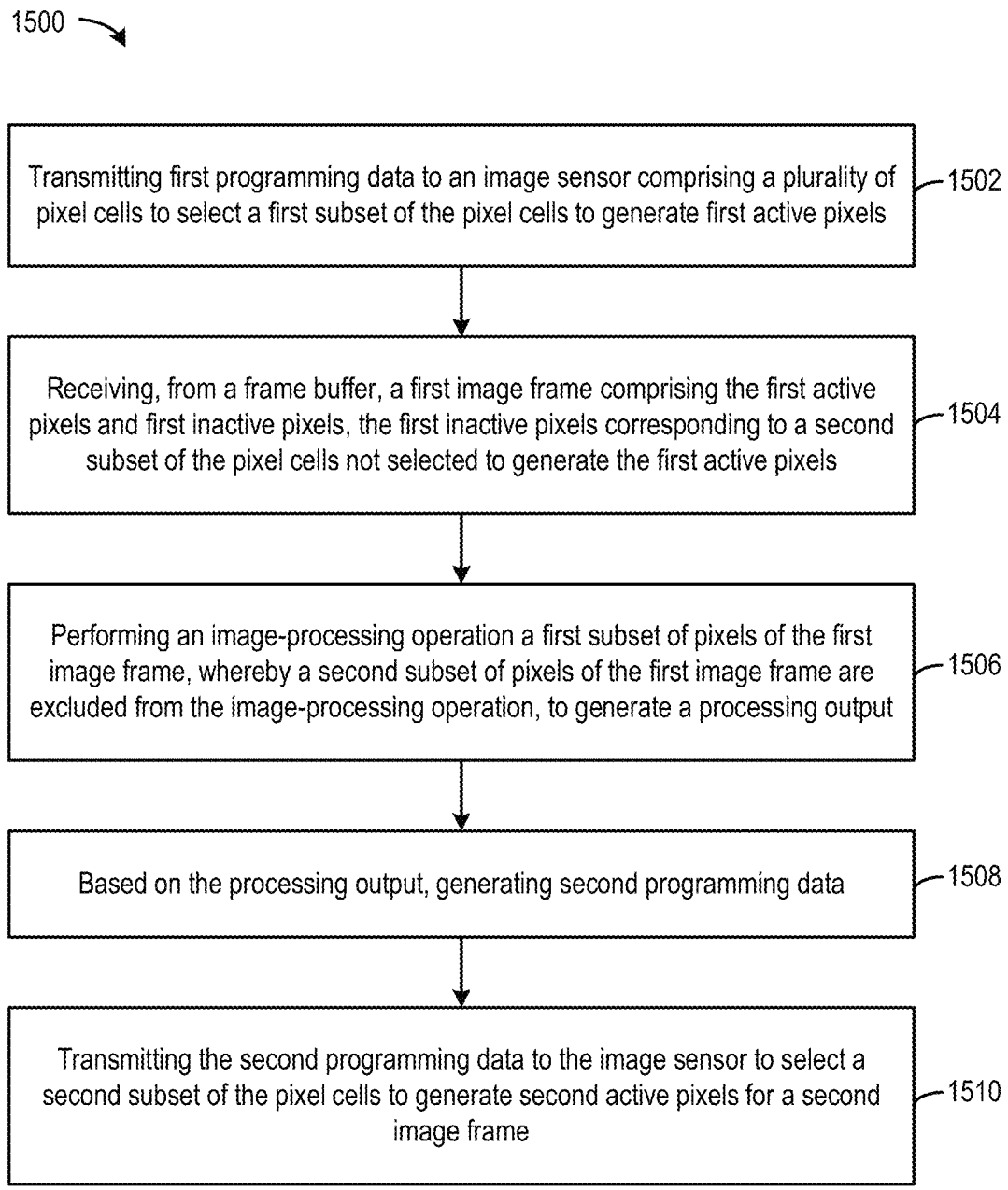
FIG. 15 illustrates a flowchart of an example process of operating an image sensor.

FIG. 15 illustrates a method 1500 of operating an image sensor, such as image sensor 802 of FIG. 8A. Method 1500 can be performed by, for example, various components of image sensor 802 including sensor compute circuit 806, pixel cells array 808, and frame buffer 809.

Sensor compute circuit 806 further includes image processor 810 and programming map generator 812. In some examples, the image sensor is implemented in a first semiconductor substrate, the frame buffer and the sensor compute circuit are implemented in one or more second semiconductor substrates, whereas the first semiconductor substrate and the one or more second semiconductor substrates form a stack and housed in a single semiconductor package.

In step 1502, programming map generator 812 transmits first programming data to the image sensor comprising a plurality of pixel cells to select a first subset of the pixel cells to generate first active pixels.

In some examples, the first programming data can be generated to support an object detection and tracking operation at host processor 804 based on a sparse image sensing operation. The first subset of pixel cells can be selectively enabled to only capture pixel data relevant for tracking and detecting the object as active pixels, or to only transmit the active pixels to the frame buffer, to support a sparse image sensing operation. The first programming data can be generated based on, for example, feedback data from host processor 804.

In step 1504, sensor compute circuit 806 receives, from frame buffer 809, a first image frame comprising at least some of the active pixels generated by a first subset of the pixel cells selected by the image sensor based on first programming data. The first image frame further comprises inactive pixels corresponding to a second subset of the pixel cells not selected to generate active pixels. In some examples, as described in FIG. 12A-FIG. 12C, frame buffer 809 can also overwrite some of the pixels in the first image frame with a pre-determined value to indicate the pixels are static pixels and have not experienced a threshold degree of change over a number of image frames.

Specifically, the frame buffer can detect static pixels from the active pixels output by the image sensor, and store pixel values for those pixels to signal to the image processor that those pixels are static pixels. For example, the frame buffer can store the most recent pixel data (including active and inactive pixels) from each pixel cell of the image sensor as the first image frame. For each pixel of the active pixels, the frame buffer can determine a degree of change of the pixel with respect to a prior frame, such as the image frame immediately before the first image frame. The frame buffer can set a pixel value to indicate a static pixel in various ways. For example, the frame buffer can set a pixel value for the pixel in the frame buffer based on a leaky integrator function having a time constant, and based on a number of consecutive image frames across which the pixel, output by the image sensor, has remained static. If the pixel has remained static for a large number of consecutive image frames, the pixel value of the pixel can settle at a predetermined pixel value. As another example, if the pixel has remained static for a threshold number of consecutive image frames (e.g., 10), the frame buffer can set a predetermined pixel value for the pixel in the frame buffer. The predetermined pixel value can correspond to a dark color (zero), a white color (255), a gray color (128), or any value that indicate a static pixel.

In step 1506, image processor 810 performs an image-processing operation a first subset of pixels of the first image frame, whereby a second subset of pixels of the first image frame are excluded from the image-processing operation, to generate a processing output. The first subset of pixels of the first image frame on which the image-processing operation is performed can correspond to, for example, the active pixels, non-static pixels that experience a certain degree of changes between frames, etc. For example, the first subset of pixels can correspond to the object of interest being tracked/detected by an object detection and tracking operation at host processor 804.

In some examples, the image-processing operation can include a neural network operation. Specifically, referring to FIG. 10A, image processor 810 can include data processing circuit 1006 to provide hardware acceleration for a neural network operation, such as a multi-layer convolutional neural network (CNN) including an input layer and an output layer. The image processor can include compute memory 1002 to store the input image frame and a set of weights associated with each neural network layer. The set of weights can represent features of the object to be detected. The image processor can also include controller 1004 to control the data processing circuit to fetch the input image frame data and the weights from the compute memory. The controller can control the data processing circuit to perform arithmetic operations, such as multiply-and-accumulate (MAC) operations, between an input image frame and the weights to generate intermediate output data for the input layer. The intermediate output data are be post-processed based on, for example, an activation function, pooling operation, etc., and then the post-processed intermediate output data can be stored in the compute memory. The post-processed intermediate output data can be fetched from the compute memory and provided to the next neural network layer as inputs. The arithmetic operations, as well as fetching and storage of intermediate output data, are repeated for all the layers up to the output layer to generate the neural network outputs. The neural network output can indicate, for example, a likelihood of the object being present in the input image frame, and the pixel locations of the object in the input image frame.

The controller can configure the data processing circuit to process the sparse image data in an efficient manner. For example, for the input layer, the controller can control the data processing circuit to only fetch the first subset of pixels and corresponding weights from the compute memory, and to perform the MAC operations only on the active pixels and the corresponding weights to generate a subset of the intermediate output corresponding to the active pixels for the input layer. The controller can also determine, based on the topology of the neural network and the connections among subsequent neural network layers, a subset of intermediate output data at each subsequent neural network that can be traced back to active pixels. The controller can control the data processing circuit to perform the MAC operations to only generate the subsets of intermediate output data at each subsequent neural network layer. In addition, to reduce the access of compute memory, a predetermined value (e.g., zero) for the intermediate output data for each layer can be stored in the compute memory prior to the neural network operation. Only the intermediate output data for active pixels are updated. All these can reduce the power consumption by the neural network operations over the sparse image data.

In some examples, to further reduce power consumption and improve power and computation efficiencies, the data processing circuit can perform the image-processing operations (e.g., neural network operations) only on the non-static pixels of the first image frame to generate updated outputs for the non-static pixels. For the static pixels (which can include non-active pixels), the image-processing operations can be skipped, while the outputs from the image-processing operations on the prior image frame can be retained. In a case where the image-processing operations comprise neural network operations, the controller can control the data processing circuit to only fetch the non-static pixels and the corresponding weights data from the compute memory to update the subset of intermediate output data corresponding to the non-static pixels for the input layer. The rest of the intermediate output data corresponding to the static pixels (obtained from prior image frame) and corresponding to the non-active pixels (e.g., having predetermined values such as zero) in the compute memory can be retained for the input layer. The controller can also determine based on the topology of the neural network and the connections among subsequent neural network layers a subset of intermediate output data at each subsequent neural network that can be traced back to non-static pixels, and only update the subsets of intermediate output data, to reduce access to the compute memory and to reduce power consumption.

In some examples, the image processor can also generate additional information to facilitate the processing of non-static pixels. For example, the image processor can determine a data change propagation map that tracks the propagation of data change from the input layer to the output layer of the neural network model based on the model's topology. Based on the propagation map, as well as the static pixels from the frame buffer, the image processor can identify input data for each neural network that are non-static, and only fetch those input data for the neural network operations at each layer. In addition, the image processor can also determine the threshold degree of change for static/non-static pixel determination based on the topology of the neural network model to ensure that the pixels determined to be non-static can lead to a requisite degree of change at the output layer. In addition, the image processor can also track the changes in the pixels between consecutive frames and between non-consecutive frames. The image processor can identify pixels that exhibit small changes between consecutive frames but also identify huge changes between non-consecutive frames as non-static pixels so that the image processor can perform image-processing operations on those pixels.

In step 1508, programming map generator 812 generates second programming data based on the processing output. The second programming data can reflect, for example, a movement of the object, change in a part of the object being tracked, etc., based on the processing output.

In step 1510, programming map generator 812 transmits the second programming data to the image sensor to generate second active pixels for a second image frame.

Some portions of this description describe the examples of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some examples, a software module is implemented with a computer program product comprising a computer-readable medium containing computer program code, which can be executed by a computer processor for performing any or all of the steps, operations, or processes described.

Examples of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples of the disclosure may also relate to a product that is produced by a computing process described herein. Such a product may comprise information resulting from a computing process, where the information is stored on a non-transitory, tangible computer readable storage medium and may include any example of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the examples is intended to be illustrative, but not limiting, of the scope of the disclosure, which is set forth in the following claims.

What is claimed is:

1. An apparatus comprising:
an image sensor comprising a plurality of pixel cells, the image sensor being configurable by programming data to select a subset of the pixel cells to generate active pixels;
a frame buffer; and
a sensor compute circuit configured to:
receive, from the frame buffer, a first image frame comprising first active pixels and first inactive pixels, the first active pixels being generated by a first subset of the pixel cells selected based on first programming data, the first inactive pixels corresponding to a second subset of the pixel cells not selected to generate the first active pixels;
perform an image-processing operation on a first subset of pixels of the first image frame, whereby a second subset of pixels of the first image frame are excluded from the image-processing operation, to generate a processing output;
based on the processing output, generate second programming data; and
transmit the second programming data to the image sensor to select a third subset of the pixel cells to generate second active pixels for a second image frame.

2. The apparatus of claim 1, wherein the image-processing operation comprises a processing operation by a neural network model to detect an object of interest in the first image frame; and
wherein the first subset of pixels correspond to the object of interest.

3. The apparatus of claim 2, wherein the sensor compute circuit is coupled with a host device configured to execute an application that uses a result of the detection of the object of interest; and
wherein the sensor compute circuit is configured to receive information about the object of interest from the host device.

4. The apparatus of claim 2, wherein the sensor compute circuit comprises:
a compute memory configured to store: input data to a neural network layer of the neural network, weight data of the neural network layer, and intermediate output data of the neural network layer;
a data processing circuit configured to perform arithmetic operations of the neural network layer on the input data and the weight data to generate the intermediate output data; and
a compute controller configured to:
fetch, from the compute memory, a first subset of the input data and a first subset of the weight data corresponding to the first subset of the input data, the first subset of the input data corresponding to at least some of the first active pixels;
control the data processing circuit to perform the arithmetic operations on the first subset of the input data and the first subset of the weight data to generate a first subset of the intermediate output data for the first image frame, the first subset of the intermediate output data corresponding to the first subset of the input data;
store the first subset of the intermediate output data for the first image frame in the compute memory; and
store a predetermined value for a second subset of the intermediate output data for the first image frame in the compute memory, the second subset of the intermediate output data corresponding to the first inactive pixels.

5. The apparatus of claim 4, wherein the predetermined value is stored based on resetting the compute memory prior to the image-processing operation.

6. The apparatus of claim 4, wherein the compute controller is configured to:
fetch the input data from the compute memory;
identify, from the fetched input data, the first subset of the input data; and
provide the identified first subset of the input data to the compute controller.

7. The apparatus of claim 4, wherein the compute controller is configured to:
determine an address region of the compute memory that stores the first subset of the input data; and
fetch the first subset of the input data from the compute memory.

8. The apparatus of claim 7, wherein the address region is determined based on at least one of: the first programming data, or information about connectivity between neural network layers of the neural network model.

9. The apparatus of claim 4, wherein:
the first active pixels include static pixels and non-static pixels;
the static pixels correspond to a first subset of the first active pixels for which degrees change of the pixel values between the first image frame and a prior image frame are above a change threshold;
the non-static pixels correspond to a second subset of the first active pixels for which degrees change of the pixel values between the first image frame and the prior image frame are below the change threshold; and
the compute controller is configured to fetch the first subset of the input data corresponding to the non-static pixels of the first active pixels.

10. The apparatus of claim 9, wherein the predetermined value is a first predetermined value;
wherein the frame buffer is configured to store a second predetermined value for each of the static pixels to signal the static pixels; and
wherein the compute controller is configured to exclude the static pixels from the data processing circuit based on detecting that the static pixels have the second predetermined value.

11. The apparatus of claim 10, wherein the frame buffer is configured to store the second predetermined value for a pixel based on determining that the degree of change of the pixel across a threshold number of frames is below the change threshold.

12. The apparatus of claim 10, wherein the frame buffer is configured to set update a pixel value of a pixel based on a leaky integrator function having a time constant, and based on when the pixel last experiences a degree of change greater than the change threshold.

13. The apparatus of claim 9, wherein the compute controller is configured to:
determine, based on a topology of the neural network model, a data change propagation map that indicates how changes in the non-static pixels propagate through different neural network layers of the neural network model;
determine, based on the data change propagation map, a first address region of the compute memory to fetch the first subset of the input data and a second address region of the compute memory to store the first subset of the intermediate output data;
fetch the first subset of the input data from the first address region; and
store the first subset of the intermediate output data at the second address region.

14. The apparatus of claim 9, wherein the compute controller is configured to determine the change threshold based on a depth of the neural network model and a quantization precision at each neural network layer of the neural network model.

15. The apparatus of claim 9, wherein the change threshold is a first change threshold; and
wherein the compute controller is configured to:
track the degree of change of the pixel values of the first active pixels between two non-consecutive frames; and
determine a third subset of the first active pixels as non-static pixels based on the degree of change exceeding a second change threshold.

16. The apparatus of claim 1, wherein the image sensor is implemented in a first semiconductor substrate;
wherein the frame buffer and the sensor compute circuit are implemented in one or more second semiconductor substrates; and
wherein the first semiconductor substrate and the one or more second semiconductor substrates form a stack and housed in a single semiconductor package.

17. A method comprising:
transmitting first programming data to an image sensor comprising a plurality of pixel cells to select a first subset of the pixel cells to generate first active pixels;
receiving, from a frame buffer, a first image frame comprising the first active pixels and first inactive pixels, the first inactive pixels corresponding to a second subset of the pixel cells not selected to generate the first active pixels;
performing an image-processing operation a first subset of pixels of the first image frame, whereby a second subset of pixels of the first image frame are excluded from the image-processing operation, to generate a processing output;
based on the processing output, generating second programming data; and
transmitting the second programming data to the image sensor to select a third subset of the pixel cells to generate second active pixels for a second image frame.

18. The method of claim 17, wherein the image-processing operation comprises a processing operation by a neural network to detect an object of interest in the first image frame; and
wherein the first subset of pixels correspond to the object of interest.

19. The method of claim 18, further comprising:
storing, in a compute memory, input data to a neural network layer of the neural network, weight data of the neural network layer;
fetching, from the compute memory, a first subset of the input data and a first subset of the weight data corresponding to the first subset of the input data, the first subset of the input data corresponding to at least some of the first active pixels;
performing, using a data processing circuit, arithmetic operations on the first subset of the input data and the first subset of the weight data to generate a first subset of intermediate output data for the first image frame, the first subset of the intermediate output data corresponding to the first subset of the input data;
storing, in the compute memory, the first subset of the intermediate output data for the first image frame; and
storing, in the compute memory, a predetermined value for a second subset of the intermediate output data for the first image frame, the second subset of the intermediate output data corresponding to the first inactive pixels.

20. The method of claim 19, wherein:
the first active pixels include static pixels and non-static pixels;
the static pixels correspond to a first subset of the first active pixels for which degrees change of the pixel values between the first image frame and a prior image frame are above a change threshold;
the non-static pixels correspond to a second subset of the first active pixels for which degrees change of the pixel values between the first image frame and the prior image frame are below the change threshold; and
the first subset of the input data correspond to the non-static pixels of the first active pixels.

* * * * *